(12) United States Patent
Strandwitz et al.

(10) Patent No.: US 8,144,204 B2
(45) Date of Patent: Mar. 27, 2012

(54) SELF-CONTAINED WIRELESS CAMERA DEVICE, WIRELESS CAMERA SYSTEM AND METHOD

(76) Inventors: Peter Strandwitz, Neenah, WI (US); Robert Kniskern, Fort Wayne, IN (US); Gary D. Schulz, Cary, IL (US); Jan-Michael Wyckoff, Schaumburg, IL (US)

( * ) Notice: Subject to any disclaimer, the term of this patent is extended or adjusted under 35 U.S.C. 154(b) by 0 days.

(21) Appl. No.: 12/689,128

(22) Filed: Jan. 18, 2010

(65) Prior Publication Data
US 2010/0110207 A1 May 6, 2010

Related U.S. Application Data

(60) Division of application No. 12/207,773, filed on Sep. 10, 2008, now Pat. No. 7,944,484, which is a continuation of application No. 10/351,906, filed on Jan. 27, 2003, now Pat. No. 7,864,216, which is a division of application No. 09/102,457, filed on Jun. 22, 1998, now Pat. No. 6,522,352.

(51) Int. Cl.
*H04N 5/232* (2006.01)

(52) U.S. Cl. ................... 348/211.2; 455/556.1

(58) Field of Classification Search .. 348/211.99–211.4, 348/211.11, 207.99; 455/556.1, 557
See application file for complete search history.

(56) References Cited

U.S. PATENT DOCUMENTS

| | | | |
|---|---|---|---|
| 4,097,893 A * | 6/1978 | Camras | 348/158 |
| 5,737,491 A | 4/1998 | Allen et al. | |
| 5,806,005 A | 9/1998 | Hull et al. | |
| 2007/0268373 A1 * | 11/2007 | Creamer et al. | 348/211.3 |

OTHER PUBLICATIONS

Docket Report for United States District Court Northern District of Illinois—CM/ECF LIVE, Ver 3.2.3 (Chicago) Civil Docket Case for Case #: 1:09-cv-07401, 2pp, printed on Mar. 17, 2010 from https://ecf.ilnd.uscourts.gov/cg-bin/DktRpt.pl.
Complaint filed by Memorylink Corp.: Jury Demand. Filing fee $350, receipt No. 07520000000004311855. (Attachment: # 1 Exhibit Exhibit 1, #2 Exhibit Exhibit 2, #3 Exhibit Exhibit 3, #4 Exhibit Exhibit 4, #5 Exhibit Exhibit 5, #6 Exhibit Exhibit 6, #7 Exhibit Exhibit 7, #8 Exhibit Exhibit 8) (Schaafsma, Paul) (Entered: Nov. 25, 2009)—United States District Court Northern District of Illinois—CM/ECF LIVE, Ver 3.2.3 (Chicago) Civil Docket for Case #: 1:09-cv-07401.
Civil Cover Sheet (Schaafsma, Paul) (Entered: Nov. 25, 2009)—United States District Court Northern District of Illinois—CM/ECF LIVE, Ver 3.2.3 (Chicago) Civil Docket for Case #: 1:09-cv-07401.

(Continued)

*Primary Examiner* — Tuan Ho
(74) *Attorney, Agent, or Firm* — Banner & Witcoff, Ltd.

(57) ABSTRACT

A self-contained wireless camera (10) and a wireless camera system (25) having such a device and a base station (20). Video processing circuitry (200, 210) of the camera device receives video signals from a camera (130) and provides processed video signals. A radio receiver (101) receives processed video signals from the base station or another camera device. Images from the camera or the base station are displayed in a selected manner on a display or monitor (140). The base station device (20) receives processed video signals, stores them and retransmits them. A command signal is received by the radio receiver to modify operation in such a manner as to control bandwidth usage. Wireless camera devices can adjust their operation to accommodate other wireless camera devices. Different transport protocol modules 230 and 240 can be selected according to the application that the user selects for operation.

10 Claims, 8 Drawing Sheets

OTHER PUBLICATIONS

Attorney Appearance for Plaintiff Memorylink Corp. by Paul Eugene Schaafsma (Schaafsma, Paul) (Entered: Nov. 25, 2009)—United States District Court Northern District of Illinois—CM/ECF Live, Ver 3.2.3 (Chicago) Civil Docket for Case #: 1:09-cv-07401.
Case Assigned to the Honorable Robert W. Gettleman. Designated as Magistrate Judge the Honorable Nan R. Nolan. (nsf,) (Entered: Nov. 25, 2009)—United States District Court Northern District of Illinois—CM/ECF LIVE, Ver 3.2.3 (Chicago) Civil Docket for Case #: 1:09-cv-07401.
Disclosure Statement by Memorylink Corp. (Schaafsma, Paul) Modified on Dec. 1, 2009 (mb,). (Entered: Nov. 25, 2009).—United States District Court Northern District of Illinois—CM/ECF LIVE, Ver 3.2.3 (Chicago) Civil Docket for Case #: 1:09-cv-07401.
Notice of Claims Involving Patents by Memorylink Corp. (Schaafsma, Paul) (Entered: Nov. 25, 2009)—United States District Court Northern District of Illinois—CM/ECF LIVE, Ver 3.2.3 (Chicago) Civil Docket for Case #: 1:09-cv-07401.
Summons Issued as to Defendants Motorola Inc, Jonathan P. Meyer, Hugh C. Dunlop, Thomas G. Berry, J. Ray Wood, Terri S. Hughes. (ber,) (Entered: Nov. 30, 2009)—United States District Court Northern District of Illinois—CM/ECF LIVE, Ver 3.2.3 (Chicago) Civil Docket for Case #: 1:09-cv-07401.
Summons Returned Executed by Memorylink Corp. as to Motorola Inc on Nov. 30, 2009, answer due Dec. 21, 2009., Affidavit of Service filed by Plaintiff Memorylink Corp., Defendant Motorola Inc regarding Summons served on Kirkland & Ellis on Nov. 30, 2009 (Schaafsma, Paul) (Entered: Dec. 3, 2009)—United States District Court Northern District of Illinois—CM/ECF LIVE, Ver 3.2.3 (Chicago) Civil Docket for Case #: 1:09-cv-07401.
Summons Returned Executed by Memorylink Corp. as to Thomas G. Berry on Dec. 7, 2009, answer due Dec. 28, 2009., Affidavit of Service filed by Defendant Thomas G. Berry regarding Summons served on Thomas G. Berry on Dec. 7, 2009 (Schaafsma, Paul) (Entered: Dec. 15, 2009)—United States District Court Northern District of Illinois—CM/ECF LIVE, Ver 3.2.3 (Chicago) Civil Docket for Case #: 1:09-cv-07401.
Summons Returned Executed by Memorylink Corp. as to J. Ray Wood on Dec. 7, 2009, answer due Dec. 28, 2009., Affidavit of Service filed by Defendant J. Ray Wood regarding Summons served on Kirkland & Ellis on Dec. 7, 2009 (Schaafsma, Paul) (Entered: Dec. 15, 2009)—United States District Court Northern District of Illinois—CM/ECF LIVE, Ver 3.2.3 (Chicago) Civil Docket for Case #: 1:09-cv-07401.
Summons Returned Executed by Memorylink Corp. as to Terri S. Hughes on Dec. 7, 2009, answer due Dec. 28, 2009., Affidavit of Service filed by Defendant Terri S. Hughes regarding Summons served on Kirkland & Ellis on Dec. 7, 2009 (Schaafsma, Paul) (Entered: Dec. 15, 2009)—United States District Court Northern District of Illinois—CM/ECF LIVE, Ver 3.2.3 (Chicago) Civil Docket for Case #: 1:09-cv-07401.
Attorney Appearance for Defendants Thomas G Berry, Terri S. Hughes, Jonathan P. Meyer, Motorola Inc, J. Ray Wood by Anne J. Sidrys (Sidrys, Anne) (Entered: Dec. 21, 2009)—United States District Court Northern District of Illinois—CM/ECF LIVE, Ver 3.2.3 (Chicago) Civil Docket for Case #: 1:09-cv-07401.
Attorney Appearance for Defendants Thomas G Berry, Terri S. Hughes, Jonathan P. Meyer, Motorola Inc, J. Ray Wood by Nyika Onyesi Strickland (Strickland, Nyika) (Entered: Dec. 21, 2009)—United States District Court Northern District of Illinois—CM/ECF Live, Ver 32.3 (Chicago) Civil Docket for Case #: 1:09-cv-07401.
Attorney Appearance for Defendants Thomas G Berry, Terri S. Hughes, Jonathan P. Meyer, Motorola Inc, J. Ray Wood by Jess M. Krannich (Krannich, Jess (Entered: Dec. 21, 2009)—United States District Court Northern District of Illinois—CM/ECF LIVE, Ver 3.2.3 (Chicago) Civil Docket for Case #: 1:09-cv-07401.
Attorney Appearance for Defendants Thomas G Berry, Terri S. Hughes, Jonathan P. Meyer, Motorola Inc, J. Ray Wood by Joel R. Merkin (Merkin, Joel) (Entered: Dec. 21, 2009)—United States District Court Northern District of Illinois—CM/ECF LIVE, Ver 3.2.3 (Chicago) Civil Docket for Case #: 1:09-cv-07401.
Attorney Appearance for Defendants Thomas G Berry, Terri S. Hughes, Jonathan P. Meyer, Motorola Inc, J. Ray Wood by Mark J. Nomellini (Nomellini, Mark) (Entered: Dec. 21, 2009)—United States District Court Northern District of Illinois—CM/ECF LIVE, Ver 3.2.3 (Chicago) Civil Docket for Case #: 1:09-cv-07401.
Motion by Defendants J. Ray Wood, Jonathan P. Meyer, Terri S. Hughes, Motorola Inc, Thomas G Berry to dismiss Memorylink's Clalim for Legal Malpractice (Sidrys, Anne) (Entered: Dec. 21, 2009)—United States District Court Northern District of Illinois—CM/ECF Live, Ver 3.2.3 (Chicago) Civil Docket for Case #: 1:09-cv-07401.
Notice of Motion by Anne J. Sidrys for presentment of motion to dismiss 19 before Honorable Robert W. Gettleman on Jan. 13, 2010 at 09:15 AM. (Sifts, Anne) (Entered: Dec. 21, 2009)—United States District Court Northern District of Illinois—CM/ECF Live, Ver 3.2.3 (Chicago) Civil Docket for Case #: 1:09-cv-07401.
Memorandum by Thomas G Berry, Terri S. Hughes, Jonathan P. Meyer, Motorola Inc, J. Ray Wood in support of motion to dismiss 19 Memorylink's Claim for Legal Malpractice (Attachments: #1 Exhibit A, #2 Exhibit B, #3 Exhibit C, #4 Exhibit D, #5 Exhibit E) (Sidrys, Anne) (Entered: Dec. 21, 2009)—United States District Court Northern District of Illinois—CM/ECF LIVE, Ver 3.2.3 (Chicago) Civil Docket for Case #: 1:09-cv-07401.
Corporate Disclosure Statement by Motorola Inc (Sidrys, Anne) (Entered: Dec. 21, 2009)—United States District Court Northern District of Illinois—CM/ECF LIVE, Ver 3.2.3 (Chicago) Civil Docket for Case #: 1:09-cv-07401.
Minute entry before Honorable Robert W. Gettleman: Motion hearing held on Jan. 13, 2010 regarding motion to dismiss 19. Response is due by Jan. 15, 2010. reply is due by Jan. 29, 2010. Status hearing set for Mar. 30, 2010 at 9:00 a.m. Mailed notice (gds,) (Entered: Jan. 15, 2010)—United States District Court Northern District of Illinois—CM/ECF LIVE, Ver 3.2.3 (Chicago) Civil Docket for Case #: 1:09-cv-07401.
Memorandum by Memorylink Corp. in Opposition to motion to dismiss 19 (Attachments: #1 *Exhibit Morris* v. *Margulis*, #2 Exhibit Patent Office Attorneys of Record, #3 Exhibit Maintenance Fee, #4 Exhibit Associate Power of Attorney, #5 Exhibit *DeLuca* v. *Burciaga*) (Schaafsma, Paul) (Entered: Jan. 15, 2010)—United States District Court Northern District of Illinois—CM/ECF LIVE, Ver 3.2.3 (Chicago) Civil Docket for Case #: 1:09-cv-07401.
Reply by Thomas G Berry, Terri S. Hughes, Jonathan P. Meyer, Motorola Inc, J. Ray Wood to memorandum in opposition to motion, 24 (Attachments: #1 Exhibit A, #2 Exhibit B) (Sidrys, Anne) (Entered: Jan. 29, 2010)—United States District Court Northern District of Illinois—CM/ECF LIVE, Ver 3.2.3 (Chicago) Civil Docket for Case #: 1:09-cv-07401.
Motion by Plaintiff Memorylink Corp. for default judgment as to Defendant Dunlop (Attachments: #1 Exhibit Exhibit A—Declaration of Paul E. Schaafsma, #2 Exhibit Exhibit 1—Patent Office Register of Attorneys—Johnathan P. Meyer, #3 Exhibit Exhibit 2—Patent Office Register of Attorneys Teri S. Hughes, #4 Exhibit Exhibit 3—Patent Office Register of Attorneys J. Ray Wood, #5 Exhibit Exhibit 4—Patent Office Register of Attorneys Thomas G. Berry, #6 Exhibit Exhibit 5—RGC Jenkins & Co. About Us Web-Page, #7 Exhibit Exhibit 6—RGC Jenkins & Co. Home Web-Page, #8 Exhibit. Notice of Motion by Paul Schaafsma for presentment of motion for default judgment,,,,26 before Honorable Robert W. Gettleman on Mar. 18, 2010 at 09:15 AM. (Schaafsma, Paul) (Entered: Mar. 10, 2010)—United States District Court Northern District of Illinois—CM/ECF LIVE, Ver 3.2.3 (Chicago) Civil Docket for Case #: 1:09-cv-07401.
Docket Report for United States District Court Northern District of Illinois—CM/ECF LIVE, Ver 3.2.3 (Chicago) Civil Docket Case for Case #: 1:08-cv-03301, 12pp, printed on Mar. 17, 2010 from https://ecf.ilnd.uscourts.gov/cg-bin/DktRpt.pl.
Complaint filed by Memorylink Corp.; Jury Demand. Filing fee $350. (Attachments: # 1 Exhibit 1, #2 Exhibit 2, #3 Exhibit 3, #4 Exhibit 4, #5 Exhibit 5, #6 Exhibit 6, #7 Exhibit 7, #8 Exhibit 8, #9 Exhibit 9, #10 Exhibit 10 #11 Exhibit 11, #12 Exhibit 12, #13 Exhibit 13, #14 Exhibit 14, #15 Exhibit 15, #16 Exhibit 16, #17 Exhibit 17, #18 Exhibit 18, #19 Exhibit 19, #20 Exhibit 20, #21 Exhibit 21) (ca,) (Entered: Jun. 10, 2008)—United States District Court Northern District of Illinois—CM/ECF LIVE, Ver 3.2.3 (Chicago) Civil Docket for Case #: 1:08-cv-03301.
Civil Cover Sheet. (ca,) (Entered: Jun. 10, 2008)—United States District Court Northern District of Illinois—CM/ECF LIVE, Ver 3.2.3 (Chicago) Civil Docket for Case #: 1:08-cv-03301.
Attorney Appearance for Plaintiff Memorylink Corp. by Michael J. Femal. (ca,) (Entered: Jun. 10, 2008)—United States District Court Northern District of Illinois—CM/ECF LIVE, Ver 3.2.3 (Chicago) Civil Docket for Case #: 1:08-cv-03301.
Attorney Appearance for Plaintiff Memorylink Corp. by Richard N. Kessler. (ca,) (Entered: Jun. 10, 2008)—United States District Court Northern District of Illinois—CM/ECF LIVE, Ver 3.2.3 (Chicago) Civil Docket for Case #: 1:08-cv-03301.
Attorney Appearance for Plaintiff Memorylink Corp. by Peter Todd Berk. (ca,) (Entered: Jun. 10, 2008)—United States District Court Northern District of Illinois—CM/ECF LIVE, Ver 3.2.3 (Chicago) Civil Docket for Case #: 1:08-cv-03301.
Summons Issued, one original as to Defendant Motorola, Inc. (ca,) (Entered: Jun. 10, 2008)—United States District Court Northern District of Illinois—CM/ECF LIVE, Ver 3.2.3 (Chicago) Civil Docket for Case #: 1:08-cv-03301.
Economic Interest Statement by Memorylink Corp. (Femal, Michael) (Entered: Jun. 10, 2008)—United States District Court Northern District of Illinois—CM/ECF LIVE, Ver 3.2.3 (Chicago) Civil Docket for Case #: 1:08-cv-03301.
Notice of Patent Claims Per Local Rule 3.4 by Memorylink Corp. (Femal, Michael) (Entered: Jun. 10, 2008)—United States District Court Northern District of Illinois—CM/ECF LIVE, Ver 32.3 (Chicago) Civil Docket for Case #: 1:08-cv-03301.
Attorney Appearance for Defendant Motorola, Inc. by Mark J. Nomellini (Nomellini, Mark) (Entered: Jun. 23, 2008)—United States District Court Northern District of Illinois—CM/ECF LIVE, Ver 3.2.3 (Chicago) Civil Docket for Case #: 1:08-cv-03301.
Motion by Defendant Motorola, Inc. for extension of time to file answer (Attachments: #1 Exhibit A—Proposed Order) (Nomellini, Mark) (Entered: Jun. 23, 2008)—United States District Court Northern District of Illinois—CM/ECF LIVE, Ver 3.2.3 (Chicago) Civil Docket for Case #: 1:08-cv-03301.
Notice of Motion by Mark J Nomellini for presentment of motion for extension of time to file answer 12 before Honorable William J. Hibbler on Jun. 26, 2008 at 09:30 AM. (Nomellini, Mark) (Entered: Jun. 23, 2008)—United States District Court Northern District of Illinois—CM/ECF LIVE, Ver 3.2.3 (Chicago) Civil Docket for Case #: 1:08-cv-03301.
Minute entry before the Honorable William J. Hibbler: Defendant's Unopposed Motion for extension of time until Aug. 1, 2008 to respond to plaintiffs complaint 12 is granted. Status hearing to set discovery schedule set for Aug. 26, 2008 at 09:30 AM. Parties to submit joint proposed discovery schedule to the Court by Aug. 21, 2008. Mailed notice (jdh) (Entered: Jun. 25, 2008)—United States District Court Northern District of Illinois—CM/ECF LIVE, Ver 3.2.3 (Chicago) Civil Docket for Case #: 1:08-cv-03301.
Attorney Appearance for Defendant Motorola, Inc. by Anne J. Sidrys (Sidrys, Anne) (Entered: Jul. 11, 2008)—United States District Court Northern District of Illinois—CM/ECF LIVE, Ver 3.2.3 (Chicago) Civil Docket for Case #: 1:08-cv-03301.
Motion by Defendant Motorola, Inc. for leave to file excess pages Joint Motion to Permit Parties to Submit Overlength Memoranda (Krannich, Jess) (Entered: Jul. 14, 2008)—United States District Court Northern District of Illinois—CM/ECF LIVE, Ver 3.2.3 (Chicago) Civil Docket for Case #: 1:08-cv-03301.
Notice of Joint Motion Notice of Motion by Jess M. Krannich for presentment of motion for leave to file excess pages 16 before Honorable William J. Hibbler on Jul. 17, 2008 at 09:30 AM. (Krannich, Jess) (Entered: Jul. 14, 2008)—United States District Court Northern District of Illinois—CM/ECF LIVE, Ver 3.2.3 (Chicago) Civil Docket for Case #: 1:08-cv-03301.
Minute entry before the Honorable William J. Hibbler: Joint Motion to permit parties to submit overlength memoranda in support of and in opposition to defendant's motion to dismiss 16 is granted. Defendant's memoranda in support and plaintiff's responsive memoranda shall not exceed 25 pages. Mailed notice (jdh) (Entered: Jul. 16, 2008)—United States District Court Northern District of Illinois—CM/ECF LIVE, Ver 3.2.3 (Chicago) Civil Docket for Case #: 1:08-cv-03301.
Attorney Appearance for Defendant Motorola, Inc. by Nyika Onyesi Strickland (Strickland, Nyika) (Entered:.Jul. 30, 2008)—United States District Court Northern District of Illinois—CM/ECF LIVE, Ver 3.2.3 (Chicago) Civil Docket for Case #: 1:08-cv-03301.
Attorney Appearance for Defendant Motorola, Inc. by Jess M. Krannich (Krannich, Jess) (Entered: Jul. 30, 2008)—United States District Court Northern District of Illinois—CM/ECF LIVE, Ver 3.2.3 (Chicago) Civil Docket for Case #: 1:08-cv-03301.
Motion by Defendant Motorola, Inc. to dismiss (Sidrys, Anne) (Entered: Aug. 1, 2008)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion to dismiss 21 before Honorable William J. Hibbler on.Aug. 7, 2008 at 09:30 AM. (Sidrys, Anne) (Entered: Aug. 1, 2008)—United States District Court Northern District of Illinois—CM/ECF LIVE, Ver 3.2.3 (Chicago) Civil Docket for Case #: 1:08-cv-03301.
Memorandum by Motorola, Inc. in support of motion to dismiss 21 (Attachments: #1 Appendix A) (Sidrys, Anne).(Entered: Aug. 1, 2008)—United States District Court Northern District of Illinois—CM/ECF LIVE, Ver 3.2.3 (Chicago) Civil Docket for Case #: 1:08-cv-03301.
Corporate Disclosure Statement by Motorola, Inc. (Sidrys, Anne) (Entered: Aug. 1, 2008)—United States District Court Northern District of Illinois—CM/ECF LIVE, Ver 3.2.3 (Chicago) Civil Docket for Case #: 1:08-cv-03301.
Minute entry before the Honorable William J. Hibbler: Motion hearing held on Aug. 7, 2008 regarding motion to dismiss 21. Defendant's Motion to dismiss 21 is taken under advisement. Plaintiff to respond by Sep. 15, 2008. Defendant to reply by Oct. 14, 2008. Status hearing reset to Sep. 24, 2008 at 09:30 AM. Mailed notice (jdh) (Entered: Aug. 7, 2008)—United States District Court Northern District of Illinois—CM/ECF LIVE, Ver 3.2.3 (Chicago) Civil Docket for Case #: 1:08-cv-03301.
Transcript of Proceedings held on Aug. 7, 2008 before the Honorable William J. Hibbler. Court Reporter Contact Information: Alexandra Roth, (312) 408-5038, alexandra_roth@ilnd.uscourts.gov. Important: The transcript may be viewed at the court's public terminal or purchased through the Court Reporter/Transcriber before the deadline for Release of Transcript Restriction. After that date it may be obtained through the.
Minute entry before the Honorable William J. Hibbler: Pursuant to the stipulation, plaintiffs response to defendant's motion to dismiss 21 due by Sep. 19, 2008. Defendant's reply due by Oct. 17, 2008. Ruling by mail. Mailed notice (jdh) (Entered: Sep. 15, 2008)—United States District Court Northern District of Illinois—CM/ECF LIVE, Ver 3.2.3 (Chicago) Civil Docket for Case #: 1:08-cv-03301.
Motion by Plaintiff Memorylink Corp. for extension of time to file response/reply Unopposed Motion (Attachments: #1 Exhibit A) (Femal, Michael) (Entered: Sep. 19, 2008)—United States District Court Northern District of Illinois—CM/ECF LIVE, Ver 3.2.3 (Chicago) Civil Docket for Case #: 1:08-cv-03301.
Unopposed Notice of Motion by Michael J. Femal for presentment of motion for extension of time to file response/reply 28 before Honorable William J. Hibbler on Sep. 24, 2008 at 09:30 AM. (Femal, Michael) (Entered: Sep. 19, 2008)—United States District Court Northern District of Illinois—CM/ECF LIVE, Ver 3.2.3 (Chicago) Civil Docket for Case #: 1:08-cv-03301.
Report of Rule 26(f) Planning Meeting (Sidrys, Anne) (Entered: Sep. 23, 2008)—United States District Court Northern District of Illinois—CM/ECF LIVE, Ver 3.2.3 (Chicago) Civil Docket for Case #: 1:08-cv-03301.
Minute entry before the Honorable William J. Hibbler: Plaintiff's Unopposed Motion for extension of time to file response/reply regarding Motion by Defendant Motorola, Inc. to dismiss 21 28 is granted. Plaintiff's responses due by Sep. 24, 2008. Defendant's reply due by Oct. 27, 2008. Ruling by mail. Status hearing reset for Oct. 8, 2008 at 09:30 AM. Mailed notice (jdh) (Entered: Sep. 23, 2008)—United States District Court Northern District of Illinois—CM/ECF LIVE, Ver 3.2.3 (Chicago) Civil Docket for Case #: 1:08-cv-03301.
Motion by Plaintiff Memorylink Corp. for leave to file excess pages (Attachments: #1 Exhibit 1, #2 Exhibit 2) (Femal, Michael) (Entered: Sep. 24, 2008)—United States District Court Northern District of Illinois—CM/ECF LIVE, Ver 3.2.3 (Chicago) Civil Docket for Case #: 1:08-cv-03301.
Notice of Motion by Michael J. Femal for presentment of motion for leave to file excess pp. 32 before Honorable William J. Hibbler on Oct. 1, 2008 at 09:30 AM. (Femal, Michael) (Entered: Sep. 24, 2008)—United States District Court Northern District of Illinois—CM/ECF LIVE, Ver 3.2.3 (Chicago) Civil Docket for Case #: 1:08-cv-03301.
Minute entry before the Honorable William J. Hibbler: Plaintiff's Agreed Motion to file oversize brief instanter 32 is granted. Defendant's reply page limit is extended to 25 pages. Mailed notice (jdh) (Entered: Sep. 30, 2008)—United States District Court Northern District of Illinois—CM/ECF LIVE, Ver 3.2.3 (Chicago) Civil Docket for Case #: 1:08-cv-03301.
Response by Memorylink Corp. in Opposition to Motion by Defendant Motorola, Inc. to dismiss 21 (Femal, Michael) (Entered: Oct. 1, 2008)—United States District Court Northern District of Illinois—CM/ECF LIVE, Ver 3.2.3 (Chicago) Civil Docket for Case #: 1:08-cv-03301.
Minute entry before the Honorable William J. Hibbler: Status hearing held and continued to Nov. 19, 2008 at 9:30 a.m. Defendant's oral motion to stay discovery pending ruling on motion to dismiss is denied. Limited discovery to proceed, the Court will further consider stay request after reviewing fully briefed motion to dismiss. (ar,) (Entered: Oct. 15, 2008)—United States District Court Northern District of Illinois—CM/ECF LIVE, Ver 3.2.3 (Chicago) Civil Docket for Case #: 1:08-cv-03301.
Transcript of Proceedings held on Oct. 8, 2008 before the Honorable William J. Hibbler. Court Reporter Contact Information: Alexandra Roth, (312) 408-5038, alexandra_roth@ilnd.uscourts.gov. Important: The transcript may be viewed at the court's public terminal or purchased through the Court Reporter/Transcriber before the deadline for Release of Transcript Restriction. After that date it may be obtained through the.
Reply Memorandum by Defendant Motorola, Inc., in support of its motion to dismiss 21: (Attachments: #(1) Exhibit A). (Sidrys, Anne). (Text edited by Clerk's Office.) Modified on Oct. 28, 2008 (ar,). (Entered: Oct. 27, 2008)—United States District Court Northern District of Illinois—CM/ECF LIVE, Ver 3.2.3 (Chicago) Civil Docket for Case #: 1:08-cv-03301.
Minute entry before the Honorable William J. Hibbler: Status hearing held on Nov. 19, 2008 and continued to Jan. 7, 2009 at 09:30 AM. Defendant's request to stay pending disposition of the motion to dismiss is denied. Mailed notice (jdh) (Entered: Nov. 19, 2008)—United States District Court Northern District of Illinois—CM/ECF LIVE, Ver 3.2.3 (Chicago) Civil Docket for Case #: 1:08-cv-03301.
Transcript of Proceedings held on Nov. 19, 2008 before the Honorable William J. Hibbler. Court Reporter Contact Information: Alexandra Roth, (312) 408-5038, alexandra_roth@ilnd.uscourts. gov. Important: The transcript may be viewed at the court's public terminal or purchased through the Court Reporter/Transcriber before the deadline for Release of Transcript Restriction. After that date it may be obtained through the.
Motion by Defendant Motorola, Inc. to supplement Memorandum in Support of Motion to Dismiss (Attachments: #1 Exhibit Motorola's Supplemental Memorandum in Support of Motion to Dismiss) (Sidrys, Anne) (Entered: Jan. 7, 2009)—United States District Court Northern District of Illinois—CM/ECF Live, Ver 3.2.3 (Chicago) Civil Docket for Case #: 1:08-cv-03301.
Notice of Motion by Anne J. Sidrys for presentment of motion to supplement 41 before Honorable William J. Hibbler on Jan. 13, 2009 at 09:30 AM. (Sidrys, Anne) (Entered: Jan. 7, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Status hearing held on Jan. 7, 2009 and continued to Feb. 24, 2009 at 9:30 AM. Defendant's Motion for leave to file supplemental memorandum in support of its motion to dismiss 41 is taken under advisement. Plaintiff to file a responses opposing leave to file and contesting applicability of filing on the merit, not to exceed 7 pages, by Jan. 20, 2009. Ruling my mail. Mailed notice (jdh) (Entered: Jan. 7, 2009)—United States District Court Northern District of Illinois—CM/ECF LIVE, Ver 3.2.3 (Chicago) Civil Docket for Case #: 1:08-cv-03301.
Response by Plaintiff Memorylink Corp. to motion to supplement 41 and response to supplemental memorandum (Attachments: #1 Exhibit A, #2 Exhibit B, #3 Exhibit C, #4 Exhibit D, #5 Exhibit E) (Femal,Michael) (Entered: Jan. 20, 2009)—United States District Court Northern District of Illinois—CM/ECF LIVE, Ver 3.2.3 (Chicago) Civil Docket For Case #: 1:08-cv-03301.
Reply Memorandum by Defendant, Motorola, Inc., in support of its motion for leave file supplemental response 41 and supplemental reply memorandum in support of its motion to dismiss 23. (Sidrys, Anne). (Text edited by Clerk's Office.) Modified on Jan. 26, 2009 (ar,). (Entered: Jan. 22, 2009)—United States District Court Northern District of Illinois—CM/ECF LIVE, Ver 3.2.3 (Chicago) Civil Docket for Case #: 1:08-cv-03301.
Motion by Plaintiff to file instanter Sur-Reply in Opposition to Motorola's Motion for Leave to File Supplemental Memorandum and Motorola's Supplemental Memorandum in Support of Its Motion to Dismiss Instanter: (Attachments:#(1) Exhibit A, #(2) Exhibit 1, #(3) Exhibit 2). (Berk, Peter). (Text edited by Clerk's Office). Modified on Jan. 27, 2009 (ar,) (Entered: Jan. 23, 2009)—United States District Court Northern District of Illinois—CM/ECF LIVE, Ver 3.2.3 (Chicago) Civil Docket for Case #: 1:08-cv-03301.
Notice of Motion by Peter Todd Berk for presentment of motion to file instanter 46 before Honorable William J. Hibbler on Jan. 29, 2009 at 09:30 AM. (Berk, Peter) (Entered: Jan. 23, 2009)—United States District Court Northern District of Illinois—CM/ECF LIVE, Ver 3.2.3 (Chicago) Civil Docket for Case #: 1:08-cv-03301.
Attorney Appearance for Defendant Motorola, Inc. by Joel R. Merkin (Merkin, Joel) (Entered: Jan. 27, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Defendant's Motion for leave to file supplemental memorandum in support of motion to dismiss 41 is denied. The Court advised the parties at the Jan. 7, 2009 hearing that no reply was needed by the Court. Plaintiffs Motion to file sur-reply in opposition to defendant's motion for leave to file supplemental memorandum 46 is denied as a result of the Court's ruling on defendant's motion to file supplemental memo and reply. Ruling on the motion to dismiss by mail. Mailed notice (jdh) (Entered: Jan. 28, 2009)—United States.
Motion by Plaintiff Memorylink Corp., Defendant Motorola, Inc. for protective order Joint (Attachments: #1 Exhibit 1, #2 Exhibit 2, #3 Exhibit 3, #4 Exhibit 4) (Berk, Peter) (Entered: Feb. 4, 2009)—United States District Court Northern District of Illinois—CM/ECF LIVE, Ver 3.2.3 (Chicago) Civil Docket for Case #: 1:08-cv-03301.
Notice of Motion by Peter Todd Berk for presentment of motion for protective order 50 before Honorable William J. Hibbler on Feb. 10, 2009 at 09:30 AM. (Berk, Peter) (Entered: Feb. 4, 2009)—United States District Court Northern District of Illinois—CM/ECF LIVE, Ver 3.2.3 (Chicago) Civil Docket for Case #: 1:08-cv-03301.
Motion by Defendant Motorola, Inc. for extension of time to respond to amended counts (Agreed Motion) (Attachments: #1 Exhibit Proposed Agreed Order) (Sidrys, Anne) (EnteredL Dec. 22, 2009)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of extension of time 102 before Honorable William J. Hibler on Dec. 31, 2009 at 09:30 AM. (Sidrys, Anne) (Entered: Dec. 22, 2009)—United States District Court Northern District of Illinois—CM/ECF LIVE, Ver 3.2.3 (Chicago) Civil Docket for Case #: 1:08-cv-03301.
Minute entry before Honorable William J. Hibbler: Defendant's Agreed Motion for extension of time until Jan. 11, 2010 to respond to the amended counts to Memorylink's complaint 102 is granted. Mailed notice (jdh) (Entered: Jan. 7, 2010)—United States District Court Northern District of Illinois—CM/ECF Live, Ver 3.2.3 (Chicago) Civil Docket for Case #: 1:08-cv-03301.
Response by Plaintiff Memorylink Corp. in Opposition of Motion to Reassign (Schaafsma, Paul) Modified on Jan. 11, 2010 (ber,).

(Entered: Jan. 8, 2010)—United States District Court Northern District of Illinois—CM/ECF LIVE, Ver 3.2.3 (Chicago) Civil Docket for Case #: 1:08-cv-03301.
Motorola Inc.'s Answer to amended complaint by Motorola, Inc. (Sidrys, Anne) (Entered: Jan. 11, 2010)—United States District Court Northern District of Illinois—CM/ECF LIVE, Ver 3.2.3 (Chicago) Civil Docket for Case #: 1:08-cv-03301.
Motion by Defendant Motorola, Inc. for judgment on the pleadings with respect to counts IX, X, XVII-XX, and XXIII-XXVI (Sidrys, Anne) (Entered: Jan. 11, 2010)—United States District Court Northern District of Illinois—CM/ECF Live, Ver 3.2.3 (Chicago) Civil Docket for Case #: 1:08-cv-03301.
Notice of Motion by Anne J. Sidrys for presentment of motion for judgment on the pleadings 107 before Honorable William J. Hibbler on Jan. 14, 2010 at 09:30 AM. (Sidrys, Anne) (Entered: Jan. 11, 2010)—United States District Court Northern District of Illinois—CM/ECF LIVE, Ver 3.2.3 (Chicago) Civil Docket for Case #: 1:08-cv-03301.
Memorandum by Motorola, Inc. in support of motion for judgment on the pleadings 107 (Sidrys, Anne) (Entered: Jan. 11, 2010)—United States District Court Northern District of Illinois—CM/ECF LIVE, Ver 3.2.3 (Chicago) Civil Docket for Case #: 1:08-cv-03301.
Minute entry before Honorable William J. Hibbler: Motion hearing held on Jan. 14, 2010 regarding motion for judgment on the pleadings 107. Defendant's Renewed Motion for judgment on the pleadings 107 is taken under advisement. Plaintiff to respond by Feb. 5, 2010. Defendant to reply by Feb. 19, 2010. Ruling by mail. Status hearing set for Mar. 23, 2010 at 9:30 AM. Mailed notice (jdh) (Entered: Jan. 20, 2010)—United States District Court Northern District of Illinois—CM/ECF LIVE, Ver 3.2.3 (Chicago) Civil Docket for Case #: 1:08-cv-03301.
Reply by Defendant Motorola, Inc. to motion to reassign case 97 (Attachments: #1 Exhibit A, #2 Exhibit B, #3 Exhibit C) (Sidrys, Anne) (Entered: Jan. 22, 2010)—United States District Court Northern District of Illinois—CM/ECF LIVE, Ver 3.2.3 (Chicago) Civil Docket for Case #: 1:08-cv-03301.
Response by Memorylink Corp. in Opposition to Motion by Defendant Motorola, Inc. for judgment on the pleadings with respect to counts IV, X, XVII-XX, and XXIII-XXVI 107 (Attachments: #1 Exhibit A, #2 Exhibit B, #3 Exhibit C) (Femal, Michael) (Entered: Feb. 5, 2010)—United States District Court Northern District of Illinois—CM/ECF LIVE, Ver 3.2.3 (Chicago) Civil Docket for Case #: 1:08-cv-03301.
Reply by Defendant Motorola, Inc. to response in opposition to motion, 113 for judgment on the pleadings with respect to counts IX, X, XVII-XX, and XXIII-XXVI (Attachments: #1 Exhibit A) (Sidrys, Anne) (Entered: Feb. 19, 2010)—United States District Court Northern District of Illinois—CM/ECF LIVE, Ver 3.2.3 (Chicago) Civil Docket for Case #: 1:08-cv-03301.
Motion by Defendant Motorola, Inc. to compel Discovery Responses from Memorylink Corp. (Sidrys, Anne) (Entered:Feb. 4, 2009)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion to compel 52 before Honorable William J. Hibbler on Feb. 10, 2009 at 09:30 AM. (Sidrys, Anne) (Entered: Feb. 4, 2009)—United States District Court Northern District of Illinois—CM/ECF LIVE, Ver 3.2.3 (Chicago) Civil Docket for Case #: 1:08-cv-03301.
Memorandum by Motorola, Inc. in support of motion to compel 52 Discovery Responses from Memorylink Corp.(Attachments: #1 Exhibit 1, #2 Exhibit 2) (Sidrys, Anne) (Entered: Feb. 4, 2009)—United States District Court Northern District of Illinois—CM/ECF LIVE, Ver 3.2.3 (Chicago) Civil Docket for Case #: 1:08-cv-03301. Entered in error. (ar,). Modified on Feb. 11, 2009 (ar,). (Entered: Feb. 11, 2009)—United States District Court Northern District of Illinois—CM/ECF LIVE, Ver 3.2.3 (Chicago) Civil Docket for Case #: 1:08-cv-03301.
Notice of Correction regarding docket entry No. 55. (ar,) (Entered: Feb. 11, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Motion hearing held. Court having ruled on the contested portions, the joint motion for entry of protective order is granted a stated in open court 50. Parties to submit a joint protective order to the Court for entry consistent with the ruling by Feb. 20, 2009. Defendant's motion to compel discovery responses from Memorylink Corp. is granted as stated in open court 52. (ar,) (Entered: Feb. 11, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Enter Memorandum Opinion and Order. Motorola's motion to dismiss 21 is granted in part and denied in part. (for further detail see separate order.) (ar,) (Entered: Feb. 24, 2009)—United States District Court Northern District of Illinois—CM/ECF LIVE, Ver 3.2.3 (Chicago) Civil Docket for Case #: 1:08-cv-03301.
Memorandum Opinion and Order, signed by the Honorable William J. Hibbler on Feb. 23, 2009 58. (ar,) (Entered: Feb. 24, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Status hearing held and continued to Apr. 9, 2009 at 09:30 AM. Enter Protective Order. The Protective Order governs pre-trial proceedings only Parties need leave of court prior to filing any documents under seal. Parties to file a motion to retrieve any documents filed under seal within 60 days after the close of this case. If a party fails to file a motion, any documents under seal will become part of the public record. (For further detail see separate order.) (ar,) (Entered: Feb. 26, 2009)—United States District Court Northern District of.
Protective Order, signed by the Honorable William J. Hibbler on Feb. 24, 2009 60. (ar,) (Entered: Feb. 26, 2009)—United States District Court Northern District of Illinois—CM/ECF LIVE, Ver 32.3 (Chicago) Civil Docket for Case #: 1:08-cv-03301.
Transcript of Proceedings held on Jan. 7, 2009 before the Honorable William J. Hibbler. Court Reporter Contact Information: Alexandra Roth, (312) 408-5038, alexandra_roth@ilnd.uscourts.gov. Important: The transcript may be viewed at the courts public terminal or purchased through the Court Reporter/Transcriber before the deadline for Release of Transcript Restriction. After that date it may be obtained through the.
Transcript of Proceedings held on Feb. 10, 2009 before the Honorable William J. Hibbler. Court Reporter Contact Information: Alexandra Roth, (312) 408-5038, alexandra_roth@ilnd.uscourts.gov. Important: The transcript may be viewed at the court's public terminal or purchased through the Court Reporter/Transcriber before the deadline for Release of Transcript Restriction. After that date it may be obtained through the.
Motion by Plaintiff Memorylink Corp. for extension of time to file any Motions related to the Court's Ruling on Motorola's Motion to Dismiss (Berk, Peter) (Entered: Mar. 5, 2009)—United States District Court Northern District of Illinois—CM/ECF LIVE, Ver 3.2.3 (Chicago) Civil Docket for Case #: 1:08-cv-03301.
Notice of Motion by Peter Todd Berk for presentment of motion for extension of time to file 64 before Honorable William J. Hibbler on Mar. 11, 2009 at 09:30 AM. (Berk, Peter) (Entered: Mar. 5, 2009)—United States District Court Northern District of Illinois—CM/ECF LIVE, Ver 3.2.3 (Chicago) Civil Docket for Case #: 1:08-cv-03301.
Motorola Inc.'s Answer to Complaint with Jury Demand by Motorola, Inc. (Sidrys, Anne) (Entered: Mar. 9, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Motion hearing held on Mar. 11, 2009 regarding motion for extension of time to file 64. Plaintiffs Motion to extend time until Mar. 25, 2009 to file any motions related to the Court's ruling on defendant's motion to dismiss 64 is granted. Mailed notice (jdh) (Entered: Mar. 11, 2009)—United States District Court Northern District of Illinois—CM/ECF LIVE, Ver 3.2.3 (Chicago) Civil Docket for Case #: 1:08-cv-03301.
Motion by Plaintiff Memorylink Corp. for extension of time (Femal, Michael) (Entered: Mar. 25, 2009)—United States District Court Northern District of Illinois—CM/ECF LIVE, Ver 3.2.3 (Chicago) Civil Docket for Case #: 1:08-cv-03301.
Notice of Motion by Michael J. Femal for presentment of extension of time 68 before Honorable William J. Hibbler on Mar. 31, 2009 at 09:30 AM. (Femal, Michael) (Entered: Mar. 25, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Plaintiffs Motion to extend time to Apr. 3, 2009 to file any motions relating to the Court's ruling on Motorola's motion to dismiss 68 is granted. Mailed notice (jdh) (Entered: Mar. 30, 2009)—United States District Court Northern District of Illinois—CM/ECF LIVE, Ver 3.2.3 (Chicago) Civil Docket for Case #: 1:08-cv-03301.
Motion by Plaintiff Memorylink Corp. for reconsideration regarding memorandum opinion and order 59 or in the alternative, leave to file an amended complaint (Femal, Michael) (Entered: Apr. 3, 2009)—United States District Court Northern District of Illinois—CM/ECF LIVE, Ver 3.2.3 (Chicago) Civil Docket for Case #: 1:08-cv-03301.
Memorandum by Memorylink Corp. in support of motion for reconsideration, motion for relief 71 or in the alternative, leave to file an amended complaint (Attachments: #1 Exhibit A) (Femal, Michael) (Entered: Apr. 3, 2009)—United States District Court Northern District of Illinois—CM/ECF LIVE, Ver 3.2.3 (Chicago) Civil Docket for Case #: 1:08-cv-03301.
Notice of Motion by Michael J. Femal for presentment of motion for reconsideration, motion for relief 71 before Honorable William J. Hibbler on Apr. 9, 2009 at 09:30 AM. (Femal, Michael) (Entered: Apr. 3, 2009)—United States District Court Northern District of Illinois—CM/ECF LIVE, Ver 3.2.3 (Chicago) Civil Docket for Case #: 1:08-cv-03301.
Notice by Jess M. Krannich of Change of Address (Krannich, Jess) (Entered: Apr. 8, 2009)—United States District Court Northern District of Illinois—CM/ECF LIVE, Ver 3.2.3 (Chicago) Civil Docket for Case #: 1:08-cv-03301.
Notice by Nyika Onyesi Strickland of Change of Address (Strickland, Nyika) (Entered: Apr. 9, 2009)—United States District Court Northern District of Illinois—CM/ECF LIVE, Ver 3.2.3 (Chicago) Civil Docket for Case #: 1:08-cv-03301.
Notice by Joel R. Merkin of Change of Address (Merkin, Joel) (Entered: Apr. 9, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Status hearing held on Apr. 9, 2009. Plaintiffs Motion for reconsideration 71 is taken under advisement. Defendant to respond to Apr. 23, 2009. Plaintiff to reply by May 7, 2009. Ruling by mail. Mailed notice (jdh) (Entered: Apr. 9, 2009)—United States District Court Northern District of Illinois—CM/ECF LIVE, Ver 3.2.3 (Chicago) Civil Docket for Case #: 1:08-cv-03301.
Notice by Mark J. Nomellini of Change of Address (Nomellini, Mark) (Entered: Apr. 9, 2009)—United States District Court Northern District of Illinois—CM/ECF LIVE, Ver. 3.2.3 (Chicago) Civil Docket For Case #: 1:08-cv-03301.
Notice by Anne J. Sidrys of Change of Address (Sidrys, Anne) (Entered: Apr. 9, 2009)—United States District Court Northern District of Illinois—CM/ECF LIVE, Ver 3.2.3 (Chicago) Civil Docket for Case #: 1:08-cv-03301.
Transcript of Proceedings held on Feb. 24, 2009 before the Honorable William J. Hibbler. Court Reporter Contact Information: Alexandra Roth, (312) 408-5038 alexandra_roth@ilnd.uscourts.gov. Important: The transcript may be viewed at the courts public terminal or purchased through the Court Reporter/Transcriber before the deadline for Release of Transcript Restriction. After that date it may be obtained through the.
Response in Opposition by Defendant Motorola, Inc., to Memorylink's motion for reconsideration or, in the alternative, leave to file an amended complaint 71. (Sidrys, Anne). (Text edited by Clerk's Office.) Modified on May 1, 2009 (ar,). (Entered: Apr. 23, 2009)—United States District Court Northern District of Illinois—CM/ECF LIVE, Ver 3.2.3 (Chicago) Civil Docket For Case #: 1:08-cv-03301.
Reply by Plaintiff Memorylink Corp. in Support of its Motion for Reconsideration or in the Alternative to File an Amended Complaint (Attachments: #1 Exhibit A) (Femal, Michael) (Entered: May 7, 2009)—United States District Court Northern District of Illinois—CM/ECF LIVE, Ver 3.2.3 (Chicago) Civil Docket For Case #: 1:08-cv-03301.

Transcript of Proceedings held on Feb. 24, 2009 before the Honorable William J. Hibbler. Court Report Contact Information: Alexandra Roth, 312-408-5038, alexandra_roth@ilnd.uscourts.gov. Important: The transcript may be viewed at the court's public terminal or purchased through the Court Reporter/Transcriber before the deadline for Release of Transcript Restriction. After that date it may be obtained through the.
Motion by Plaintiff Memorylink Corp. motion to cite a recently decided authority (Attachments: #1 Exhibit A) (Femal, Michael) (Entered: Sep. 10, 2009)—United States District Court Northern District of Illinois—CM/ECF LIVE, Ver 3.2.3 (Chicago) Civil Docket For Case 190 : 1:08-cv-03301.
Notice of Motion by Michael J. Femal for presentment of motion for miscellaneous relief 84 before Honorable William J. Hibbler on Sep. 16, 2009 at 09:30 AM. (Femal, Michael) (Entered: Sep. 10, 2009)—United States District Court Northern District of Illinois—CM/ECF LIVE, Ver 3.2.3 (Chicago) Civil Docket for Case #: 1:08-cv-03301.
Response to Motorola, Inc. to Motion by Plaintiff Memorylink Corp. motion to cite a recently decided authority 84 (Sidrys, Anne) (Entered: Sep. 15, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Motion hearing held on Sep. 16, 2009 regarding motion for miscellaneous relief 84. Plaintiff's Motion to cite a recently decided authority 84 is granted for the reasons stated in open court. Mailed notice (jdh) (Entered: Sep. 17, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Enter Memorandum Opinion and Order. The Court Grants Plaintiff's motion for reconsideration 71 in part and Denies it in part. Counts I, III, IV, V and VI of Memorylink's complaint remain as originally drafted. Counts VII-XII and XVII-XX remain insofar as they are based on the '938 Patent. In addition, the Court gives Plaintiff leave until Oct. 29, 2009 to file an amended complaint in order to include a count alleging breach of contract. Defendant has until Nov. 12, 2009 to respond. Status is set for.
Memorandum Opinion and Order Signed by the Honorable William J. Hibbler on Oct. 15, 2009. (ber,) (Entered: Oct. 19, 2009)—United States District Court Northern District of Illinois—CM/ECF LIVE, Ver 3.2.3 (Chicago) Civil Docket for Case #: 1:08-cv-03301.
Amended complaint by Memorylink Corp. against all defendants (Femal, Michael) (Entered: Oct. 29, 2009)—United States District Court Northern District of Illinois—CM/ECF LIVE, Ver 32.3 (Chicago) Civil Docket for Case #: 1:08-cv-03301.
Answer to amended complaint by Motorola, Inc. (Sidrys, Anne) (Entered: Nov. 12, 2009)—United States District Court Northern District of Illinois—CM/ECF LIVE, Ver 3.2.3 (Chicago) Civil Docket for Case #: 1:08-cv-03301.
Motion by Defendant Motorola, Inc. for judgment on the pleadings with respect to counts III, IV, IX, X and XVII-XXI (Sidrys, Anne) (Entered: Nov. 12, 2009)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion for judgment on the pleadings 92 before Honorable William J. Hibbler on Nov. 18, 2009 at 09:30 AM. (Sidrys, Anne) (Entered: Nov. 12, 2009)—United States District Court Northern District of Illinois—CM/ECF LIVE, Ver 3.2.3 (Chicago) Civil Docket for Case #: 1:08-cv-03301.
Memorandum by Motorola, Inc. in support of motion for judgment on the pleadings 92 with respect to counts III, IV, IX, X, and XVII-XXI (Sidrys, Anne) (Entered: Nov. 12, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Motion hearing held. Hearing held on defendant's motion for judgment on the pleadings 92. The Court will rule on the oral arguments. Mailed notice (mmm,) (Entered: Nov. 19, 2009)—United States District Court Northern District of Illinois—CM/ECF LIVE, Ver 3.2.3 (Chicago) Civil Docket for Case #: 1:08-cv-03301.

Minute entry before the Honorable William J. Hibbler: Status hearing date of Dec. 1, 2009 at 09:30 a.m. is vacated pending disposition of the motion for judgment on the pleadings. Mailed notice (jdh) (Entered: Nov. 30, 2009)—United States District Court Northern District of Illinois—CM/ECF LIVE, Ver 3.2.3 (Chicago) Civil Docket for Case #: 1:08-cv-03301.
Motion by Defendant Motorola, Inc. to reassign case No. 09-cv-7401 (Attachments: #1 Exhibit A, #2 Exhibit B) (Sidrys,Anne) (Entered: Dec. 2, 2009)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion to reassign case 97 before Honorable William J. Hibbler on Dec. 8, 2009 at 09:30 AM. (Sidrys, Anne) (Entered: Dec. 2, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: The Court Denies Defendant's motion for judgment on the pleadings 92 with prejudice as to Courts III and IV and without prejudice as to Counts IX, X, and XVII-XXI. The Court gives Plaintiff leave to file an amended complaint by Dec. 21, 2009, taking Defendant's objections to those counts into account. [For further details see minute order.] Mailed notice (ber,) (Entered: Dec. 9, 2009)—United States District Court Northern District of Illinois—CM/ECF LIVE, Ver 3.2.3 (Chicago) Civil Docket for Case #: 1:08-cv-03301.
Minute entry before the Honorable William J. Hibbler: Motion hearing held on Dec. 8, 2009 regarding motion to reassign case 97. Defendant's Motion to reassign case 97 is taken under advisement. Plaintiff to respond by Jan. 8, 2010. Defendant's reply due by Jan. 22, 2010. Ruling by mail. Mailed notice (jdh) (Entered: Dec. 9, 2009)—United States District Court Northern District of Illinois—CM/ECF LIVE, Ver 3.2.3 (Chicago) Civil Docket for Case #: 1:08-cv-03301.
Amended complaint by Memorylink Corp. against Motorola, Inc. (Femal, Michael) (Entered: Dec. 21, 2009) Reply by Thomas G Berry, Terri S. Hughes, Jonathan P. Meyer, Motorola Inc, J. Ray Wood to memorandum in opposition to motion, 24 (Attachments: #1 Exhibit A, #2 Exhibit B) (Sidrys, Anne) (Entered: Jan. 29, 2010)—United States District Court Northern District of Illinois—CM/ECF LIVE, Ver 3.2.3 (Chicago) Civil Docket for Case #: 1:08-cv-03301.
Docket Report for United States District Court Northern District of Illinois—CM/ECF LIVE, Ver 4.2 (Chicago) Civil Docket Case for Case #: 1:08-cv-03301, 22pp, printed on Mar. 22, 2011 from https://ecf.ilnd.uscourts.gov/cg-bin/DktRpt.pl.
Minute entry before Honorable William J. Hibbler: On the Court's own motion, the status hearing is reset to Apr. 8, 2010 at 9:30 AM. Mailed notice (jdh) (Entered: Mar. 22, 2010)—United States District Court Northern District of Illinois—CM/ECF LIVE, Ver 3.2.3 (Chicago) Civil Docket for Case #: 1:08-cv-03301.
Minute entry before Honorable William J. Hibbler: The Court Grants Defendant's renewed motion for judgement on the pleadings 107 as to Courts IX, X, and XVII-XX, but Denies it as to Counts XXIII-XXVI. The Court Grants Defendant's motion for reassignment 97. Mailed notice [for further details see minute order.] (ea,) (Entered: Apr. 9, 2010)—United States District Court Northern District of Illinois—CM/ECF Live, Ver 3.2.3 (Chicago) Civil Docket for Case #: 1:08-cv-03301.
Minute entry before Honorable William J. Hibbler: Status hearing held on Apr. 8, 2010 and continued to Apr. 29, 2010 at 9:30.AM. Parties to submit revised joint discovery schedule to the Court by Apr. 27, 2010. Mailed notice (jdh) (Entered: Apr. 13, 2010—United States District Court Northern District of Illinois—CM/ECF LIVE, Ver 3.2.3 (Chicago) Civil Docket for Case #: 1:08-cv-03301.
Motion by Defendant Motorola, Inc. to consolidate cases 08-cv-3301 & 09-cv-7401 (Sidrys, Anne) (Entered: Apr. 26, 2010)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion to consolidate cases 118 before Honorable William J. Hibbler on Apr. 29, 2010 at 09:30 AM. (Sidrys, Anne) (Entered: Apr. 26, 2010)—United States District Court Northern District of Illinois—CM/ECF LIVE, Ver 3.2.3 (Chicago) Civil Docket for Case #: 1:08-cv-03301.
Memorandum by Motorola, Inc. in support of motion to consolidate cases 118 (Sidrys, Anne) (Entered: Apr. 26, 2010)—United States District Court Northern District of Illinois—CM/ECF LIVE, Ver 3.2.3 (Chicago) Civil Docket for Case #: 1:08-cv-03301.
Report of Rule 26(f) Planning Meeting (Sidrys, Anne) (Entered: Apr. 27, 2010)—United States District Court Northern District of Illinois—CM/ECF LIVE, Ver 3.2.3 (Chicago) Civil Docket for Case #: 1:08-cv-03301.
Amended Answer by Motorola, Inc. to Memorylink Corp.'s Second amended complaint 101 (Sidrys, Anne) (Entered: Apr. 28, 2010)—United States District Court Northern District of Illinois—CM/ECF LIVE, Ver 3.2.3 (Chicago) Civil Docket for Case #: 1:08-cv-03301.
Minute entry before Honorable William J. Hibbler: Status hearing held and continued to May 6, 2010 at 9:30 a.m. to set discovery schedule. Defendant's motion for consolidation is granted for discovery purposes only, the Court holds in abeyance the request for consolidation for trial. Mailed notice (ber,) (Entered: May 3, 2010)—United States District Court Northern District of Illinois—CM/ECF LIVE, Ver 3.2.3 (Chicago) Civil Docket for Case #: 1:08-cv-03301.
Minute entry before Honorable William J. Hibbler: Status hearing held on May 6, 2010 and continued to Aug. 4, 2010 at 9:30 AM. The Court adopts Motorola's discovery schedule. Parties equally given leave to increase interrogatories by 15. The number of depositions are limited to 20 and limited to 8 hours. Plaintiff to respond to outstanding written discovery interrogatories by May 10, 2010. Defendant to file any motions to stay any discovery by May 27, 2010. Mailed notice (jdh) (Entered: May 12, 2010)—United States District Court Northern District of Illinois—CM/ECF LIVE, Ver 3.2.3 (Chicago).
Motion by Plaintiff Memorylink Corp., Defendant Motorola, Inc. for order Regarding Consent to Magistrate Judge Nolan for Discovery Supervision (Sidrys, Anne) (Entered: May 20, 2010)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion for orders 125 before Honorable William J. Hibbler on May 25, 2010 at 09:30 AM. (Sidrys, Anne) (Entered: May 20, 2010)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion for order 125 before Honorable William J. Hibbler on Jun. 3, 2010 at 09:30 AM. (Sidrys, Anne) (Entered: May 27, 2010)—United States District Court Northern District of Illinois—CM/ECF LIVE, Ver 3.2.3 (Chicago) Civil Docket for Case #: 1:08-cv-03301.
Motion by Defendant Motorola, Inc. to stay Infringement Discovery (Attachments: #1 Exhibit A, #2 Exhibit B) (Sidrys, Anne) (Entered: May 27, 2010)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion to stay 128 before Honorable William J. Hibbler on Jun. 3, 2010 at 09:30 AM. (Sidrys, Anne) (Entered: May 27, 2010)—United States District Court Northern District of Illinois—CM/ECF LIVE, Ver 3.2.3 (Chicago) Civil Docket for Case #: 1:08-cv-03301.
Memorandum by Motorola, Inc. in support of motion to stay 128 Infringement Discovery (Attachments: #1 Exhibit A, #2 Exhibit B) (Sidrys, Anne) (Entered: May 27, 2010)—United States District Court Northern District of Illinois—CM/ECF LIVE, Ver 3.2.3 (Chicago) Civil Docket for Case #: 1:08-cv-03301.
Motion by Defendant Motorola, Inc. to compel Memorylink to Comply with Local Patent Rule 2.2 (Sidrys, Anne) (Entered: Jun. 1, 2010)—United States District Court Northern District of Illinois—CM/ECF Live, Ver 3.2.3 (Chicago) Civil Docket for Case #: 1:08-cv-03301.
Notice of Motion by Anne J. Sidrys for presentment of motion to compel 131 before Honorable William J. Hibbler on Jun. 8, 2010 at 09:30 AM. (Sidrys, Anne) (Entered: Jun. 1, 2010)—United States District Court Northern District of Illinois—CM/ECF LIVE, Ver 3.2.3 (Chicago) Civil Docket for Case #: 1:08-cv-03301.
Memorandum by Motorola, Inc. in support of motion to compel 131 (Attachments: #1 Exhibit A, #2 Exhibit B) (Sidrys, Anne) (Entered: Jun. 1, 2010)—United States District Court Northern District of Illinois—CM/ECF LIVE, Ver 3.2.3 (Chicago) Civil Docket for Case #: 1:08-cv-03301.
Minute entry before Honorable William J. Hibbler: Motion hearing held on Jun. 3, 2010 regarding motion for order 125, motion to stay 128, motion to compel 131. Joint Motion for entry of agreed order regarding consent to Magistrate Judge Nolan for discovery supervision 125 is granted. Defendant's Motion to stay infringement discovery 128 is granted as stated in open court. The discovery shall be prioritized. Defendant's Motion to compel 131 is stricken without prejudice as stated in open court. Mailed notice (jdh) (Entered: Jun. 8, 2010)—United States District Court.

Pursuant to Local Rule 72.1, this case is hereby referred to the calendar of Honorable Nan R. Nolan for the purpose of holding proceedings related to: discovery supervision (jdh) Mailed notice. (Entered: Jun. 8, 2010)—United States District Court Northern District of Illinois—CM/ECF LIVE, Ver 3.2.3 (Chicago) Civil Docket for Case #: 1:08-cv-03301.

Motion by Defendant Motorola, Inc. to compel the deposition of Robert Kniskern (Attachments: #1 Exhibit A, #2 Exhibit B, #3 Exhibit C) (Sidrys, Anne) (Entered: Jun. 7, 2010)—United States District Court Northern District of Illinois—CM/ECF LIVE, Ver 3.2.3 (Chicago) Civil Docket for Case #: 1:08-cv-03301.

Notice of Motion of Anne J. Sidrys for presentment of motion to compel 134 before Honorable William J. Hibbler on Jun. 10, 2010 at 09:30 AM. (Sidrys, Anne) (Entered: Jun. 7, 2010)—United States District Court Northern District of Illinois—CM/ECF LIVE, Ver 3.2.3 (Chicago) Civil Docket for Case #: 1:08-cv-03301.

Motion by Defendant Motorola, Inc. to amend/correct Protective Order (Attachments: #1 Exhibit A, #2 Exhibit B, #3 Exhibit C, #4 Exhibit D) (Sidrys, Anne) (Entered: Jun. 7, 2010)—United States District Court Northern District of Illinois—CM/ECF LIVE, Ver 3.2.3 (Chicago) Civil Docket for Case #: 1:08-cv-03301.

Notice of Motion by Anne J. Sidrys for presentment of motion to amend/correct 136 before Honorable William J. Hibbler on Jun. 10, 2010 at 09:30 AM. (Sidrys, Anne) (Entered: Jun. 7, 2010)—United States District Court Northern District of Illinois—CM/ECF LIVE, Ver 3.2.3 (Chicago) Civil Docket for Case #: 1:08-cv-03301.

Entered Judgment. (ber,) (Entered: Aug. 12, 2010)—United States District Court Northern District of Illinois—CM/ECF LIVE, Ver 3.2.3 (Chicago) Civil Docket for Case #: 1:09-cv-07401.

Minute entry before Honorable Nan R. Nolan: For the reasons stated in the Memorandum Opinion and Order entered this day, non-party NovusIP's Motion to Quash Subpoena 141 is granted in part and denied in part. [For further detail see separate order(s).] Notices mailed by Judicial staff. Mailed notice (lxs,) (Entered: Aug. 9, 2010)—United States District Court Northern District of Illinois—CM/ECF Live, Ver 3.2.3 (Chicago) Civil Docket for Case #: 1:09-cv-07401.

Memorandum Opinion and Order Signed by the Honorable Nan R. Nolan on Aug. 6, 2010. Mailed notice (lxs,) (Entered: Aug. 9, 2010)—United States District Court Northern District of Illinois—CM/ECF LIVE, Ver 3.2.3 (Chicago) Civil Docket for Case #: 1:09-cv-07401.

Minute entry before Honorable Nan R. Nolan: Telephone status hearing set for Aug. 12, 2010 at 01:30 PM. Mailed notice (lxs,) (Entered: Aug. 12, 2010)—United States District Court Northern District of Illinois—CM/ECF LIVE, Ver 3.2.3 (Chicago) Civil Docket for Case #: 1:09-cv-07401.

Minute entry before Honorable Nan Nolan: Telephone Magistrate Judge Status hearing held on Aug. 13, 2010. Mailed notice. (is,) (Entered: Aug. 13, 2010)—United States District Court Northern District of Illinois—CM/ECF LIVE, Ver 3.2.3 (Chicago) Civil Docket for Case #: 1:09-cv-07401.

Motion by Plaintiff Memorylink Corp. to amend/correct Motion for Correction or Modification of the Record Pursuant to Federal Rules of Appellate Procedure 10(e), (Attachments: #1 Exhibit A—Infringement Complaint, #2 Exhibit B—Memorandum in Support of Motorola, Inc.'s Motion to Dismiss, #3 Exhibit C—Reply Memorandum in Support of Motorola's Motion to Dismiss) (Schaafsma, Paul) (Entered: Aug. 30, 2010)—United States District Court Northern District of Illinois—CM/ECF LIVE, Ver 3.2.3 (Chicago) Civil Docket for Case #: 1:09-cv-07401.

Notice of Motion of Plaintiff Memorylink Corp. to amend/correct Notice of Motion for Correction or Modificatio of the Record Pursuant to Federal Rules of Appellate Procedure 10(e), (Schaafsma, Paul) Modificied on Aug. 31, 2010 (ber,) (Entered: Aug. 30, 2010)—United States District Court Northern District of Illinois—CM/ECF LIVE, Ver 3.2.3 (Chicago) Civil Docket for Case #: 1:09-cv-07401.

Response by Thomas G Berry, Hugh C. Dunlop, Terri S. Hughes, Jonathan P. Meyer, Motorola Inc, J. Ray Wood in Opposition to Motion by Plaintiff Memorylink Corp. to amend/correct Motion for Correction or Modification of the Record Pursuant to Federal Rules of Appellate Procedure 10(e), Motion by Plaintiff Memorylink Corp. to amend/correct Motion for Correction or Modification of the Record Pursuant to Federal Rules of Appellate Procedure 10(e), 78 (Sidrys, Anne) (Entered: Aug. 31, 2010)—United States District Court Northern District of Illinois—CM/ECF LIVE, Ver.

Notice of Motion by Paul Eugene Schaafsma for presentment of motion to amend/correct, 78 before Honorable William J. Hibbler on Sep. 7, 2010 at 09:30 AM. (Schaafsma, Paul) (Entered: Sep. 1, 2010)—United States District Court Northern District of Illinois—CM/ECF LIVE, Ver 32.3 (Chicago) Civil Docket for Case #: 1:09-cv-07401.

Notice of appeal by Memorylink Corp. regarding orders 76, 75 Filing fee $455, receipt No. 0752-5181220. (Schaafsma, Paul) (Entered: Sep. 2, 2010)—United States District Court Northern District of Illinois—CM/ECF LIVE, Ver 3.2.3 (Chicago) Civil Docket for Case #: 1:09-cv-07401.

Docketing Statement by Memorylink Corp. regarding notice of appeal 82 (Schaafsma, Paul) (Entered: Sep. 2, 2010)—United States District Court Northern District of Illinois—CM/ECF LIVE, Ver 3.2.3 (Chicago) Civil Docket for Case #: 1:09-cv-07401.

Transmitted to the Federal Circuit the short record on notice of appeal 82. Notified counsel (dj,) (Entered: Sep. 3, 2010)—United States District Court Northern District of Illinois—CM/ECF LIVE, Ver 3.2.3 (Chicago) Civil Docket for Case #: 1:09-cv-07401.

Minute entry before Honorable William J. Hibbler: Motion hearing held on Sep. 7, 2010 regarding motion to amend/correct 78. Plaintiffs Motion for correction or modification of the record 78 is granted. The Clerk of the Court is directed to transmit with the record on appeal copies of the following documents from case No. 08 C 3301: the complaint, memorandum in support or Motorola Inc.'s motion to dismiss and the reply memorandum in support of Motorola Inc.'s motion to dismiss. All of these documents are attached as exhibits to motion document 78. Mailed notice (jdh).

Acknowledgement of receipt of short record on appeal regarding notice of appeal 82; US Federal Circuit Case No. 2010-1533 (dj,) (Entered: Sep. 15, 2010)—United States District Court Northern District of Illinois—CM/ECF LIVE, Ver 3.2.3 (Chicago) Civil Docket for Case #: 1:09-cv-07401.

Motion by Defendants Thomas G Berry, Hugh C. Dunlop, Terri S. Hughes, Jonathan P. Meyer, Motorola Inc, J. Ray Wood to amend/correct the Record (Sidrys, Anne) (Entered: Oct. 7, 2010)—United States District Court Northern District of Illinois—CM/ECF LIVE, Ver 3.2.3 (Chicago) Civil Docket for Case #: 1:09-cv-07401.

Notice of Motion by Anne J. Sidrys for presentment of motion to amend/correct 87 before Honorable William J. Hibbler on Oct. 13, 2010 at 09:30 AM. (Sidrys, Anne) (Entered: Oct. 7, 2010)—United States District Court Northern District of Illinois—CM/ECF LIVE, Ver 3.2.3 (Chicago) Civil Docket for Case #: 1:09-cv-07401.

Minute entry before Honorable William J. Hibbler: Defendants' motion to modify or correct the record on appeal [#87] is granted. The Clerk of the Court is directed to transmit with the record on appeal complete versions of the following documents from case No. 08 C 3301: the complaint, memorandum in support of Motorola Inc.'s motion to dismiss and the reply memorandum in support of Motorola Inc.'s motion to dismiss. All of these documents are attached to this minute order. Mailed notice (Attachments: #1 Complaint from 08 C 3301, #2 Complaint Exhibits 1-7 from case 08 C.

Minute entry before Honorable Nan R. Nolan: Motion hearing held. Defendant's Motion to Compel 134 is entered and continued. Defendant's Motion to Amend Protective Order 136 shall be briefed as follows: response is due by Jun. 24, 2010—reply brief to be filed by Jul. 8, 2010. Plaintiffs Motion to Quash is due by Jun. 20, 2010—defendant's response to be filed by Jul. 7, 2010 and plaintiffs reply brief will be due by Jul. 21, 2001. Status hearing set for Jun. 30, 2010 at 09:30 AM. Mailed notice (Ixs,) (Entered: Jun. 14, 2010)—United States District Court Northern District of Illinois—CM/ECF LIVE, Ver 3.2.3.

Joint Consent to Exercise of Jurisdiction by a United States Magistrate Judge. (ber,) (Entered: Jun. 23, 2010)—United States District Court Northern District of Illinois—CM/ECF LIVE, Ver 3.2.3 (Chicago) Civil Docket for Case #: 1:08-cv-03301.

Motion by Movant NovusIP, LLC to quash Third Party Subpoena (Attaches: #1 Exhibit A—Subpoena, #2 Exhibit B—Declaration, #3 Exhibit C—*NewRiver, Inc. v. Newkirk Products, Inc*) (Schaafsma, Paul) (Entered: Jun. 16, 2010)—United States District Court Northern District of Illinois—CM/ECF LIVE, Ver 3.2.3 (Chicago) Civil Docket for Case #: 1:08-cv-03301.

Executive Committee Order: Case reassigned to the Honorable Nan R. Nolan pursuant to Local Rule 73.1, Signed by Executive Committee on Jun. 17, 2010. (ber,) (Entered: Jun. 23, 2010)—United States District Court Northern District of Illinois—CM/ECF LIVE, Ver 3.2.3 (Chicago) Civil Docket for Case #: 1:08-cv-03301.

Response by Memorylink Corp. to Motion by Defendant Motorola, Inc. to amend/correct Protective Order 136 (Attachments: #1 Exhibit 1) (Berk, Peter) (Entered: Jun. 24, 2010)—United States District Court Northern District of Illinois—CM/ECF LIVE, Ver 3.2.3 (Chicago) Civil Docket for Case #: 1:08-cv-03301.

Minute entry before Honorable Nan R. Nolan: Magistrate Judge Status hearing held on Jun. 30, 2010 and continued to Aug. 4, 2010 at 09:45 AM. Defendant's Motion to Compel 134 is withdrawn without prejudice. Plaintiffs motion to compel is due Jun. 30, 2010, response to be filed by Jul. 21, 2010, reply brief to be filed by Aug. 4, 2010. Parties are directed to meet and confer as discussed in open court. Joint status report is due by Aug. 2, 2010. Mailed notice (Ixs,) (Entered: Jun. 30, 2010)—United States District Court Northern District of Illinois—CM/ECF LIVE, Ver 3.2.3 (Chicago) Civil Docket for Case #:.

Motion by Plaintiff Memorylink Corp. to compel (Attachments: #1 Exhibit A Jun. 14, 2010 J. Krannich Letter to P. Schaafsma, #2 Exhibit B Memorylinks First Set of [Malpractice] Interrogatories, #3 Exhibit C Memorylinks First Set of [Malpractice] Document Requests, #4 Exhibit D Jun. 10, 2010 P. Schaafsma Letter to J. Krannich, #5 Exhibit E Jun. 7, 2010 P. Schaafsma e-mail to J. Krannich, #6 Exhibit F—Jun. 21, 2010 J. Krannich e-mail to P. Schaafsma, #7 Exhibit G Jun. 22, 2010 P. Schaafsma e-mail to J. Krannich, #8 Exhibit H Jun. 28, 2010 N. Strickland e-mail to P.

Response by Motorola, Inc. to Motion by Movant NovusIP, LLC to quash Third Party Subpoena 141 (Attachments: #1 Exhibit A) (Sidrys, Anne) (Entered: Jul. 7, 2010)—United States District Court Northern District of Illinois—CM/ECF LIVE, Ver 3.2.3 (Chicago) Civil Docket for Case #: 1:08-cv-03301.

Reply by Motorola, Inc. to Motion by Defendant Motorola, Inc. to amend/correct Protective Order 136 (Attachments: #1 Exhibit A, #2 Exhibit B, #3 Exhibit C, #4 Exhibit D, #5 Exhibit E, #6 Exhibit F) (Sidrys, Anne) (Entered: Jul. 8, 2010)—United States District Court Northern District of Illinois—CM/ECF LIVE, Ver 3.2.3 (Chicago) Civil Docket for Case #: 1:08-cv-03301.

Transcript of Proceedings held on Jun. 3, 2010 before the Honorable William J. Hibbler. Court Reporter Contact Information: Alexandra Roth, (312) 408-5038, alexandra_roth@ilnd.uscourts.gov. Important: The transcript may be viewed at the court's public terminal or purchased through the Court Reporter/Transcriber before the deadline for Release of Transcript Restriction. After that date it may be obtained through the.

Response by Defendant Motorola, Inc. to motion to compel,,146 (Attachments: #1 Exhibit a, #2 Exhibit B, #3 Exhibit C, #4 Exhibit D, #5 Exhibit E, #6 Exhibit F, #7 Exhibit G, #8 Exhibit H) (Sidrys, Anne) (Entered: Jul. 21, 2010)—United States District Court Northern District of Illinois—CM/ECF LIVE, Ver 3.2.3 (Chicago) Civil Docket for Case #: 1:08-cv-03301.

Minute entry before Honorable Nan R. Nolan: For the reasons stated below, Motorolas motion to amend protective order [#136] is denied. [For further details see text below.] Mailed notice (Ixs,) (Entered: Jul. 29, 2010)—United States District Court Northern District of Illinois—CM/ECF LIVE, Ver 3.2.3 (Chicago) Civil Docket for Case #: 1:08-cv-03301.

Minute entry before Honorable Nan R. Nolan: Status hearing held and continued to Sep. 8, 2010 at 9 a.m. Joint status report due by Sep. 3, 2010. With regard to the document subpoenas issued to Adaptive Micro-Ware and Robert Kniskern, pre-2003 emails are due by Aug. 6, 2010. The balance of the emails are due by Aug. 9, 2010. Kirkland's IT department shall review the engineering drawings at plaintiffs counsel's office. Mr. Kniskern's deposition is limited to one day of eight hours absent a showing of good cause by Motorola. Mailed notice (Ixs,) (Entered: Aug. 5, 2010)—United States District.

Minute entry before Honorable Nan R. Nolan: For the reasons stated in the Memorandum Opinion and Order entered this day, non-party NovusIP's Motion to Quash Subpoena 141 is granted in part and denied in part. [For further detail see separate order(s).] Notices mailed by Judicial staff. Mailed notice (Isx,) (Entered: Aug. 9, 2010)—United States District Court Northern District of Illinois—CM/ECF LIVE, Ver 3.2.3 (Chicago) Civil Docket for Case #: 1:08-cv-03301.

Memorandum Opinion and Order Signed by the Honorable Nan R. Nolan on Aug. 6, 2010. Mailed notice (Ixs,) (Entered:Aug. 9, 2010)—United States District Court Northern District of Illinois—CM/ECF LIVE, Ver 3.2.3 (Chicago) Civil Docket for Case #: 1:08-cv-03301.

Minute entry before Honorable Nan R. Nolan: Telephone status hearing set for Aug. 12, 2010 at 01:30 PM. Mailed notice (Ixs,) (Entered: Aug. 12, 2010)—United States District Court Northern District of Illinois—CM/ECF LIVE, Ver 3.2.3 (Chicago) Civil Docket for Case #: 1:08-cv-03301.

Minute entry before Honorable Nan R. Nolan: Telephone Magistrate Judge Status hearing held on Aug. 13, 2010. Mailed notice (Ixs,) (Entered: Aug. 13, 2010)—United States District Court Northern District of Illinois—CM/ECF LIVE, Ver 3.2.3 (Chicago) Civil Docket for Case #: 1:08-cv-03301.

Minute entry before Honorable Nan R. Nolan: The Court has placed this case into the Seventh Circuit Electronic Discovery Pilot Program. The Court therefore will apply the standing order relating to the discovery of electronically stored information ("ESI") (available at www.ilnd.uscourts.gov). The parties shall familiarize themselves with the standing order and with the principles relating to the discovery of electronically stored information that underlies the standing order, and shall use the standing order and those principles in addressing any discovery disputes that may.

Minute entry before Honorable Nan R. Nolan: Status hearing held and continued to Oct. 28, 2010 at 9:00 a.m. Joint status report due by Oct. 22, 2010. Mailed notice (Ixs,) (Entered: Sep. 8, 2010)—United States District Court Northern District of Illinois—CM/ECF LIVE, Ver 3.2.3 (Chicago) Civil Docket for Case #: 1:08-cv-03301.

Transcript of Proceedings held on Dec. 8, 2009 before the Honorable William J. Nibbler. Court Reporter Contact Information: Alexandra Roth, (312) 408-5038, alexandra_roth@ilnd.uscourts.gov. Important: The transcript may be viewed at the court's public terminal or purchased through the Court Reporter/Transcriber before the deadline for Release of Transcript Restriction. After that date it may be obtained through the.

Transcript of Proceedings held on Apr. 29, 2010 before the Honorable William J. Hibbler. Court Reporter Contact Information: Alexandra Roth, (312) 408-5038, alexandra_roth@ilnd.uscourts.gov. Important: The transcript may be viewed at the court's public terminal or purchased through the Court Reporter/Transcriber before the deadline for Release of Transcript Restriction. After that date it may be obtained through the.

Minute entry before Honorable Nan R. Nolan: Status hearing held and continued to Dec. 14, 2010 at 9:00 a.m. in Courtroom 1041. Counsel shall continue to meet and confer in good faith regarding electronic search terms. Defense counsel indicated that they would accept service for Hugh Dunlop's deposition. Memorylink's Motion to Compel 146 for a related case, 09 C 7401, was incorrectly filed in this case. Because Case No. 09 C 7401 has been dismissed and all pending motions in that case were terminated as moot, Memorylink's Motion to Compel 146 is denied as moot. Mailed.

Motion by Defendant Motorola, Inc. to Hold NovusIP, LLC in Contempt (Attachments: #1 Exhibit A, #2 Exhibit B, #3 Exhibit C, #4 Exhibit D, #5 Exhibit E, #6 Exhibit F, #7 Exhibit G) (Sidrys, Anne) (Entered: Dec. 9, 2010)—United States District Court Northern District of Illinois—CM/ECF Live, Ver 3.2.3 (Chicago) Civil Docket for Case #: 1:08-cv-03301.

Notice of Motion by Anne J. Sidrys for presentment of motion for miscellaneous relief 162 before Honorable Nan R. Nolan on Dec. 14, 2010 at 09:00 AM. (Sidrys, Anne) (Entered: Dec. 9, 2010)—United States District Court Northern District of Illinois—CM/ECF LIVE, Ver 3.2.3 (Chicago) Civil Docket for Case #: 1:08-cv-03301.
Minute entry before Honorable Nan R. Nolan: Status and motion hearing held. Next status hearing set for Jan. 18, 2011 at 9:30 a.m. in Courtroom 1041. Defendant's Motion to Hold NovusIP, LLC in Contempt 162 is entered and continued. By Jan. 3, 2011, Paul Schaafsma or NovusIP shall file the certification discussed in open court. By Jan. 13, 2011, Motorola shall respond to Mr. Schaafsma's certification. By Jan. 14, 2011, counsel shall provide the Court with a joint status report summarizing the status of the discovery issues discussed in open court on Dec. 14, 2010 and any other additional.
Response by Movant NovusIP, LLC in Opposition to Motorola's Motion to hold NovusIP, LLC in Contempt (Attachments: #1 Exhibit Second Declaration of Paul Schaafsma) (Schaafsma, Paul) (Entered: Jan. 3, 2011)—United States District Court Northern District of Illinois—CM/ECF LIVE, Ver 3.2.3 (Chicago) Civil Docket for Case #: 1:08-cv-03301.
Reply by Defendant Motorola, Inc. to Response 165/Reply in Support of Motion to Hold NovusIP, LLC in Contempt (Attachments: #1 Exhibit A, #2 Exhibit B) (Sidrys, Anne) (Entered: Jan. 13, 2011)—United States District Court Northern District of Illinois—CM/ECF LIVE, Ver 3.2.3 (Chicago) Civil Docket for Case #: 1:08-cv-03301.
Motion by Defendant Motorola, Inc. Motion for Leave to Present More Than Ten Terms or Phrases for Construction by the Court (Attachments: #1 Exhibit A) (Sidrys, Anne) (Entered: Jan. 18, 2011)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion for miscellaneous relief 167 before Honorable William J. Hibbler on Jan. 25, 2011 at 09:30 AM. (Sidrys, Anne) (Entered: Jan. 18, 2011)—United States District Court Northern District of Illinois—CM/ECF LIVE, Ver 3.2.3 (Chicago) Civil Docket for Case #: 1:08-cv-03301.
Minute entry before Honorable Nan R. Nolan: Status hearing held and continued to Feb. 17, 2011 at 9:30 a.m. in Courtroom 1858. Joint status report due by Feb. 14, 2011. Defendant's Motion to Hold NovusIP in Contempt 162 is entered and continued. As discussed in open court, Paul Schaafsma of NovusIP shall conduct a comprehensive search of his e-mail system for documents responsive to Defendant's subpoena. By Feb. 1, 2011, Mr. Schaafsma shall produce responsive documents. Mr. Schaafsma must separately identify any responsive document withheld and provide a.
Minute entry before Honorable William J. Hibbler: Motion hearing held on Jan. 25, 2011 regarding motion for miscellaneous relief 167. Defendant Motorola, Inc.'s Motion for Leave to Present More Than Ten Terms or Phrases for Construction by the Court 167 is denied for the reasons stated in open court. Mailed notice (jdh) (Entered: Jan. 25, 2011)—United States District Court Northern District of Illinois—CM/ECF LIVE, Ver 3.2.3 (Chicago) Civil Docket for Case #: 1:08-cv-03301.
Sealed Motion by Plaintiff Memorylink Corp. for Ruling Regarding the Assertion of Attorney-Client Privilege at Hugh Dunlop's Deposition (Attachments: #1 Exhibit A, #2 Exhibit B, #3 Exhibit C, #4 Exhibit D, #5 Exhibit E) (Berk, Peter) (Entered: Jan. 28, 2011)—United States District Court Northern District of Illinois—CM/ECF LIVE, Ver 3.2.3 (Chicago) Civil Docket for Case #: 1:08-cv-03301.
Motion by Plaintiff Memorylink Corp. for Ruling Regarding the Assertion of Attorney-Client Privilege at Hugh Dunlop's Deposition (Attachments: #1 Exhibit A, #2 Exhibit B, #3 Exhibit C, #4 Exhibit D, #5 Exhibit E) (Berk, Peter) (Entered: Jan. 31, 2011)—United States District Court Northern District of Illinois—CM/ECF LIVE, Ver 3.2.3 (Chicago) Civil Docket for Case #: 1:08-cv-03301.
Response by Motorola, Inc. to Motion by Plaintiff Memorylink Corp. for Ruling Regarding the Assertion of Attorney-Client Privilege at Hugh Dunlop's Deposition 172 (Attachments: #1 Exhibit 1, #2 Exhibit 2, #3 Exhibit 3, #4 Exhibit 4, #5 Exhibit 5, #6 Exhibit 6, #7 Exhibit 7, #8 Exhibit 8, #9 Exhibit 9, #10 Exhibit 10, #11 Exhibit 11—Part 1, #12 Exhibit 11—Part 2) (Sidrys, Anne) (Entered: Feb. 4, 2011)—United States District Court Northern District of Illinois—CM/ECF LIVE, Ver 3.2.3 (Chicago) Civil Docket for Case #: 1:08-cv-03301.
Sealed Reply by Memorylink Corp. to Sealed Motion by Plantiff Memorylink Corp. for Ruling Regarding the Assertion of Attorney-Client Privilege at Hugh Dunlop's Deposition 171 (Attachments: #1 Exhibit A, #2 Exhibit B) (Berk, Peter) (Entered: Feb. 8, 2011)—United States District Court Northern District of Illinois—CM/ECF LIVE, Ver 3.2.3 (Chicago) Civil Docket for Case #: 1:08-cv-03301.
Reply by Plaintiff Memorylink Corp. in Support of Its Motion for Ruling Regarding the Assertion of Privilege at Hugh Dunlop's Deposition (Attachments: #1 Exhibit A, #2 Exhibit B) (Berk, Peter) (Entered: Feb. 8, 2011)—United States District Court Northern District of Illinois—CM/ECF LIVE, Ver 3.2.3 (Chicago) Civil Docket for Case #: 1:08-cv-03301.
Minute entry before Honorable Nan R. Nolan: Attorney Paul Schaafsma shall appear at the status hearing set for Feb. 17, 2011 at 9:30 a.m. Mailed notice (Ixs,) (Entered: Feb. 15, 2011)—United States District Court Northern District of Illinois—CM/ECF LIVE, Ver 3.2.3 (Chicago) Civil Docket for Case #: 1:08-cv-03301.
Motion by Defendant Motorola, Inc. to compel Memorylink to Comply with Motorola's Document Requests (Attachments: #1 Exhibit A, #2 Exhibit B, #3 Exhibit C, #4 Exhibit D, #5 Exhibit E, #6 Exhibit F, #7 Exhibit G, #8 Exhibit H, #9 Exhibit I) (Sidrys, Anne) (Entered: Feb. 15, 2011)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion to compel, 177 before Honorable Nan R. Nolan on Feb. 23, 2011 at 10:00 AM. (Sidrys, Anne) (Entered: Feb. 15, 2011)—United States District Court Northern District of Illinois—CM/ECF LIVE, Ver 3.2.3 (Chicago) Civil Docket for Case #: 1:08-cv-03301.
Memorandum by Motorola, Inc./Motorola's Opening Claim Construction Brief (Attachments: #1 Exhibit 1, #2 Exhibit 2, #3 Exhibit 3, #4 Exhibit 4, #5 Exhibit 5, #6 Exhibit 6, #7 Exhibit 7, #8 Exhibit 8, #9 Exhibit 9, #10 Exhibit 10, #11 Exhibit 11, #12 Exhibit 12) (Sidrys, Anne) (Entered: Feb. 16, 2011)—United States District Court Northern District of Illinois—CM/ECF LIVE, Ver 3.2.3 (Chicago) Civil Docket for Case #: 1:08-cv-03301.
Appendix memorandum, 179/Joint Appendix for Claim Construction Briefs (Attachments: #1 JA 1-JA 18, #2 JA 19-JA 36, #3 JA 37-JA 54, #4 JA 55-JA 72, #5 JA 73-JA 90, #6 JA 91-JA 108, #7 JA 109 -JA 126, #8 JA 127-JA 144, #9 JA 145-JA 162, #10 JA 163-JA 180, #11 JA 181-JA 198, #12 JA 199-JA 216, #13 JA 217-JA 234, #14 JA 235-JA 252, #15 JA 253-JA 270, #16 JA 271-JA 277) (Sidrys, Anne) (Entered: Feb. 16, 2011)—United States District Court Northern District of Illinois—CM/ECF LIVE, Ver 3.2.3 (Chicago) Civil Docket for Case #: 1:08-cv-03301.
Minute entry before Honorable Nan R. Nolan: Status hearing held and continued to Feb. 24, 2011 at 7:30 a.m. No appearance is necessary on Feb. 23, 2011 regarding Defendant's Motion to Compel 177. Defendant's Motion to Compel 177 is entered and continued. The parties shall exchange and deliver to chambers a proposed plan for the completion of document production by Feb. 22, 2011. McDonald Hopkins shall product the Adaptive Mircoware privilege log by Mar. 1, 2011. McDonald Hopkins shall supplement the Banner & Witcoff privilege log by Mar. 15, 2011. The issue of.
Minute entry before Honorable Nan R. Nolan: Status hearing held and continued to Mar. 9, 2011 at 7:30 a.m. Defendant's Motion to Compel 177 is granted to the extent that (1) the current primary focus of discovery between the parties will be the completion of Plaintiff's production of responsive documents, including electronically stored information (ESI), that can be identified with reasonable diligence and (2) depositions are stayed pending further order of the Court, As discussed in open court, counsel shall immediately begin in-person meet and confer sessions regarding Plaintiff's.
Minute entry before Honorable Nan R. Nolan: Status hearing held and continued to Mar. 22, 2011 at 9:30 a.m. Counsel shall continue their transparent dialogue regarding Plaintiffs ESI production as necessary. Plaintiff shall produce responsive documents on a rolling basis. Plaintiffs production from custodians Freeberg, Huard and Strandwitz is due by Apr. 1, 2011. By Apr. 22, 2011, Plaintiff shall complete its server production and any carryover production from the three custodians. BY Apr. 23, 2011, Plaintiff shall respond to Defendant's list relating to protective order designations of Adaptive.

Motion by Plaintiff Memorylink Corp. for extension of time for briefing schedule (Berk, Peter) (Entered: Mar. 9, 2011)—United States District Court Northern District of Illinois—CM/ECF LIVE, Ver 3.2.3 (Chicago) Civil Docket for Case #: 1:08-cv-03301.
Notice of Motion by Peter Todd Berk for presentment of extension of time 184 before Honorable William J. Hibbler on Mar. 15, 2011 at 09:30 AM. (Berk, Peter) (Entered: Mar. 9, 2011)—United States District Court Northern District of Illinois—CM/ECF LIVE, Ver 3.2.3 (Chicago) Civil Docket for Case #: 1:08-cv-03301.
Response by Motorola, Inc. in Opposition to Motion by Plaintiff Memorylink Corp. for extension of time for briefing schedule 184 Motorola's Opposition to Memorylink's Motion for Extension of Briefing Schedule (Sidrys, Anne) (Entered: Mar. 14, 2011)—United States District Court Northern District of Illinois—CM/ECF LIVE, Ver 3.2.3 (Chicago) Civil Docket for Case #: 1:08-cv-03301.
Minute entry before Honorable William J. Hibbler: Motion hearing held on Mar. 15, 2011 regarding extension of time 184 Motion by Plaintiff Memorylink Corp. for extension of time for briefing schedule 184 is denied, briefing schedule shall stand. Mailed notice (pm, ) (Entered: Mar. 16, 2011)—United States District Court Northern District of Illinois—CM/ECF LIVE, Ver 3.2.3 (Chicago) Civil Docket for Case #: 1:08-cv-03301.
Response by Plaintiff Memorylink Corp. in Opposition to Motorola's Opening Claim Construction Brief (Attachments:#1 Exhibit A) (Berk, Peter) (Entered: Mar. 16, 2011)—United States District Court Northern District of Illinois—CM/ECF LIVE, Ver 3.2.3 (Chicago) Civil Docket for Case #: 1:08-cv-03301.
Minute entry before Honorable Nan R. Nolan: Minute entry dated Mar. 9, 2011—docket No. 183 is amended only as follows: By Mar. 23, 2011, Plaintiff shall respond to Defendant's list relating to protective order designations of Adaptive Microware documents. Remainder of order to stand. Mailed notice (Ixs,) (Entered: Mar. 21, 2011)—United States District Court Northern District of Illinois—CM/ECF LIVE, Ver 3.2.3 (Chicago) Civil Docket for Case #: 1:08-cv-03301.
Motion by Defendant Motorola, Inc. to strike Response 188/Motion to Strike Memorylink's New Proposed Claim Constructions and the Declaration of Robert J. Kniskern (Attachments: #1 Exhibit A, #2 Exhibit B, #3 Cases Cited) (Sidrys, Anne) (Entered: Mar. 21, 2011)—United States District Court Northern District of Illinois—CM/ECF LIVE, Ver 3.2.3 (Chicago) Civil Docket for Case #: 1:08-cv-03301.
Notice of Motion by Anne J. Sidrys for presentment of motion to strike, motion for relief,, 190 before Honorable William J. Hibbler on Mar. 24, 2011 at 09:30 AM. (Sidrys, Anne) (Entered: Mar. 21, 2011)—United States District Court Northern District of Illinois—CM/ECF LIVE, Ver 3.2.3 (Chicago) Civil Docket for Case #: 1:08-cv-03301.
Docket Report for United States District Court Northern District of Illinois—CM/ECF LIVE, Ver 4.2 (Chicago) Civil Docket Case for Case #: 1:09-cv-07401, 12pp, printed on Mar. 22, 2011 from https://ecf.ilnd.uscourts.gov/cg-bin/DktRpt.pl.
Motion by Plaintiff Memorylink Corp. for default judgment as to Defendant Dunlop (Attachments: #1 Exhibit Exhibit A —Declaration of Paul E. Schaafsma, #2 Exhibit Exhibit 1—Patent Office Register of Attorneys—Jonathan P. Meyer, #3 Exhibit Exhibit 2—Patent Office Register of Attorneys Terri S. Hughes, #4 Exhibit Exhibit 3—Patent Office Register of Attorneys J. Ray Wood, #5 Exhibit Exhibit 4—Patent Office Register of Attorneys Thomas G. Berry, #6 Exhibit Exhibit 5—RGC Jenkins & Co. About Us Web-Page, #7 Exhibit Exhibit 6—RGC Jenkins & Co. Home Web-Page, #8 Exhibit. Notice of Motion by Paul Eugene Schaafsma for presentment of motion for default judgment,,,,,26 before Honorable Robert W. Gettleman on Mar. 18, 2010 at 09:15 AM. (Schaafsma, Paul) (Entered: Mar. 10, 2010)—United States District Court Northern District of Illinois—CM/ECF LIVE, Ver 3.2.3 (Chicago) Civil Docket for Case #: 1:09-cv-07401.
Attorney Appearance for Defendant Hugh C. Dunlop by Mark J. Nomellini (Nomellini, MArk) (Entered: Mar. 17, 2010)—United States District Court Northern District of Illinois—CM/ECF LIVE, Ver 3.2.3 (Chicago) Civil Docket for Case #: 1:09-cv-07401.
Response by Hugh C. Dunlop in Opposition to Motion by Plaintiff Memorylink Corp. for default judgment as to Defendant Dunlop 26 (Attachments: #1 Exhibit A, #2 Exhibit B, #3 Exhibit C, #4 Exhibit D,
5 Exhibit E, #6 Exhibit F, #7 Exhibit G, #8 Exhibit H, #9 Exhibit I, #10 Exhibit J) (Nomellini, Mark) (Entered: Mar. 24, 2010)—United States District Court Northern District of Illinois—CM/ECF LIVE, Ver 3.2.3 (Chicago) Civil Docket for Case #: 1:09-cv-07401.
Affidavit of Susan Butler regarding response in opposition to motion, 29 (Nomellini, Mark) (Entered: Mar. 25, 2010)—United States District Court Northern District of Illinois—CM/ECF LIVE, Ver 3.2.3 (Chicago) Civil Docket for Case #: 1:09-cv-07401.
Notice by Hugh C. Dunlop re affidavit 30 of Susan Butler (Nomellini, Mark) (Entered: Mar. 25, 2010)—United States District Court Northern District of Illinois—CM/ECF LIVE, Ver 3.2.3 (Chicago) Civil Docket for Case #: 1:09-cv-07401.
Minute entry before Honorable Robert W. Gettleman: Status hearing date of Mar. 30, 2010 is re-set to Apr. 14, 2010 at 9:30 a.m. Mailed notice (gds,) (Entered: Mar. 26, 2010)—United States District Court Northern District of Illinois—CM/ECF LIVE, Ver 3.2.3 (Chicago) Civil Docket for Case #: 1:09-cv-07401.
Reply by Plaintiff Memorylink Corp. on its Motion for Default (Attachments: #1 Exhibit Exhibit A—Motorola Motion to Reassign Reply, #2 Exhibit Exhibit B—Motorola's Answer to Second Amendment Complaint) (Schaafsma, Paul) (Entered: Mar. 31, 2010)—United States District Court Northern District of Illinois—CM/ECF LIVE, Ver 3.2.3 (Chicago) Civil Docket for Case #: 1:09-cv-07401.
Minute entry before Honorable Robert W. Gettleman: Status hearing date of Apr. 14, 2010 before Judge Gettleman is stricken Mailed notice (gds,) (Entered: Apr. 14, 2010)—United States District Court Northern District of Illinois—CM/ECF LIVE, Ver 3.2.3 (Chicago) Civil Docket for Case #: 1:09-cv-07401.
Executive Committee Order: Case reassigned to the Honorable William J. Hibbler for all further proceedings pursuant to Local Rule 40.4. Signed by Executive Committee on Apr. 14, 2010. (mb,) (Entered: Apr. 16, 2010)—United States District Court Northern District of Illinois—CM/ECF LIVE, Ver 3.2.3 (Chicago) Civil Docket for Case #: 1:09-cv-07401.
Minute entry before Honorable William J. Hibbler: Status hearing before Judge Hibbler set for Apr. 29, 2010 at 9:30 AM. Mailed notice (jdh) (Entered: Apr. 15, 2010)—United States District Court Northern District of Illinois—CM/ECF LIVE, Ver 3.2.3 (Chicago) Civil Docket for Case #: 1:09-cv-07401.
Motion by Defendant Motorola Inc, to consolidate case 08-cv3301 & 09-cv-7401 (Sidrys, Anne) Modified on Apr. 26, 2010 (aac,). Text edited by Clerk's Office to reflect the correct filers. (Entered: Apr. 26, 2010)—United States District Court Northern District of Illinois—CM/ECF LIVE, Ver 3.2.3 (Chicago) Civil Docket for Case #: 1:09-cv-07401.
Notice of Motion by Anne J. Sidrys for presentment of motion to consolidate cases 37 before Honorable William J. Hibbler on Apr. 29, 2010 at 09:30 AM. (Sidrys, Anne) (Entered: Apr. 26, 2010)—United States District Court Northern District of Illinois—CM/ECF LIVE, Ver 3.2.3 (Chicago) Civil Docket for Case #: 1:09-cv-07401.
Memorandum by Motorola Inc in support of motion to consolidate cases 37 (Sidrys, Anne) (Entered: Apr. 26, 2010)—United States District Court Northern District of Illinois—CM/ECF LIVE, Ver 3.2.3 (Chicago) Civil Docket for Case #: 1:09-cv-07401.
Report of Rule 26(F) Planning Meeting (Sidrys, Anne) (Entered: Apr. 27, 2010)—United States District Court Northern District of Illinois—CM/ECF LIVE, Ver 3.2.3 (Chicago) Civil Docket for Case #: 1:09-cv-07401.
Minute entry before Honorable William J. Hibbler: Status hearing held and continued to May 6, 2010 at 9:30 a.m. to set discovery schedule. Defendant's motion for consolidation is granted for discovery purposes only, the Court holds in abeyance the request for consolidation for trial. Mailed notice (ber,) (Entered: May 3, 2010)—United States District Court Northern District of Illinois—CM/ECF LIVE, Ver 3.2.3 (Chicago) Civil Docket for Case #: 1:09-cv-07401.
Motion by Defendants Thomas G Berry, Terri S. Hughes, Jonathan P. Meyer, Motorola Inc. J. Ray Wood, Plaintiff Memorylink Corp. for order Regarding Consent to Magistrate Judge Nolan for Discovery Supervision (Sidrys, Anne) (Entered: May 20, 2010)—United States District Court Northern District of Illinois—CM/ECF LIVE, Ver 3.2.3 (Chicago) Civil Docket for Case #: 1:09-cv-07401.
Notice of Motion by Anne J. Sidrys for presentment of motion for order 43 before Honorable William J. Hibbler on May 25, 2010 at 09:30 AM. (Sidrys, Anne) (Entered: May 20, 2010)—United States District Court Northern District of Illinois—CM/ECF LIVE, Ver 3.2.3 (Chicago) Civil Docket for Case #: 1:09-cv-07401.
Notice of Motion by Anne J. Sidrys for presentment of motion for order 43 before Honorable William J. Hibbler on Jun. 3, 2010 at 09:30 AM. (Sidrys, Anne) (Entered: May 27, 2010)—United States District Court Northern District of Illinois—CM/ECF LIVE, Ver 3.2.3 (Chicago) Civil Docket for Case #: 1:09-cv-07401.
Minute entry before Honorable William J. Hibbler: Motion hearing held on Jun. 3, 2010 regarding motion for order 43. Joint Motion for entry of agreed order regarding consent to Magistrate Judge Nolan for discovery supervision 43 is granted. Mailed notice (jdh) (Entered: Jun. 8, 2010)—United States District Court Northern District of Illinois—CM/ECF LIVE, Ver 3.2 (Chicago) Civil Docket for Case #: 1:09-cv-07401.
Pursuant to Local Rule 72.1, this case is hereby referred to the calendar of Honorable Nan R. nolan for the purpose of holding proceedings related to: discovery supervision. (jdh) Mailed notice. (Entered: Jun. 8, 2010)—United States District Court Northern District of Illinois—CM/ECF LIVE, Ver 3.2.3 (Chicago) Civil Docket for Case #: 1:09-cv-07401.
Motion by Defendant Motorola Inc to compel the deposition of Robert Kniskern (Attachments: #1 Exhibit A, #2 Exhibit B, #3 Exhibit D) (Sidrys, Anne) (Entered: Jun. 7, 2010)—United States District Court Northern District of Illinois—CM/ECF LIVE, Ver 3.2.3 (Chicago) Civil Docket for Case #: 1:09-cv-07401.
Notice of Motion by Anne J. Sidrys for presentment of motion to compel 46 before Honorable William J. Hibbler on Jun. 10, 2010 at 09:30 AM. (Sidrys, Anne) (Entered: Jun. 7, 2010)—United States District Court Northern District of Illinois—CM/ECF LIVE, Ver 3.2.3 (Chicago) Civil Docket for Case #: 1:09-cv-07401.
Motion by Defendant Motorola Inc to amend/correct Protective Order (Attachments: #1 Exhibit A, #2 Exhibit B, #3 Exhibit C, #4 Exhibit D) (Sidrys, Anne) (Entered: Jun. 7, 2010)—United States District Court Northern District of Illinois—CM/ECF LIVE, Ver 3.2.3 (Chicago) Civil Docket for Case #: 1:09-cv-07401.
Notice of Motion by Anne J. Sidrys for presentment of motion to amend/correct 48 before Honorable William J. Hibbler on Jun. 10, 2010 at 09:30 AM. (Sidrys, Anne) (Entered: Jun. 7, 2010)—United States District Court Northern District of Illinois—CM/ECF LIVE, Ver 3.2.3 (Chicago) Civil Docket for Case #: 1:09-cv-07401.
Minute entry before Honorable Nan R. Nolan: Motion hearing held. Defendant's Motion to Compel 46 is entered and continued. Defendant's Motion to Amend Protective Order 48 shall be briefed as follows: response is due by Jun. 24, 2010—reply brief to be filed by Jul. 8, 2010. Plaintiffs Motion to Quash is due by Jun. 20, 2010—defendant's response to be filed by Jul. 7, 2010 and plaintiffs reply brief will be due by Jul. 21, 2001. Status hearing set for Jun. 30, 2010 at 09:30 AM. Mailed notice (Ixs,) (Entered: Jun. 14, 2010)—United States District Court Northern District of Illinois—CM/ECF LIVE, Ver 3.2.3.
Joint Consent to Exercise of Jurisdiction by a United States Magistrate Judge. (ber,) (Entered: Jul. 27, 2010)—United States District Court Northern District of Illinois—CM/ECF LIVE, Ver 32.3 (Chicago) Civil Docket for Case #: 1:09-cv-07401.
Minute entry before Honorable William J. Hibbler: The Court Denies Plaintiff's motion for default judgment as to Defendant Dunlop 26. The Court finds, however, that Plaintiff has complied substantially with the requirements of the Hague Convention in attempting to serve Defendant Dunlop Thus, Defendant Dunlop has until Jul. 14, 2010 to answer or otherwise plead. [For further details see minute order.] Mailed notice (ber,) (Entered: Jun. 25, 2010)—United States District Court Northern District of Illinois—CM/ECF LIVE, Ver 3.2.3 (Chicago) Civil Docket for Case #: 1:09-cv-07401.
Response to NovusIP's Motion to Quash Subpoena by Thomas G Berry, Terri S. Hughes, Jonathan P. Meyer, Motorola Inc, J. Ray Wood (Attachments: #1 Exhibit A) (Sidrys, Anne) (Entered: Jul. 7, 2010)—United States District Court Northern District of Illinois—CM/ECF LIVE, Ver 3.2.3 (Chicago) Civil Docket for Case #: 1:09-cv-07401.
Reply by Motorola Inc in Support of Motorola's Motion to Amend Protective Order (Attachments: #1 Exhibit A, #2 Exhibit B, #3 Exhibit C, #4 Exhibit D, #5 Exhibit E, #6 Exhibit F) (Sidrys, Anne) (Entered: Jul. 8, 2010)—United States District Court Northern District of Illinois—CM/ECF LIVE, Ver 3.2.3 (Chicago) Civil Docket for Case #: 1:09-cv-07401.
Attorney Appearance for Defendant Hugh C. Dunlop by Anne J. Sidrys (Sidrys, Anne) (Entered: Jul. 14, 2010)—United States District Court Northern District of Illinois—CM/ECF LIVE, Ver 3.2.3 (Chicago) Civil Docket for Case #: 1:09-cv-07401.
Attorney Appearance for Defendant Hugh C. Dunlop by Nyika Onyesi Strickland (Strickland, Nyika) (Entered: Jul. 14, 2010)—United States District Court Northern District of Illinois—CM/ECF LIVE, Ver 3.2.3 (Chicago) Civil Docket for Case #: 1:09-cv-07401.
Attorney Appearance for Defendant Hugh C. Dunlop by Jess M. Krannich (Krannich, Jess) (Entered: Jul. 14, 2010)—United States District Court Northern District of Illinois—CM/ECF LIVE, Ver 3.2.3 (Chicago) Civil Docket for Case #: 1:09-cv-07401.
Attorney Appearance for Defendant Hugh C. Dunlop by Joel R. Merkin (Merkin, Joel) (Entered: Jul. 14, 2010)—United States District Court Northern District of Illinois—CM/ECF LIVE, Ver 3.2.3 (Chicago) Civil Docket for Case #: 1:09-cv-07401.
Attorney Appearance for Defendant Hugh C. Dunlop by Mark J Nomellini (Nomellini, Mark) (Entered: Jul. 14, 2010)—United States District Court Northern District of Illinois—CM/ECF LIVE, Ver 3.2.3 (Chicago) Civil Docket for Case #: 1:09-cv-07401.
Motion by Defendant Hugh C. Dunlop to join the Other Defendants' Motion to Dismiss (Sidrys, Anne) (Entered: Jul. 14, 2010)—United States District Court Northern District of Illinois—CM/ECF LIVE, Ver 3.2.3 (Chicago) Civil Docket for Case #: 1:09-cv-07401.
Notice of Motion by Anne J. Sidrys for presentment of motion to join 61 before Honorable William J. Hibbler on Jul. 20, 2010 at 09:30 AM. (Sidrys, Anne) (Entered: Jul. 20, 2010)—United States District Court Northern District of Illinois—CM/ECF LIVE, Ver 3.2.3 (Chicago) Civil Docket for Case #: 1:09-cv-07401.
Minute entry before Honorable William J. Hibbler: Motion hearing held on Jul. 20, 2010 regarding motion to join 61. Hugh C. Dunlop's Motion to join the other defendants' motion to dismiss Memorylink's claim for legal malpractice 61 is granted. Mailed notice (jdh) (Entered: Jul. 20, 2010)—United States District Court Northern District of Illinois—CM/ECF LIVE, Ver 3.2.3 (Chicago) Civil Docket for Case #: 1:09-cv-07401.
Response by Thomas G Berry, Hugh C. Dunlop, Terri S. Hughes, Jonathan P. Meyer, Motorola Inc, J. Ray Wood to Memorylink Corp.'s Motion to Compel (Attachments: #1 Exhibit A, #2 Exhibit B, #3 Exhibit C, #4 Exhibit D, #5 Exhibit E, #6 Exhibit F, #7 Exhibit G, #8 Exhibit H) (Sidrys, Anne) (Entered: Jul. 21, 2010)—United States District Court Northern District of Illinois—CM/ECF LIVE, Ver 32.3 (Chicago) Civil Docket for Case #: 1:09-cv-07401.
Reply by Objector NovusIP, LLC to Motorola's Opposition to Motion to Quash (Schaafsma, Paul) (Entered: Jul. 21, 2010)—United States District Court Northern District of Illinois—CM/ECF LIVE, Ver 3.2.3 (Chicago) Civil Docket for Case #: 1:09-cv-07401.
Executive Committee Order: Case reassigned to the Honorable Nan R. Nolan pursuant to Local Rule 73.1, Signed by the Executive Committee on Jul. 22, 2010. (ber,) (Entered: Jul. 27, 2010)—United States District Court Northern District of Illinois—CM/ECF LIVE, Ver 3.2.3 (Chicago) Civil Docket for Case #: 1:09-cv-07401.
Minute entry before Honorable Nan R. Nolan: for the reasons stated below, Motorolas motion to amend protective order [#136] is denied. [For further details see text below.] Mailed notice (Ixs,) (Entered: Jul. 29, 2010)—United States District Court Northern District of Illinois—CM/ECF LIVE, Ver 3.2.3 (Chicago) Civil Docket for Case #: 1:09-cv-07401.
Reply by Plaintiff Memorylink Corp. in Support of Memorylink's Motion to Comple (Attachments: #1 Exhibit A May 27, 1998 letter from defendant Dunlop to Strandwitz, Kniskern, Schultz, and Wyckoff, #2 Exhibit B Jun. 10, 1998 letter from defendant Dunlop to Memorylinks Robert Kniskern, #3 Exhibit C Power of Attorney, #4 Exhibit D Beasley v. Avery Dennison Corp., No. SA-04-CA-0866, 2006 WL 2854396 (W.D. Tex. Oct. 4, 2006) (Schaafsma, Paul) (Entered: Aug. 2, 2010)—United States District Court Northern District of Illinois—CM/ECF Live, Ver 3.2.3 (Chicago) Civil Docket.
Minute entry before Honorable Nan R. Nolan: Status hearing held and continued to Sep. 8, 2010 at 9 a.m. Joint status report due by Sep. 3, 2010. With regard to the document subpoenas issued to Adaptive Micro-Ware and Robert Kniskern, pre-2003 emails are due by Aug. 6, 2010, The balance of the e0mails are due by Aug. 9, 2010. Kirkland's IT department shall review the engineering drawings at plaintiffs counsel's office. Mr. Kniskern's deposition is limited to one day of eight hours absent a showing of good cause by Motorola. Mailed notice (lxs,) (Entered: Aug. 5, 2010)—United States District.
Minute entry before Honorable William J. Hibbler: Enter Memorandum Opinion and Order. The Court Grants Defendants' motion to dismiss 19. The case is closed. All pending dates and motions are terminated as moot. The related case, 08 C 3301, remains open [for further details see separate order(s).] Mailed notice (ber,) (Entered: Aug. 12, 2010)—United States District Court Northern District of Illinois—CM/ECF LIVE, Ver 3.2.3 (Chicago) Civil Docket for Case #: 1:09-cv-07401.
Memorandum Opinion and Order Signed by the Honorable William J. Hibbler on Aug. 5, 2010. (ber,) (Entered: Aug. 12, 2010)—United States District Court Northern District of Illinois—CM/ECF LIVE, Ver 3.2.3 (Chicago) Civil Docket for Case #: 1:09-cv-07401.
Minute entry before Honorable Nan R. Nolan:Status hearing held and continued to Apr. 12, 2011 at 9:30 a.m. Joint status report due by Apr. 8, 2011. Plaintiff reports that it is on track to meet the Apr. 1, 2011 and Apr. 22, 2011 document production deadlines set forth in the Mar. 9, 2011 minute entry as well as the Mar. 23, 2011 deadline regarding designations of Adaptive Mircoware documents. If possible, Plaintiff shall produce responsive documents on a rolling basis. Prior to the next status hearing, counsel shall meet in-person to discuss possible "Stage 2" document discovery. Mailed notice (lxs,).
Response by Memorylink Corp. in Opposition to Motion by Defendant Motorola, Inc. to strike Response 188/Motion to Strike Memorylink's New Proposed Claim Constructions and the Declaration of Robert J. Kniskern Motion by Defendant Motorola, Inc. to strike Response 188 Motion to Strike Memorylink's New Proposed Claim Constructions and the Declaration of Robert J. Kniskern 190 (Attachments: #1 Exhibit 1, #2 Exhibit 2) (Berk, Peter) (Entered: Mar. 31, 2011)—United States District Court Northern District of Illinois—CM/ECF LIVE, Ver 4.2 (Chicago) Civil Docket for.
Minute entry before Honorable Nan R. Nolan: Status hearing set for Apr. 5, 2011 at 11:00 AM. Joint status report due before the end of business day Monday, Apr. 4, 2011. Mailed notice (Ixs,) (Entered: Apr. 4, 2011)—United States District Court Northern District of Illinois—CM/ECF LIVE, Ver 4.2 (Chicago) Civil Docket for Case # 1:08-cv-03301.
Reply by Motorola, Inc. to Motion by Defendant Motorola, Inc. to strike Response 188 / Motion to Strike Memorylink's New Proposed Claim Constructions and the Declaration of Robert J. Kniskern Motion by Defendant Motorola, Inc. to.strike Response 188 /Motion to Strike Memorylink's New Proposed Claim Constructions and the Declaration of Robert J. Kniskern 190 (Attachments: #1 Exhibit 1, #2 Exhibit 2, #3 Exhibit 3) (Sidrys, Anne) (Entered: Apr. 7, 2011)—United States District Court Northern District of Illinois—CM/ECF LIVE, Ver 4.2 (Chicago) Civil Docket for Case # 1:08-.
Minute entry before Honorable Nan R. Nolan: Enter Order setting forth production deadlines as directed during the Apr. 4, 2011 status hearing. [For further detail see separate order(s).] Mailed notice (ber,) (Entered: Apr. 12, 2011)—United States District Court Northern District of Illinois—CM/ECF LIVE, Ver 4.2 (Chicago) Civil Docket for Case # 1:08-cv-03301.
Minute entry before Honorable Nan R. Nolan: Status hearing set for Apr. 12, 2011 at 9:15 a.m. to stand. Mailed notice (Ixs,) (Entered: Apr. 11, 2011)—United States District Court Northern District of Illinois—CM/ECF LIVE, Ver 4.2 (Chicago) Civil Docket for Case # 1:08-cv-03301.
Order Signed by the Honorable Nan R. Nolan on Apr. 12, 2011. Mailed notice (lxs,) (Entered: Apr. 12, 2011. Mailed notice (lxs,) (Entered: Apr. 21, 2011)—United States District Court Northern District of Illinois—CM/ECF LIVE, Ver. 4.2 (Chicago) Civil Docket for Case # 1:08-cv-03301.
Minute entry before Honorable Nan R. Nolan: Status hearing held and continued to May 26, 2011 at 9 a.m. Joint status letter regarding issues to be discussed at the status hearing due by May 23, 2011. Counsel must plan ahead and work together in good faith to meet the joint status letter deadline. By May 31, 2001, Plaintiff shall produce a replacement disk containing McDonald Hopkin's re-designation of attorneys' eyes only documents. By May 13, 2011, Mr. Krannich shall respond to Memorylink's request for additional information regarding Motorola's Apr. 22, 2011 supplemental product.
Minute entry before Honorable Nan R. Nolan: Status hearing set for May 26, 2011 is stricken and reset to May 25, 2011 at 09:30 AM. Mailed notice (Ixs,) (Entered: May 18, 2011)—United States District Court Northern District of Illinois—CM/ECF LIVE, Ver 4.2 (Chicago) Civil Docket for Case # 1:08-cv-03301.
Response by Defendant Motorola, Inc. to other 213 /Motorola's Response to Memorylink's Submission Relating to the Production of Metadata (Attachments: #1 Exhibit A, #2 Exhibit B, #3 Exhibit C, #4 Exhibit D) (Sidrys, Anne) (Entered: Jun. 1, 2011)—United States District Court Northern District of Illinois—CM/ECF LIVE, Ver 4.2 (Chicago) Civil Docket for Case # 1:08-cv-03301.
Minute entry before Honorable Nan R. Nolan: For the reasons stated in the Order entered this day, Plaintiff's Motion for Rule Regarding the Assertion of Attorney-Client Privilege at Hugh Dunlop's Deposition [171, 172] is granted in part and reserved in part. Enter Order. Mailed notice (ntf,) (Entered: Jun. 2, 2011)—United States District Court Northern District of Illinois—CM/ECF LIVE, Ver 4.2 (Chicago) Civil Docket for Case 190 1:08-cv-03301.
Order. Signed by the Honorable Nan R. Nolan on Jun. 2, 2011: Mailed notice (ntf,) (Entered: Jun. 2, 2011)—United States District Court Northern District of Illinois—CM/ECF LIVE, Ver 4.2 (Chicago) Civil Docket for Case # 1:08-cv-03301.
Minute entry before Honoroable Nan R. Nolan: Status hearing previously set for Jun. 22, 2011 is stricken and reset for Jun. 21, 2011 at 10:00 AM. Mailed notice (Ixs,) (Entered: Jun. 10, 2011)—United States District Court Northern District of Illinois—CM/ECF LIVE, Ver 4.2 (Chicago) Civil Docket for Case # 1:08-cv-03301.
Submission Regarding Narrowing Its Request for Metadata by Memorylink Corp. (Berk, Peter) (Entered: Jun. 13, 2011)—United States District Court Northern District of Illinois—CM/ECF LIVE, Ver 4.2 (Chicago) Civil Docket for Case # 1:08-cv-03301.
Transcript of Proceedings held on Mar. 24, 2011 before the Honorable William J. Hibbler. Court Reporter Contact Information: Alexandra Roth, (312) 408-5038, alexandra-roth@ilnd.uscourts.gov.
Transcript of Proceedings held on Aug. 4, 2010 before the Honorable Nan R. Nolan. Court Reporter Contact Information: Pamela S. Warren, pswcsr@aol.com, 312-294-8907. <P>.
Transcript of Proceedings held on Oct. 28, 2010 before the Honorable Nan R. Nolan. Court Reporter Contact Information: Pamela S. Warren, pswcsr@aol.com, 312-294-8907. <P>.
Notice by Motorola, Inc. / Notice of Motorolas Objections to Magistrate Judge Nolans Jun. 2, 2011 Order Regarding Memorylinks Motion for Ruling Regarding the Assertion of Attorney-Client Privilege at Hugh Dunlops Deposition (Sidrys, Anne) (Entered: Jun. 17, 2011)—United States District Court Northern District of Illinois—CM/ECF LIVE, Ver 3.2.3 (Chicago) Civil Docket for Case #: 1:08-cv-03301.
Objections by Motorola, Inc. to order 216 / Motorola's Objections to Magistrate Judge Nolan's Jun. 2, 2011 Order Regarding Memorylink's Motion for Ruling Regarding the Assertion of Attorney-Client Privilege at Hugh Dunlop's Deposition (Attachments: # 1 Exhibit A, # 2 Exhibit B, # 3 Exhibit C, # 4 Exhibit D, # 5 Exhibit E, # 6 Exhibit F, # 7 Exhibit G, # 8 Exhibit H, # 9 Exhibit I, # 10 Exhibit J, # 11 Exhibit K, # 12 Exhibit L, # 13 Exhibit M)(Sidrys, Anne) (Entered: Jun. 17, 2011)—United States District Court Northern District of Illinois—CM/ECF LIVE, Ver 3.2.3 (Chicago).
Minute entry before Honorable William J. Hibbler: Motion hearing held on Jun. 21, 2011 regarding defendant's objections to the orders of Magistrate Judge Nolan. Defendant's objections to the orders of Magistrate Judge Nolan are denied for the reasons stated in open court Mailed notice (jdh) (Entered: Jun. 21, 2011)—United States District Court Northern District of Illinois—CM/ECF LIVE, Ver 3.2.3 (Chicago) Civil Docket for Case #: 1:08-cv-03301.
Minute entry before Honorable Nan R. Nolan: Magistrate Judge Status hearing held and continued to Aug. 11, 2011 at 09:45 AM. Defendant is given to Jul. 7, 2011 to file a motion to reconsider re: privilege log. Response is to be filed by Jul. 22, 2011 Reply is to be filed by Jul. 29, 2011. Mailed notice (jms, ) (Entered: Jun. 21, 2011)—United States District Court Northern District of Illinois—CM/ECF LIVE, Ver 3.2.3 (Chicago) Civil Docket for Case #: 1:08-cv-03301.
Motion by Defendant Motorola, Inc. for reconsideration regarding order 216 / Motorola's Motion for Reconsideration of This Court's Jun. 2, 2011 Order (Sidrys, Anne) (Entered: Jul. 7, 2011)—United States District Court Northern District of Illinois—CM/ECF LIVE, Ver 3.2.3 (Chicago) Civil Docket for Case #: 1:08-cv-03301.
Memorandum by Motorola, Inc. in support of motion for reconsideration, motion for relief 225 / Motorola's Memorandum in Support of Its Motion for Reconsideration of This Court's Jun. 2, 2011 Order (Attachments: # 1 Exhibit A, # 2 Exhibit B, # 3 Exhibit C, # 4 Exhibit D, # 5 Exhibit E, # 6 Exhibit F, # 7 Exhibit G, # 8 Exhibit H, # 9 Exhibit I, # 10 Exhibit J, # 11 Exhibit K, # 12 Exhibit L, # 13 Exhibit M, # 14 Exhibit N, # 15 Exhibit O, # 16 Exhibit P, # 17 Exhibit Q, # 18 Exhibit R, # 19 Exhibit S, # 20 Exhibit T, #21 Exhibit U, # 22 NE 1, # 23 Kniskern Deposition.
Written Opinion entered by the Honorable William J. Hibbler on Jul. 18, 2011: The Court Denies Defendant's motion to strike 190 . Defendant's claim construction reply brief is now due Aug. 1, 2011. The Joint Claim Construction Chart is due Aug. 8, 2011. The claim construction hearing is set for Oct. 12, 2011 at 11:00 a.m. [For further details see written opinion.] Mailed notice (ber, ) (Entered: Jul. 22, 2011)—United States District Court Northern District of Illinois—CM/ECF LIVE, Ver 3.2.3 (Chicago) Civil Docket for Case #: 1:08-cv-03301.
Sealed Response by Memorylink Corp. to Motion by Defendant Motorola, Inc. for reconsideration regarding order 216 / Motorola's Motion for Reconsideration of This Court's Jun. 2, 2011 Order 225 (Attachments: # 1 Exhibit 1, # 2 Exhibit 2, # 3 Exhibit 3, # 4 Exhibit 4, # 5 Exhibit 5, # 6 Exhibit 6, # 7 Exhibit 7)(Berk, Peter) (Entered: Jul. 22, 2011)—United States District Court Northern District of Illinois—CM/ECF LIVE, Ver 3.2.3 (Chicago) Civil Docket for Case #: 1:08-cv-03301.
Response by Memorylink Corp.in Opposition to Motion by Defendant Motorola, Inc. for reconsideration regarding order 216 / Motorola's Motion for Reconsideration of This Court's Jun. 2, 2011 Order 225 (Attachments: # 1 Exhibit 1, # 2 Exhibit 2, # 3 Exhibit 3, # 4 Exhibit 4, # 5 Exhibit 5, # 6 Exhibit 6, # 7 Exhibit 7)(Berk, Peter) (Entered: Jul. 22, 2011)—United States District Court Northern District of Illinois—CM/ECF LIVE, Ver 3.2.3 (Chicago) Civil Docket for Case #: 1:08-cv-03301.
Reply by Defendant Motorola, Inc. to motion for reconsideration, motion for relief 225 / Motorola's Reply in Support of its Motion for Reconsideration of This Courts Jun. 2, 2011 Order (Sidrys, Anne) (Entered: Jul. 29, 2011)—United States District Court Northern District of Illinois—CM/ECF LIVE, Ver 3.2.3 (Chicago) Civil Docket for Case #: 1:08-cv-03301.
Reply by Defendant Motorola, Inc. to memorandum, 179 / Motorola's Reply Claim Construction Brief (Attachments: # 1 Exhibit A—Kniskern Deposition Excerpts, # 2 Exhibit B—Schulz Declaration)(Sidrys, Anne) (Entered: Aug. 1, 2011)—United States District Court Northern District of Illinois—CM/ECF LIVE, Ver 3.2.3 (Chicago) Civil Docket for Case #: 1:08-cv-03301.
Status Report / Joint Status Report by Memorylink Corp., Motorola, Inc. (Sidrys, Anne) (Entered: Aug. 8, 2011)—United States District Court Northern District of Illinois—CM/ECF LIVE, Ver 3.2.3 (Chicago) Civil Docket for Case #: 1:08-cv-03301.
Minute entry before Honorable Nan R. Nolan:Defendant Motorolas Motion for Reconsideration of This Courts Jun. 2, 2011 Order 225 is denied. [ For further details see text below.]Mailed notice (Ixs, ) (Entered: Aug. 9, 2011)—United States District Court Northern District of Illinois—CM/ECF Live, Ver 3.2.3 (Chicago) Civil Docket for Case #: 1:08-cv-03301.
Minute entry before Honorable Nan R. Nolan:Magistrate Judge Status hearing held on Aug. 11, 2011 and continued to Sep. 1, 2011 at 09:45 AM. Mailed notice (Ixs, ) (Entered: Aug. 15, 2011)—United States District Court Northern District of Illinois—CM/ECF LIVE, Ver 3.2.3 (Chicago) Civil Docket for Case #: 1:08-cv-03301.
Transcript of Proceedings held on Jun. 21, 2011 before the Honorable William J. Hibbler. Court Reporter Contact Information: Alexandra Roth, (312) 408-5038, alexandra_roth@ilnd.uscourts.gov. Important: The transcript may be viewed at the court's public terminal or purchased through the Court Reporter/Transcriber before the deadline for Release of Transcript Restriction. After that date it may be obtained through the Court Reporter/Transcriber or PACER. For further information on the redaction process, see the Court's web site at.
Minute entry before Honorable Nan R. Nolan:The remaining attorney-client privilege issues following this Court's Jun. 2, 2011 Order shall be briefed as follows: Memorylink's opening brief limited to no more than ten pages due by Sep. 23, 2011; Motorola's brief limited to no more than ten pages due by Sep. 30, 2011; Memorylink's reply brief limited to no more than five pages due by Oct. 5, 2011.Mailed notice (Ixs, ) (Entered: Sep. 13, 2011)—United States District Court Northern District of Illinois—CM/ECF LIVE, Ver 3.2.3 (Chicago) Civil Docket for Case #: 1:08-cv-03301.
Minute entry before Honorable Nan R. Nolan: Status hearing set for Sep. 23, 2011 is amended to begin at 10:00 AM. Mailed notice (Ixs, ) (Entered: Sep. 19, 2011)—United States District Court Northern District of Illinois—CM/ECF LIVE, Ver 3.2.3 (Chicago) Civil Docket for Case #: 1:08-cv-03301.
Minute entry before Honorable Nan R. Nolan:Status hearing held and continued to Oct. 6, 2011 at 10 a.m. By Sep. 23, 2011, Motorola shall provide Memorylink with its concerns regarding the Second Revised Privilege Logs. By Sep. 27, 2011, Memorylink shall address Motorola's concerns by revising the Second Revised Privilege Logs accordingly or explain in writing why it cannot further revise the privilege logs to address Motorola's concerns. By Sep. 30, 2011, counsel shall agree upon firm dates for the depositions of Robert Kniskern and Jon Huard. By Sep. 30, 2011, Memorylink shall supplement its.
Motion by Plaintiff Memorylink Corp.Applicability of Attorney Client Privilege to Communications Between Motorola and Its In-House Counsel (Attachments: # 1 Exhibit A, # 2 Exhibit B, # 3 Exhibit C, # 4 Exhibit D, # 5 Exhibit E, # 6 Exhibit F, # 7 Exhibit G, # 8 Exhibit H)(Berk, Peter) (Entered: Sep. 23, 2011)—United States District Court Northern District of Illinois—CM/ECF LIVE, Ver 32.3 (Chicago) Civil Docket for Case #: 1:08-cv-03301.
Motion by Defendant Motorola, Inc.to Reschedule the Claim Construction Hearing (Attachments: # 1 Exhibit 1—Jun. 3, 2011 Status Letter to Judge Nolan, # 2 Exhibit 2—Aug. 26, 2011 J. Krannich Letter, # 3 Exhibit 3—Sep. 16, 2011 Email from P. Berk, # 4 Exhibit 4—Sep. 19, 2011 Email from J. Krannich, # 5 Exhibit 5—Sep. 21, 2011 Email from P. Berk, # 6 Exhibit 6—Sep. 21, 2011 Email from J. Krannich, # 7 Exhibit 7—Sep. 22, 2011 Joint Letter to Judge Nolan)(Sidrys, Anne) (Entered: Sep. 26, 2011)—United States District Court Northern District of Illinois—CM/ECF LIVE, Ver 3.2.3 (Chicago) Civil Docket for Case #:.
Notice of Motion to Reschedule the Claim Construction Hearing / Notice of Motion by Anne J. Sidrys for presentment of motion for miscellaneous relief, 243 before Honorable William J. Hibbler on Sep. 29, 2011 at 09:30 AM. (Sidrys, Anne) (Entered: Sep. 26, 2011)—United States District Court Northern District of Illinois—CM/ECF LIVE, Ver 3.2.3 (Chicago) Civil Docket for Case #: 1:08-cv-03301.
Response by Motorola, Inc.in Opposition to Sealed Motion by Plaintiff Memorylink Corp. Re: Applicability of Attorney Client Privilege to Communications Between Motorola and Its In-House Counsel 242 (Attachments: # 1 Exhibit 1—Jun. 6, 2011 Hearing Transcript, # 2 Exhibit 2—Sep. 1, 2011 Hearing Transcript, # 3 Exhibit 3—Jul. 1, 2011 Strandwitz Deposition Excerpts, # 4 Exhibit 4—Aug. 11, 2010 Kniskern Deposition Excperts, # 5 Exhibit 5—Meyer Declaration, # 6 Exhibit 6—Mancini Declaration, # 7 Exhibit 7—Berry Declaration, # 8 Exhibit 8—Hughes Declaration, # 9 Exhibit 9—.
Sealed Reply by Memorylink Corp. to Motion by Plaintiff Memorylink Corp.Applicability of Attorney Client Privilege to Communications Between Motorola and Its In-House Counsel 241 (Attachments: # 1 Exhibit A, # 2 Exhibit B)(Berk, Peter) (Entered: Oct. 5, 2011)—United States District Court Northern District of Illinois—CM/ECF LIVE, Ver 3.2.3 (Chicago) Civil Docket for Case #: 1:08-cv-03301.
Minute entry before Honorable Nan R. Nolan:Status hearing held and continued to Nov. 8, 2011 at 9:00 a.m. Counsel shall provide the magistrate judge with a joint letter outlining issues to be discussed at the next status hearing by Nov. 4, 2011. Counsel shall agree on a date for Mr. Huard's deposition as soon as possible. By Oct. 6, 2011, Motorola shall provide Memorylink with its comments regarding alleged deficiencies in the subject matter descriptions of the privilege logs. Memorylink shall respond by Oct. 13, 2011. Motorola shall submit any remaining concerns regarding the.

Minute entry before Honorable Nan R. Nolan: Defendant's Motion for Leave to File Sur-Reply to Memorylink's Motion Regarding Applicability of Attorney-Client Privilege to Communications Between Motorola and its In-House Attorneys 251 is granted.Mailed notice (Ixs, ) (Entered: Oct. 12, 2011)—United States District Court Northern District of Illinois—CM/ECF LIVE, Ver 3.2.3 (Chicago) Civil Docket for Case #: 1:08-cv-03301.

Response by Motorola, Inc.in Opposition to Motion by Plaintiff Memorylink Corp. for protective order regarding second deposition of Mr. Kniskern 253 (Attachments: # 1 Exhibit 1—Jun. 6, 2011 Hearing Transcript Excerpts, # 2 Exhibit 2—Sep. 16, 2011 Email from P. Berk)(Sidrys, Anne) (Entered: Oct. 21, 2011)—United States District Court Northern District of Illinois—CM/ECF LIVE, Ver 3.2.3 (Chicago) Civil Docket for Case #: 1:08-cv-03301.

Minute entry before Honorable Nan R. Nolan:Memorylinks and Non-Party Robert Kniskerns Motion for Protective Order Regarding Second Deposition of Mr. Kniskern 253 is denied. [ For further details see text below.] Mailed notice (Ixs, ) (Entered: Oct. 25, 2011)—United States District Court Northern District of Illinois—CM/ECF LIVE, Ver 3.2.3 (Chicago) Civil Docket for Case #: 1:08-cv-03301.

Notice by Motorola, Inc. / Notice of Motorolas Objections to Magistrate Judge Nolans Jun. 2, 2011 Order Regarding Memorylinks Motion for Ruling Regarding the Assertion of Attorney-Client Privilege at Hugh Dunlops Deposition (Sidrys, Anne) (Entered: Jun. 17, 2011) - United States District Court Northern District of Illinois - CM/ECF LIVE, Ver 3.2.3 (Chicago) Civil Docket for Case #: 1:08-cv-03301.

OBJECTIONS by Motorola, Inc. to order 216/Motorola's Objections to Magistrate Judge Nolan's Jun. 2, 2011 Order Regarding Memorylink's Motion for Ruling Regarding the Assertion of Attorney-Client Privilege at Hugh Dunlop's.Deposition (Attachments: # 1 Exhibit A, # 2 Exhibit B, # 3 Exhibit C, # 4 Exhibit D, # 5 Exhibit E, # 6 Exhibit F, # 7 Exhibit G, # 8 Exhibit H, # 9 Exhibit I, # 10 Exhibit J, # 11 Exhibit K, # 12 Exhibit L, # 13 Exhibit M)(Sidrys, Anne) (Entered: Jun. 17, 2011)—United States District Court Northern District of Illinois—CM/ECF LIVE, Ver 3.2.3 (Chicago).

MINUTE entry before Honorable William J. Hibbler: Motion hearing held on Jun. 21, 2011 regarding defendant's objections to the orders of Magistrate Judge Nolan. Defendant's objections to the orders of Magistrate Judge Nolan are denied for the reasons stated in open court. Mailed notice (jdh) (Entered: Jun. 21, 2011)—United States District Court Northern District of Illinois—CM/ECF LIVE, Ver 3.2.3 (Chicago) Civil Docket for Case #: 1:08-cv-03301.

MINUTE entry before Honorable Nan R. Nolan: Magistrate Judge Status hearing held and continued to Aug. 11, 2011 at 09:45 AM. Defendant is given to Jul. 7, 2011 to file a motion to reconsider re: privilege log. Response is to be filed by Jul. 22, 2011 Reply is to be filed by Jul. 29, 2011. Mailed notice (jms,) (Entered: Jun. 21, 2011)—United States District Court Northern District of Illinois—CM/ECF LIVE, Ver 3.2.3 (Chicago) Civil Docket for Case #: 1:08-cv-03301.

MOTION by Defendant Motorola, Inc. for reconsideration regarding order 216/Motorola's Motion for Reconsideration of This Court's Jun. 2, 2011 Order (Sidrys, Anne) (Entered: Jul. 07, 2011)—United States District Court Northern District of Illinois—CM/ECF LIVE, Ver 3.2.3 (Chicago) Civil Docket for Case #: 1:08-cv-03301.

MEMORANDUM by Motorola, Inc. In support of motion for reconsideration, motion for relief 225/Motorola's Memorandum In Support Of Its Motion For Reconsideration of This Court's Jun. 2, 2011 Order (Attachments: # 1 Exhibit A, # 2 Exhibit B, # 3 Exhibit C, # 4 Exhibit D, # 5 Exhibit E, # 6 Exhibit F, # 7 Exhibit G, # 8 Exhibit H, # 9 Exhibit I, # 10 Exhibit J, # 11 Exhibit K, # 12 Exhibit L, # 13 Exhibit M, # 14 Exhibit N, # 15 Exhibit 0, # 16 Exhibit P, # 17 Exhibit Q, # 18 Exhibit R, # 19 Exhibit S, # 20 Exhibit T, # 21 Exhibit U, # 22 NE 1, # 23 Kniskern Deposition.

WRITTEN Opinion entered by the Honorable William J. Hibbler on Jul. 18, 2011: The Court Denies Defendant's motion to strike 190. Defendant's claim construction reply brief is now due Aug. 1, 2011. The Joint Claim Construction Chart is due Aug. 8, 2011. The claim construction hearing is set for Oct. 12, 2011 at 11:00 a.m. [For further details see written opinion.] Mailed notice (ber,) (Entered: Jul. 22, 2011)—United States District Court Northern District of Illinois—CM/ECF LIVE, Ver 3.2.3 (Chicago) Civil Docket for Case #: 1:08-cv-03301.

SEALED RESPONSE by Memorylink Corp. To MOTION by Defendant Motorola, Inc. for reconsideration regarding order 216/Motorola's Motion for Reconsideration of This Court's Jun. 2, 2011 Order 225 (Attachments: # 1 Exhibit 1,# 2 Exhibit 2, # 3 Exhibit 3, # 4 Exhibit 4, # 5 Exhibit 5, # 6 Exhibit 6, # 7 Exhibit 7)(Berk, Peter) (Entered: Jul. 22, 2011)—United States District Court Northern District of Illinois—CM/ECF LIVE, Ver 3.2.3 (Chicago) Civil Docket for Case #: 1:08-cv-03301.

RESPONSE by Memorylink Corp. in Opposition to MOTION by Defendant Motorola, Inc. for reconsideration regarding order 216/Motorola's Motion for Reconsideration of This Court's Jun. 2, 2011 Order 225 (Attachments: # 1 Exhibit 1,.# 2 Exhibit 2, # 3 Exhibit 3, # 4 Exhibit 4, # 5 Exhibit 5, # 6 Exhibit 6, # 7 Exhibit 7)(Berk, Peter) (Entered: Jul. 22, 2011)—United States District Court Northern District of Illinois—CM/ECF LIVE, Ver 3.2.3 (Chicago) Civil Docket for Case #: 1:08-cv-03301.

REPLY by Defendant Motorola, Inc. to motion for reconsideration, motion for relief 225/Motorola's Reply in Support of its Motion for Reconsideration of This Courts Jun. 2, 2011 Order (Sidrys, Anne) (Entered: Jul. 29, 2011)—United States District Court Northern District of Illinois—CM/ECF LIVE, Ver 3.2.3 (Chicago) Civil Docket for Case #: 1:08-cv-03301.

REPLY by Defendant Motorola, Inc. to memorandum, 179/Motorola's Reply Claim Construction Brief (Attachments: # 1 Exhibit A—Kniskern Deposition Excerpts, # 2 Exhibit B—Schulz Declaration)(Sidrys, Anne) (Entered: Aug. 01, 2011)—United States District Court Northern District of Illinois—CM/ECF LIVE, Ver 3.2.3 (Chicago) Civil Docket for Case #: 1:08-cv-03301.

Joint Claim Construction Chart by Memorylink Corp., Motorola, Inc. (Sidrys, Anne) (Entered: Aug. 8, 2011)—United States District Court Northern District of Illinois—CM/ECF LIVE, Ver 3.2.3 (Chicago) Civil Docket for Case #: 1:08-cv-03301.

STATUS Report / Joint Status Report by Memorylink Corp., Motorola, Inc. (Sidrys, Anne) (Entered: Aug. 08, 2011)—United States District Court Northern District of Illinois—CM/ECF LIVE, Ver 3.2.3 (Chicago) Civil Docket for Case #: 1:08-cv-03301.

MINUTE entry before Honorable Nan R. Nolan:Defendant Motorolas Motion for Reconsideration of This Courts Jun. 2, 2011 Order 225 is denied. [ For further details see text below.]Mailed notice (lxs,) (Entered: Aug. 09, 2011)—United States District Court Northern District of Illinois - CM/ECF LIVE, Ver 3.2.3 (Chicago) Civil Docket for Case #: 1:08- cv-03301.

MINUTE entry before Honorable Nan R. Nolan:Magistrate Judge Status hearing held on Aug. 11, 2011 and continued to Sep. 1, 2011 at 09:45 AM. Mailed notice (lxs,) (Entered: Aug. 15, 2011)—United States District Court Northern District of Illinois—CM/ECF LIVE, Ver 3.2.3 (Chicago) Civil Docket for Case #: 1:08-cv-03301.

TRANSCRIPT OF PROCEEDINGS held on Jun. 21, 2011 before the Honorable William J. Hibbler. Court Reporter Contact Information: Alexandra Roth, (312) 408-5038, alexandra_roth@ilnd.uscourts.gov.

MINUTE entry before Honorable Nan R. Nolan:Status hearing held and continued to Sep. 23, 2011 at 8:30 a.m. By noon on Sep. 22, 2011, counsel shall deliver a joint agenda to chambers detailing issues to be addressed at the status hearing. During the week of Sep. 5, 2011, counsel shall meet and confer regarding a proposal for briefing the remaining attorney-client privilege issues. By Sep. 9, 2011, counsel shall provide the Court with a proposal for briefing the remaining attorney-client privilege issues, including any additional discovery either side would like to take prior to the briefing. By Sep. 21, 2011. MINUTE entry before Honorable Nan R. Nolan:The remaining attorney-client privilege issues following this Court's Jun. 2, 2011 Order shall be briefed as follows: Memorylink's opening brief limited to no more than ten pages due by Sep. 23, 2011; Motorola's brief limited to no more than ten pages due by Sep. 30, 11; Memorylink's reply brief limited to no more than five pages due by Oct. 5, 2011. Mailed notice (lxs,) (Entered: Sep. 13, 2011)—United States District Court Northern District of Illinois - CM/ECF LIVE, Ver 3.2.3 (Chicago) Civil Docket for Case #: 1:08-cv-03301.
MINUTE entry before Honorable Nan R. Nolan: Status hearing set for Sep. 23, 2011 is amended to begin at 10:00 AM. Mailed notice (lxs,) (Entered: Sep. 19, 2011)—United States District Court Northern District of Illinois—CM/ECF LIVE, Ver 3.2.3 (Chicago) Civil Docket for Case #: 1:08-cv-03301.
MINUTE entry before Honorable Nan R. Nolan: Status hearing held and continued to Oct. 06, 2011 at 10:00 AM. By Sep. 23, 2011, Motorola shall provide Memorylink with its concerns regarding the Second Revised Privilege Logs. By Sep. 27, 2011, Memorylink shall address Motorola's concerns by revising the Second Revised Privilege Logs accordingly or explain in writing why it cannot further revise the privilege logs to address Motorola's concerns. By Sep. 30, 2011, counsel shall agree upon firm dates for the depositions of Robert Kniskern and Jon Huard. By Sep. 30, 2011, Memorylink shall supplement its
MOTION by Plaintiff Memorylink Corp.Applicability of Attorney Client Privilege to Communications Between Motorola and Its In-House Counsel (Attachments: # 1 Exhibit a, # 2 Exhibit B, # 3 Exhibit C, # 4 Exhibit D, # 5 Exhibit E, # 6 Exhibit F, # 7 Exhibit G, # 8 Exhibit H)(Berk, Peter) (Entered: Sep. 23, 2011)—United States District Court Northern District of Illinois - CM/ECF LIVE, Ver 32.3 (Chicago) Civil Docket for Case #: 1:08-cv-03301.
SEALED MOTION by Plaintiff Memorylink Corp. RE: Applicability of Attorney Client Privilege to Communications Between Motorola and Its In-House Counsel (Attachments: # 1 Exhibit a, # 2 Exhibit B, # 3 Exhibit C, # 4 Exhibit D, # 5 Exhibit E, # 6 Exhibit F, # 7 Exhibit G, # 8 Exhibit H)(Berk, Peter) (Entered: Sep. 23, 2011)—United States District Court Northern District of Illinois—CM/ECF LIVE, Ver 3.2.3 (Chicago) Civil Docket for Case #: 1:08-cv-03301.
MOTION by Defendant Motorola, Inc.to Reschedule the Claim Construction Hearing (Attachments: # 1 Exhibit 1—Jun. 3, 2011 Status Letter to Judge Nolan, # 2 Exhibit 2—Aug. 26, 2011 J. Krannich Letter, # 3 Exhibit 3—Sep. 16, 2011 Email from P. Berk, # 4 Exhibit 4—Sep. 19, 2011 Email from J. Krannich, # 5 Exhibit 5—Sep. 21, 2011 Email from P. Berk, # 6 Exhibit 6—Sep. 21, 2011 Email from J. Krannich, # 7 Exhibit 7—Sep. 22, 2011 Joint Letter to Judge Nolan)(Sidrys, Anne) (Entered: Sep. 26, 2011)—United States District Court Northern District of Illinois —CM/ECF LIVE, ver 3.2.3 (Chicago) Civil Docket for Case #:.
Notice of Motion to Reschedule the Claim Construction Hearing/ NOTICE of Motion by Anne J. Sidrys for presentment of motion for miscellaneous relief, 243 before Honorable William J. Hibbler on Sep. 29, 2011 at 09:30 AM. (Sidrys, Anne) (Entered: Sep. 26, 2011)—United States District Court Northern District of Illinois—CM/ECF LIVE, Ver 3.2.3 (Chicago) Civil Docket for Case #: 1:08-cv-03301.
Amended—Notice of Motion to Reschedule the Claim Construction Hearing NOTICE of Motion by Anne J. Sidrys for presentment of motion for miscellaneous relief, 243 before Honorable William J. Hibbler on Oct. 4, 2011 at 09:30 AM. (Sidrys, Anne) (Entered: Sep. 28, 2011)—United States District Court Northern District of Illinois—CM/ECF LIVE, ver 3.2.3 (Chicago) Civil Docket for Case #: 1:08-cv-03301.
RESPONSE by Motorola, Inc. in Opposition to SEALED MOTION by Plaintiff Memorylink Corp. RE: Applicability of Attorney Client Privilege to Communications Between Motorola and Its In-House Counsel 242 (Attachments: # 1 Exhibit 1—Jun. 6, 2011 Hearing Transcript, # 2 Exhibit 2—Sep. 1, 2011 Hearing Transcript, # 3 Exhibit 3—Jul. 1, 2011 Strandwitz Deposition Excerpts, # 4 Exhibit 4—Aug. 11, 2010 Kniskern Deposition Excperts, # 5 Exhibit 5—Meyer Declaration, # 6 Exhibit 6—Mancini Declaration, # 7 Exhibit 7—Berry Declaration, # 8 Exhibit 8—Hughes Declaration, # 9 Exhibit 9—.
MINUTE entry before Honorable William J. Hibbler: Motion hearing held on Oct. 4, 2011 regarding motion for miscellaneous relief, 243 . Defendant's Motion to reschedule claim construction hearing 243 is granted. Claim construction hearing reset to Dec. 6, 2011 at 11:00 AM. Mailed notice (jdh) (Entered: Oct. 4, 2011)—United States District Court Northern District of Illinois—CM/ECF LIVE, Ver 3.2.3 (Chicago) Civil Docket for Case #: 1:08-cv-03301.

SEALED REPLY by Memorylink Corp. to MOTION by Plaintiff Memorylink Corp. Applicability of Attorney Client Privilege to Communications Between Motorola and Its In-House Counsel 241 (Attachments: # 1 Exhibit A, # 2 Exhibit B)(Berk, Peter) (Entered: Oct. 5, 2011)—United States District Court Northern District of Illinois—CM/ECF LIVE, ver 3.2.3 (Chicago) Civil Docket for Case #: 1:08-cv-03301.
REPLY by Plaintiff Memorylink Corp. to motion for miscellaneous relief, 241 (Attachments: # 1 Exhibit A, # 2 Exhibit B) (Berk, Peter) (Entered: Oct. 5, 2011)—United States District Court Northern District of Illinois—CM/ECF LIVE, ver 3.2.3 (Chicago) Civil Docket for Case #: 1:08-cv-03301.
MINUTE entry before Honorable Nan R. Nolan: Status hearing held and continued to Nov. 8, 2011 at 9:00 a.m. Counsel shall provide the magistrate judge with a joint letter outlining issues to be discussed at the next status hearing by Nov. 4, 2011. Counsel shall agree on a date for Mr. Huard's deposition as soon as possible. By Oct. 6, 2011, Motorola shall provide Memorylink with its comments regarding alleged deficiencies in the subject matter descriptions of the privilege logs. Memorylink shall respond by Oct. 13, 2011. Motorola shall submit any remaining concerns regarding the.
MOTION by Defendant Motorola, Inc. for leave to file Sur-Reply to Memorylink's Motion Regarding Applicability of Attorney-Client Privilege to Communications Between Motorola and Its In-House Attorneys (Attachments: # 1 Sur-Reply)(Sidrys, Anne) (Entered: Oct. 11, 2011)—United States District Court Northern District of Illinois—CM/ECF LIVE, ver 3.2.3 (Chicago) Civil Docket for Case #: 1:08-cv-03301.
MINUTE entry before Honorable Nan R. Nolan: Defendant's Motion for Leave to File Sur-Reply to Memorylink's Motion Regarding Applicability of Attorney-Client Privilege to Communications Between Motorola and its In-House Attorneys 251 is granted. Mailed notice (lxs,) (Entered: Oct. 12, 2011)—United States District Court Northern District of Illinois—CM/ECF LIVE, ver 3.2.3 (Chicago) Civil Docket for Case #: 1:08-cv-03301.
MOTION by Plaintiff Memorylink Corp. for protective order regarding second deposition of Mr. Kniskern (Attachments: # 1 Exhibit A, # 2 Exhibit B, # 3 Exhibit C, # 4 Exhibit D)(Berk, Peter) (Entered: Oct. 20, 2011)—United States District Court Northern District of Illinois—CM/ECF LIVE, ver 3.2.3 (Chicago) Civil Docket for Case #: 1:08-cv-03301.
RESPONSE by Motorola, Inc. in Opposition to Motion by Plaintiff Memorylink Corp. for protective order regarding second deposition of Mr. Kniskern 253 (Attachments: # 1 Exhibit 1—Jun. 6, 2011 Hearing Transcript Excerpts, # 2 Exhibit 2—Sep. 16, 2011 Email from P. Berk)(Sidrys, Anne) (Entered: Oct. 21, 2011)—United States District Court Northern District of Illinois—CM/ECF LIVE, ver 3.2.3 (Chicago) Civil Docket for Case #: 1:08-cv-03301.
MINUTE entry before Honorable Nan R. Nolan: Memorylinks and Non-Party Robert Kniskerns Motion for Protective. Order Regarding Second Deposition of Mr. Kniskern 253 is denied. Mailed notice (lxs,) (Entered: Oct. 25, 2011)—United States District Court Northern District of Illinois—CM/ECF LIVE, ver 3.2.3 (Chicago) Civil Docket for Case #: 1:08-cv-03301.
Docket Report for United States District Court Northern District of Illinois—CM/ECF LIVE, Ver 3.2.3 (Chicago) Civil Docket Case for Case # 1:08-cv-03301, 32 pp, printed on Oct. 27, 2011 from https:// ecf.ilnd.uscourts.gov/cgi-bin/DktRpt.pl.
Docket Report for United States District Court Northern District of Illinois—CM/ECF LIVE, Ver 4.2 (Chicago) Civil Docket Case for #: 1-08-cv-03301. 27 pp, printed on Jun. 14, 2011 from https://ecf.ilnd. uscouts.gov/cg-bin/DktRpt.pl.
MINUTE entry before Honorable Nan R. Nolan: Status hearing held and continued to Apr. 12, 2011 at 9:30 a.m. Joint status report due by Apr. 8, 2011. Plaintiff reports that it is on track to meet the Apr. 1, 2011 and Apr. 22, 2011 document production deadlines set forth in the Mar. 9, 2011 minute entry as well as the Mar. 23, 2011 deadline regarding designations of Adaptive Mircoware documents. If possible, Plaintiff shall produce responsive documents on a rolling basis. Prior to the next status hearing, counsel shall meet in-person to discuss possible "Stage 2" document discovery. Mailed notice (lxs,).
Minute entry before Honorable William J. Hibbler: Motion hearing held on Mar. 24, 2011 regarding motion to strike 190. Set deadlines as to motion to strike, 190: Resposnes due by Mar. 31, 2011; Replies due by Apr. 7, 2011. Motion by Defendant Motorola, Inc to Strike Memorylink's New Proposed Claim Constructions and the Declaration of Robert J. Kniskern 190 is taken under advisement—ruling to issue by mail. As stated on the record, dates will be reset as needed after the Court rules on certain motions. Mailed notice (pm,) (Entered: Mar. 24, 2011)—United States District Court Northern District.
Response by Memoryrink Corp. in Opposition to Motion by Defendant Motorola, Inc. To strike Response 188/Motion to Strike Memorylink's New Proposed Claim Constructions and the Declaration of Robert J. Kniskern Motion by Defendant Motorola, Inc. to strike Response 188 Motion to Strike Memorylink's New Proposed Claim Constructions and the Declaration of Robert J. Kniskern 190 (Attachments: #1 Exhibit 1, #2 Exhibit 2) (Berk, Peter) (Entered: Mar. 31, 2011)—United States District Court Northern District of Illinois—CM/ECF LIVE, ver 4.2 (Chicago) Civil Docket for.
Minute entry before Honorable Nan R. Nolan: Status hearing set for Apr. 5, 2011 at 11:00 AM. Joint status report due before the end of business day Monday, Apr. 4, 2011. Mailed notice (lxs,) (Entered: Apr. 4, 2011)—United States District Court Northern District of Illinois—CM/ECF LIVE, ver 4.2 (Chicago) Civil Docket for Case # 1:08-cv-03301.
Reply by Motorola, Inc. to Motion by Defendant Motorola, Inc. to strike Response 188/Motion to Strike Memorylink's New Proposed Claim Constructions and the Declaration of Robert J. Kniskern Motion by Defendant Motorola, Inc. to strike Response 188/Motion to Strike Memorylink's New Proposed Claim Constructions and the Declaration of Robert J. Kniskern 190 (Attachments: #1 Exhibit 1, #2 Exhibit 2, #3 Exhibit 3) (Sidrys, Anne) (Entered: Apr. 7, 2011)—United States District Court Northern District of Illinois—CM/ECF LIVE, ver 4.2 (Chicago) Civil Docket for Case # 1:08-.
Minute entry before Honorable Nan R. Nolan: Enter Order setting forth production deadlines as directed during the Apr. 04, 2011 status hearing. [For further detail see separate order(s).] Mailed notice (ber,) (Entered: Apr. 12, 2011)—United States District Court Northern District of Illinois—CM/ECF LIVE, ver 4.2 (Chicago) Civil Docket for Case # 1:08-cv-03301.
Order signed by the Honorable Nan R. Nolan on Apr. 7, 2011, (ber,) (Entered: Apr. 12, 2011)—United States District Court Northern District of Illinois—CM/ECF LIVE, ver 4.2 (Chicago) Civil Docket for Case # 1:08-cv-03301.
Minute entry before Honorable Nan R. Nolan: Status hearing set for Apr. 12, 2011 at 9:15 a.m. to stand. Mailed notice (lxs,) (Entered: Apr. 11, 2011)—United States District Court Northern District of Illinois—CM/ECF LIVE, Ver 4.2 (Chicago) Civil Docket for Case # 1:08-cv-03301.
Minute entry before Honorable Nan R. Nolan: Enter Order regarding the Apr. 5, 2011 status hearing, as request per Magistrate Judge Nolan. [for further detail see separate order(s).] Mailed notice (ber,) (Entered: Apr. 13, 2011)—United States District Court Northern District of Illinois—CM/ECF LIVE, ver 4.2 (Chicago) Civil Docket for Case # 1:08-cv-03301.
Order Signed by the Honorable Nan R. Nolan on Apr. 11, 2011. (ber,) (Entered: Apr. 13, 2011)—United States District Court Northern District of Illinois—CM/ECF LIVE, ver 4.2 (Chicago) Civil Docket for Case # 1:08-cv-03301.
Minute entry before Honorable Nan R. Nolan: Magistrate Judge Status hearing held on Apr. 12, 2011 and continued to May 10, 2011 at 9:30 a.m. Joint status report due by May 6, 2011. Memorylink reorted that it produced approximately 30,000 pages of custodian documents on Apr. 11, 2011. The parties agree that there is no need for a defined "Stage 2" document product. By Apr. 26, 2011, counsel shall let the Magistrate Judge know if they can resolve the attorneys' eyes only de-designation issue and dispute regarding Memorylink's assertion of privilege related to Banner & Witcoff and.
Order Signed by the Honorable Nan R. Nolan on Apr. 12, 2011. Mailed notice (lxs,) (Entered: Apr. 21, 2011)—United States District Court Northern District of Illinois—CM/ECF LIVE, ver 4.2 (Chicago) Civil Docket for Case # 1:08-cv-03301.
Minute entry before Honorable Nan R. Nolan: Status hearing held and continued to May 26, 2011 at 9 a.m. Joint status letter regarding issues to be discussed at the status hearing due by May 23, 2011.

Counsel must plan ahead and work together in good faith to meet the joint status letter deadline. By May 31, 2011, Plaintiff shall produce a replacement disk containing McDonald Hopkin's re-designation of attorneys' eyes only documents. By May 13, 2011, Mr. Krannich shall respond to Memorylink's request for additional information regarding Motorola's Apr. 22, 2011 supplemental product.
Minute entry before Honorable Nan R. Nolan: Status hearing set for May 26, 2011 is stricken and reset to May 25, 2011 at 09:30 Am. Mailed notice (lxs,) (Entered: May 18, 2011)—United States District Court Northern District of Illinois—CM/ECF LIVE, ver 4.2 (Chicago) Civil Docket for Case # 1:08-cv-03301.
Minute entry before Honorable Nan R. Nolan: Status hearing held and continued to Jun. 6, 2011 at 1:00 p.m. By May 27, 2011, Mr. Krannich shall follow-up in writing with details regarding Motorola's Apr. 22, 2011 document production based on the parties' meet and confer session. Each side shall identify any categories of responsive documents which have been withheld as irrelevant by Jun. 1, 2011. The Magistrate Judge shall be copied on all required correspondence. With regard to the metadata issue, Plaintiff may file a short brief addressing the timing of the request for metadata by.
Submission Relating to the Production of Metadata by Memorylink Corp. (Berk, Peter) (Entered: May 31, 2011)—United States District Court Northern District of Illinois—CM/ECF LIVE, ver 4.2 (Chicago) Civil Docket for Case # 1:08-cv-03301.
Response by Defendant Motorola, Inc. to other 213/Motorola's Response to Memorylink's Submission Relating to the Production of Metadata (Attachments: #1 Exhibit A, #2 Exhibit B, #3 Exhibit C, #4 Exhibit D) (Sidrys, Anne) (Entered: Jun. 01, 2011)—United States District Court Northern District of Illinois—CM/ECF LIVE, ver 4.2 (Chicago) Civil Docket for Case # 1:08-cv-03301.
Minute entry before Honorable Nan R. Nolan: for the reasons stated in the Order entered this day, Plaintiffs Motion for Rule Regarding the Assertion of Attorney-Client Privilege at Hugh Dunlop's Deposition [171, 172] is granted in part and reserved in part. Enter Order. Mailed notice (ntf,) (Entered: Jun. 02, 2011)—United States District Court Northern District of Illinois—CM/ECF LIVE, ver 4.2 (Chicago) Civil Docket for Case # 1:08-cv-03301.
Order. Signed by the Honorable Nan R. Nolan on Jun. 2, 2011: Mailed notice (ntf,) (Entered: Jun. 02, 2011)—United States District Court Northern District of Illinois—CM/ECF LIVE, ver 4.2 (Chicago) Civil Docket for Case # 1:08-cv-03301.
Minute entry before Honorable Nan R. Nolan: Status hearing held and continued to Jun. 22, 2011 at 10:00 a.m. By Jun. 13, 2011, Plaintiff shall file a short brief indicating whether it is willing to narrow its request for metadata to specific documents or sufficiently narrow categories of specific documents and Defendant shall file short brief describing the process involved in producing metadata including an estimate of the cost and time involved. For the reasons stated in open court, the Court finds that Defendant has shown good cause to justify extending the deposition of Mr. Kniskern.
Minute entry before Honoroable Nan R. Nolan: Status hearing previously set for Jun. 22, 2011 is stricken and reset for Jun. 21, 2011 at 10:00 Am. Mailed notice (lxs,) (Entered: Jun. 10, 2011)—United States District Court Northern District of Illinois—CM/ECF LIVE, ver 4.2 (Chicago) Civil Docket for Case # 1:08-cv-03301.
Motorola's Submission Relating to the Burden of Producing Metadata by Motorola, Inc. (Sidrys, Anne) (Entered: Jun. 13, 2011)—United States District Court Northern District of Illinois—CM/ECF LIVE, ver 4.2 (Chicago) Civil Docket for Case # 1:08-cv-03301.
Submission Regarding Narrowing Its Request for Metadata by Memorylink Corp. (Berk, Peter) (Entered: Jun. 13, 2011)—United States District Court Northern District of Illinois—CM/ECF LIVE, ver 4.2 (Chicago) Civil Docket for Case # 1:08- cv-03301.
Transcript of Proceedings held on Mar. 15, 2011 before the Honorable William J. hibbler. Court Reporter Contact Information: Alexandra Roth, (312) 408-5038, alexandra-roth@ilnd.uscourts.gov.
Transcript of Proceedings held on Mar. 24, 2011 before the Honorable William J.Hibbler. Court Reporter Contact Information: Alexandra Roth, (312) 408-5038, alexandra-roth@ilnd.uscourts.gov.
Transcript of Proceedings held on Jan. 18, 2011 before the Honorable Nan R. Nolan. Court Reporter Contact Information: Pamela S. Warren, pswcsr@aol.com, 312-294-8907. <P>.

Transcript of Proceedings held on Apr. 5, 2011 before the Honorable Nan R. Nolan. Court Reporter Contact Information: Pamela S. Warren, pswcsr@aol.com, 312-294-8907. <P>.

Transcript of Proceedings held on Aug 4, 2010 before the Honorable Nan R. Nolan. Court Reporter Contact Information: Pamela S. Warren, pswcsr@aol.com, 312-294-8907. <P>.

Transcript of Proceedings held on Oct 28, 2010 before the Honorable Nan R. Nolan. Court Reporter Contact Information: Pamela S. Warren, pswcsr@aol.com, 312-294-8907. <P>.

Docket Report for United States District Court Northern District of Illinois—CM/ECF LIVE, ver 4.2 (Chicago) Civil Docket Case for #: 1-09-cv-074011. 12 pp, printed on Dec. 28, 2011 from https://ecf.ilnd.uscouts.gov/cg-bin/DktRpt.pl.

MANDATE of USCA for the Federal Circuit dated Dec. 8, 2011 regarding notice of appeal 82 ; USCA No. 10-1583; This Cause having been heard and considered, it is Ordered and Adjudged: Affirmed. (ea,) (Entered: Dec. 14, 2011)—United States District Court Northern District of Illinois—CM/ECF LIVE, ver 4.2 (Chicago) Civil Docket for Case # 1:09- cv-07401.

* cited by examiner

|  | EXAMPLE 1 | EXAMPLE 2 | EXAMPLE 3 | EXAMPLE 3 |
|---|---|---|---|---|
| IMAGE PARAMETERS | | | | |
| FRAME SIZE | 512 x 512 | 512 x 512 | 512 x 512 | 512 x 512 |
| FRAME RESOLUTION | 270 x 352 | 270 x 352 | 480 x 352 | |
| FRAME RATE | 15/SEC | 30/SEC | X | |
| COMPRESSION TYPE | JPEG | WAVELET #1 | MPEG | MPEG |
| COMPRESSION RATIO | 50% | 30% | X | |
| AUTO MODE | NO | NO | YES | |
| AUDIO PARAMETERS | | | | |
| NUMBER OF CHANNELS | 1 | 1 | 2 | |
| SAMPLING RATE | 64KBS | 64KBS | 64KBS | |
| COMPRESSION TYPE | NONE | NONE | MPEG | |
| COMPRESSION RATIO | 0 | 0 | X | |
| AUTO MODE | NO | NO | YES | |
| CONTROL | | | | |
| LOCAL | YES | YES | NO | |
| REMOTE | NO | NO | YES | |
| ON DEMAND | NO | NO | YES | |
| TRANSPORT PARAMETERS | | | | |
| REAL TIME(NO ERROR CORRECTION) | YES | NO | X | |
| VERIFIED(WITH ERROR CORRECTION) | NO | YES | X | |
| VARIABLE | NO | NO | X | |
| AUTO MODE | NO | NO | YES | |
| | 0%  30% | 50% | 75% | 100% |

% BANDWIDTH UTILIZATION

X = DON'T CARE AUTO WILL ADJUST

SELF-CONTAINED WIRELESS CAMERA DEVICE, WIRELESS CAMERA SYSTEM AND METHOD

This is a divisional of U.S. patent application Ser. No. 12/207,773, which is a continuation patent application of U.S. patent application Ser. No. 10/351,906 entitled "Self-Contained Wireless Camera Device, Wireless Camera System and Method" filed Jan. 27, 2003. U.S. patent application Ser. No. 10/351,906 is a divisional patent application of U.S. patent application Ser. No. 09/102,457 entitled "Self-Contained Wireless Camera Device, Wireless Camera System and Method" filed Jun. 22, 1998 for which priority is claimed.

FIELD OF THE INVENTION

This invention relates to wireless camera devices, including but not limited to video camera devices and still image devices, and it relates to a wireless camera system comprising a self-contained wireless camera device in combination with a base station device. It also relates to an architecture for provision of peripheral devices in such a system.

BACKGROUND OF THE INVENTION

Simple master-slave portable wireless video recording devices have been proposed in the past, designed to produce video and associated signals and transmit these wirelessly to a recording station. U.S. Pat. No. 4,097,893 describes one such analog device, in which start and stop (i.e. pause) operation of the recording station is controlled from the camera station. Communication of images from the camera station to the recording station is over a VHF or UHF radio channel.

The establishment by the Federal Communications Commission of a nonrestrictive usage frequency band in the 5 GHz range, with channel bandwidth capability for high throughput multimedia data transmission creates a new opportunity for wireless consumer devices having broader bandwidth capability than has heretofore been possible. The ability to efficiently use these frequencies requires greater attention to be given to bandwidth management.

Functionality of previously proposed wireless camera devices has been fairly limited and such devices have so far found little or no acceptance in the consumer marketplace. There is believed to be a demand for a compact, highly functional, broadband wireless camera device.

BRIEF DESCRIPTION OF THE DRAWINGS

FIG. 8 is a table illustrating examples of selection of different combinations of parameters for the purposes of bandwidth control.

DETAILED DESCRIPTION OF THE DRAWINGS

Figure 1:
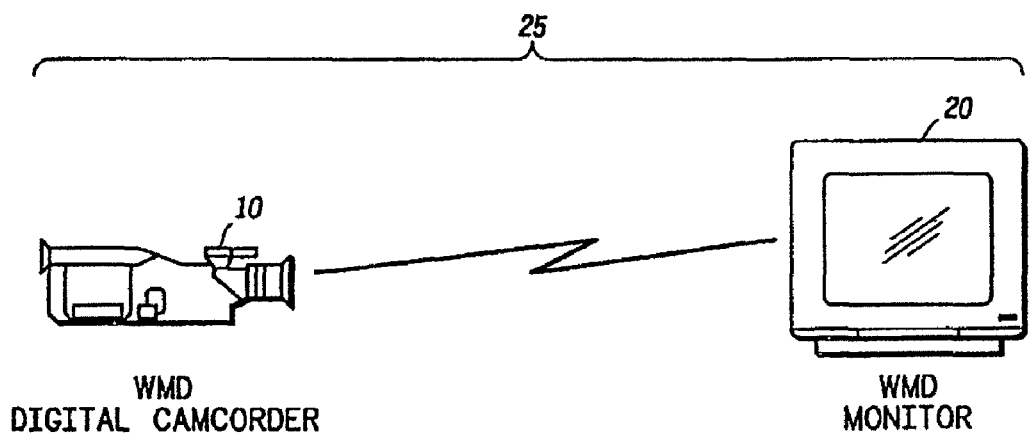
FIG. 1 is a schematic view of a simple point-to-point multimedia device network in accordance with the invention.

Referring to FIG. 1, a basic configuration of a system 25 according to a preferred embodiment of the present invention is shown, comprising a camera device 10 and a base station 20, which is illustrated in a basic form as being a radio base station with a monitor, but can be a mere storage and replay device without a monitor or can be a gateway device.

A first stage in defining the potential for a high quality video/audio-based product, such as that of FIG. 1, lies in creation of a basic set of enabling technologies. These technologies are predicated on the concept that a dedicated set of data transfer and control protocols can enhance the overall performance and cost profiles of any end product schemes utilizing the approach. The following proposed hardware architecture and communications protocol is intended to provide this low cost/high performance solution. The dedicated purpose wireless protocol layering model described provides operating advantages via a tightly coupled integration of communication protocols, which are targeted to provide an optimum solution to the very specific application of transferring optimized blocks of audio/video information in a high frequency digital state. The architecture is consequently less costly based on this narrower set of protocol requirements and the tighter integration of the layers. Because the communication protocol processing is highly integrated, it reduces the general protocol service access requirements needed in more generally applied interchangeable protocol modules. It has a focused set of requirements and can thus be implemented at a very high level of integration, such as a single chip Application Specific Integrated Circuit (ASIC), which reduces the cost of many components while providing the speed needed for some of the higher data rates.

Figure 2:
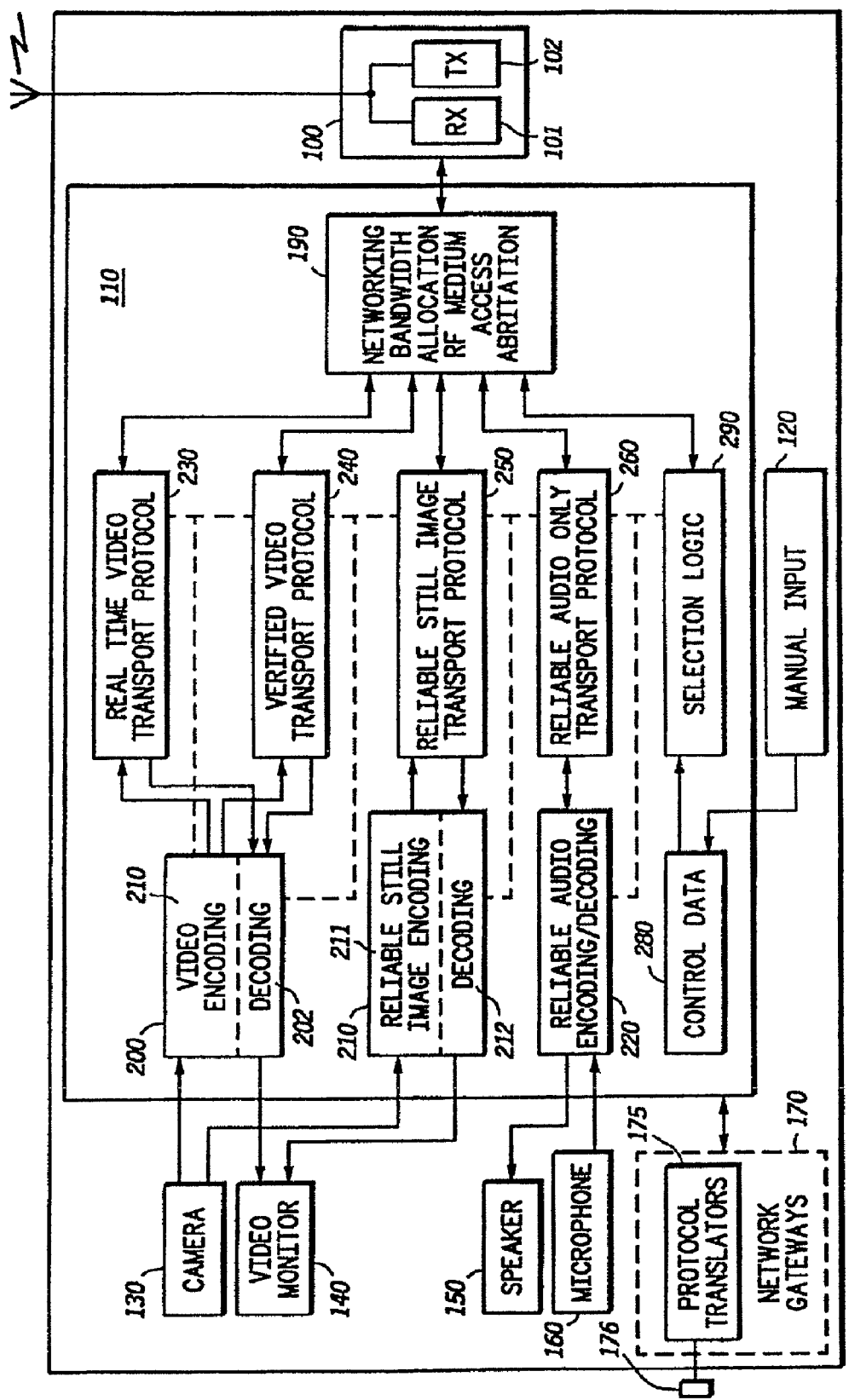
FIG. 2 is a block diagram illustrating the elements of a wireless camera device according to the preferred embodiment of the invention, with optional additional elements for purposes of description of a wireless gateway.

An architecture for a wireless device is illustrated in FIG. 2. The device comprises a full duplex RF transceiver 100 connected to a processor 110, which in turn is connected to a manual input 120 (such as a keypad or control panel), a camera 130 (which has still image and video capability but more generally is any image capture device), a video monitor 140, a speaker 150, and a microphone 160. The transceiver 100 comprises a receiver 101 and a transmitter 102.

A network gateway 170, with protocol translator 175, is also shown in phantom outline. This network gateway is optional in a self-contained wireless camera device and is illustrated here for purposes of later explanation and description of a base station.

The processor 110 can be a microprocessor or digital signal processor or can take the form of an ASIC (with or without an integrated microprocessor). The exact implementation is not important. The processor 110 comprises a video encoding/decoding module 200 (having video compression circuitry 201 and decompression circuitry 202) coupled at an input and an output of the processor to the camera 130 and the video monitor 140 respectively; a still image encoding/decoding module 210 (having video compression circuitry 211 and decompression circuitry 212) also coupled at an input and an output of the processor to the camera 130 and the video monitor 140. It also comprises audio encoding/decoding module 220 coupled at an input of the processor 110 to the microphone 160 and at an output of the processor to the speaker 150.

Within the processor 110 there is also a communications controller 190 coupled to the RF transceiver 100. Coupled between the video encoding/decoding module 200 and the communications controller 190 are a real time video transport protocol module 230 and a verified video transport protocol module 240. Coupled between the still image encoding/decoding module 210 and the communications controller 190 are a still image transport protocol module 250. Coupled between the audio encoding/decoding module 220 and the communications controller 190 is an audio transport protocol module 260. Selection logic 290 is provided, coupled by control connections (shown in dotted outline) to the various modules 200-260. The selection logic 290 is coupled to the communications controller 190 and to a control data-generating module 280, which is coupled to the manual input 120.

In the preferred embodiment, still image encoding/decoding module 210 performs discrete cosine transform or block oriented image compression, such as JPEG (Joint Photographers Expert Group) compression and video encoding/decoding module 200 performs full frame compression, such as wavelet or MPEG (Motion Picture Expert Group) compression. Other types of compression can be used in the modules.

In operation, images are captured by the camera 130 and encoded in either video encoding/decoding module 200 or still image encoding/decoding module 210. They are passed to the respective transport protocol module 230, 240 or 250 and passed to the communications controller 190 for transmission by the RF transceiver 100 over a wideband radio channel. At the same time they can be displayed on video monitor 140. Images are received by the RF transceiver 100 and passed by the communications controller 190 to a selected one of the protocol modules 230, 240 and 260 and from there to the corresponding video encoding/decoding module 200 or still image encoding/decoding module 210 for decoding and for display on the video monitor 140.

Audio signals are received by the microphone 160, encoded in encoding/decoding module 220 and passed to the communications controller 190 via audio transport protocol module 260, for transmission (with accompanying video signals if selected). Audio signals are received by the transceiver 100 (e.g. with accompanying video signals) and are passed by audio transport protocol module 260 to audio encoding/decoding module 220, where they are decoded and output from the speaker 150.

Different transport protocol modules such as modules 230 and 240 are selected according to the application that the user selects for operation. Thus, real time video transport protocol module 230 is selected for real time video and minimizes delay of transmission and delay variation to avoid "jitter", while verified video transport protocol module 240 performs error correction or selected retransmission to provide error-reduced transmission at the expense of delay in transmission. The selection of the transport modules 230-260 and the encoding/decoding modules 200-220 is performed by selection logic 290.

There are two principal processes by which selection logic selects the desired transport modules and the encoding/decoding modules. The first method is by manual selection via the manual input 120 and the second method is by receipt of commands from the RF transceiver 100.

To manually select a transport module and corresponding encoding/decoding module, the user selects an application using the manual input 120. For example, the user can select real time video mode, or verified video mode, or sill image mode and control data generating module 280 generates corresponding control data for selection logic 290 to select the corresponding transport protocol module 230,240 or 250 and its corresponding encoding/decoding module 200 or 210.

To remotely select a transport module and corresponding encoding/decoding module, control data is received via radio transceiver 100 and passed to selection logic 290 via communications controller 190. As before, the selection logic selects the corresponding transport protocol module 230, 240 or 250 and its corresponding encoding/decoding module 200 or 210.

Under control of the manual input 120, control data generating module 280 can generate control data for transmission via the communications controller 190 through the RF transceiver 100 to another camera device or to a base station over the wideband radio channel. If sent to another camera device, the control data is received by corresponding selection logic in the remote camera device. When control data generating module 280 generates control data for transmission to a remote camera device, it can simultaneously cause a selection-by-selection logic 290 of corresponding encoding/decoding and transmission modules in the device 100.

Control signals or commands that can be generated by control data generating module 280 fall into three categories: video control commands, video quality control commands and bandwidth control commands. Video control commands include pause, replay, rewind and fast-forward. They also include sets of commands that cause selection of automatic mode vs. manual mode. Video quality control commands include frame size, frame resolution, frame rate, compression type and compression ratio. Bandwidth control commands define percentage of allocation of bandwidth for a given camera or from one camera to another, expressed as a bandwidth allocation value or a proportion of available bandwidth for as the number of camera devices permitted in a band.

Video encoding/decoding module 200 and real time video transport protocol module 230 can together be viewed as first video processing and video reconstruction circuitry that provide to the transceiver 100 selectively processed first video signals processed according to a selected protocol scheme and provide reconstructed second video signals to the monitor 140. Similarly, video encoding/decoding module 200 and verified video transport protocol module 240 can together be viewed as second video processing and video reconstruction circuitry that provide to the transceiver 100 selectively processed first video signals processed according to a different selected protocol scheme and provide reconstructed second video signals to the monitor 140. Similarly, reliable still image encoding/decoding module 210 and reliable still image transport protocol module 250 can together be viewed as third video processing and video reconstruction circuitry.

Each selected protocol scheme has at least one of a selectable transport protocol, a selectable image coding (compression/decompression) protocol, a selectable audio protocol scheme and a selectable control protocol. Selection of different protocols gives rise to different bandwidth usages and allows more optimized or balanced usage of available bandwidth.

The architecture described and illustrated integrates the various communication protocol layers into a common processing block between the physical layer and the application layer. This architecture decouples the communication protocol layers from the RF transceiver functional block. It also decouples the communication protocol layers from the multimedia I/O which represents the application layer. The architecture is based upon a presumed system in which a variety of transmission and reception devices are operating.

Encoding/decoding algorithms and transport protocols are configured and optimized based on the multimedia data type and the user's preferences. These various data paths converge upon the more common networking, bandwidth allocation, and RF medium access protocols.

FIG. 2 shows that there are differences in transport protocol for real time video and verified video. Real time video, and real time audio are isochronous. This means that these transport protocols must balance the reliable transfer concerns with the timing required for proper presentation at the receiving end. For verified video or audio, the intended immediate destination for the multimedia data is not real time presentation, but rather storage. It is referred to as "verified" since higher levels of reliable transfer (e.g. higher error correction and/or retransmission) can be used without high bandwidth usage.

Figure 3:
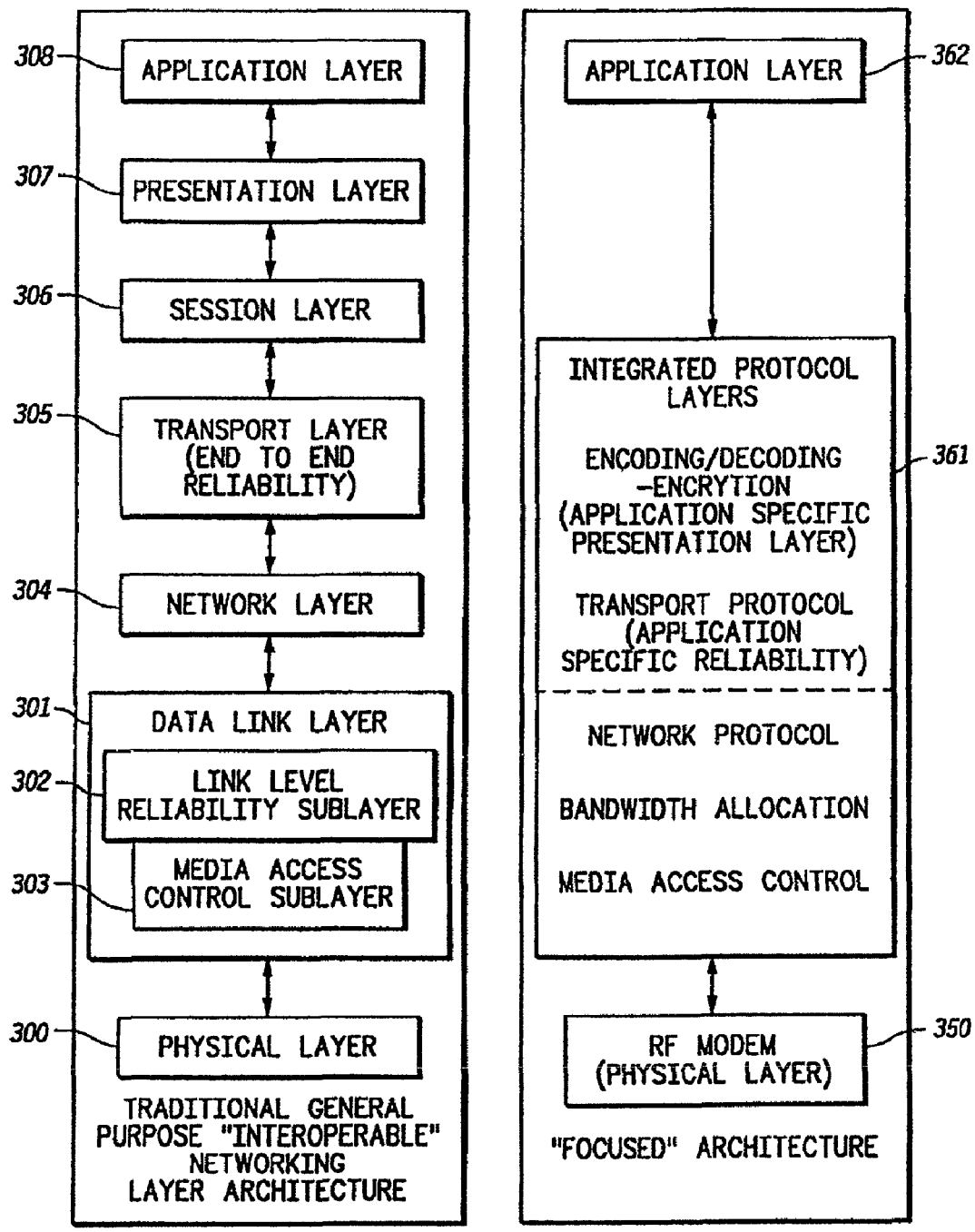
FIG. 3 illustrates a comparison between the protocol structure of a device according to the preferred embodiment of the invention and a standard protocol structure.

The protocol layer stack model to be used in the proposed architecture is compared to the International Telecommunication Union (ITU) standard network protocol layer model in FIG. 3.

On the left hand side of the figure, the standard ITU protocol layer model is illustrated, comprising a physical layer 300 and a data layer link layer 301 having a link level reliability sub-layer 302 and a media access control sub-layer 303. Above the data link layer is a network layer 304 and above the network layer 304 are a session layer 306, a presentation layer 307 and an application layer 308. To the right of this standard model is illustrated, for purposes of comparison, the protocol layer stack model for a camera device according to the preferred embodiment of the invention. This model comprises an RF modem 350, a layer 361 which integrates encoding/decoding, encryption, transport protocol, network protocol, bandwidth allocation, and media access control. The encoding/decoding and encryption is an application specific presentation layer. The transport protocol is an application specific reliability protocol. Above these integrated protocol layers is the application 362.

The RF modem layer 350 is implemented in the full duplex RF transceiver 100 of FIG. 2. The integrated protocol layers 361 are implemented in the processor 110 of FIG. 2 and the application layer 362 is implemented in the form of the camera 130, the video monitor 140, the speaker 150, the microphone 160, and the network gateways 170 of FIG. 2. In the preferred embodiment, the integrated protocol layers 361 are admitted on a logic board and a radio control board, in which processes of the protocol below the dotted line of FIG. 3 are implemented on the radio control board and processes above the dotted line are implemented on a logic board. In effect, this has the result that the encoding/decoding modules 200, 210 and 220 and the transport protocol modules 230, 240,250 and 260 are all implemented on the logic board and the communications controller 190 is implemented on a separate communications control board. The selection logic 290 and the control data-generating module 280 are implemented on the logic board. These details are, of course, not critical and greater integration can be achieved with all the elements of the integrated critical layers being implemented in a single, highly integrated module.

The advantages of a proprietary multimedia communications protocol stack over the ITU standard for this architecture is optimum use of bandwidth, cost, performance, and the flexibility to tailor the protocols for the various multimedia transmissions.

The ITU standard seeks to define each layer independently and to define a set of protocol access points between each layer. The strict interpretation of this model results in creating a set of interchangeable protocol building blocks that provide a very general solution to digital communications networking. Each general purpose protocol building block tends to be a costly, yet reasonable solution for a broad range of networking challenges. This architecture is critical for heterogeneous, standardized networks that are built from commercially available, interoperable components. Conversely, the dedicated purpose architecture now described builds a homogeneous RF wireless network with a uniquely qualified set of components.

The architecture described focuses upon providing optimum solutions for a particular family of wireless devices. It provides transmission reliability at the link layer and not on an end-to-end regime. (An end-to-end reliability is not needed since there is no multiple-hop routing in the common uses of the wireless network.) If an application is developed which needed end-to-end reliability within the wireless network, layers can be added between the application layer 362 and the integrated protocol processing block 361. For the current applications, the transmission reliability is specific tailored to the needs of the user, the multi-media data type being transferred, and the RF environment.

Figure 4:
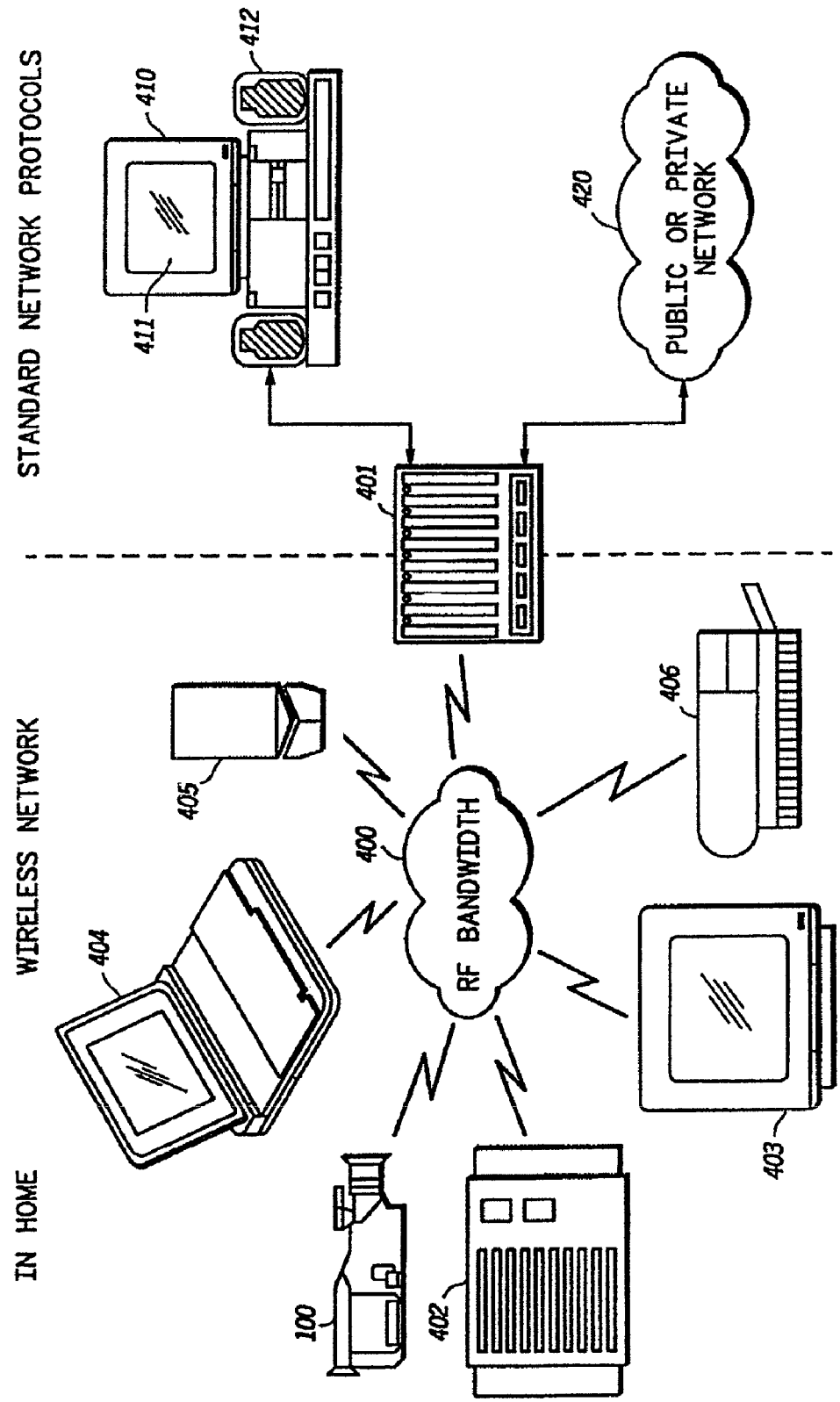
FIG. 4 illustrates a wireless camera system according to a preferred embodiment of the invention.

The architecture described operates in a somewhat closed homogeneous RF wireless network. The limited set of components that operate within the network only need to be interoperable with each other. The closed nature of the network allows value added features to be included, with a controlled, limited impact upon existing device interoperability. The ability to include such value added features, allows the wireless product developer to differentiate this product from the others in the market using other network approaches. The closed aspect of this architecture does not, however, limit interoperability with other, more general purpose networks. Network gateways 170 bridge the wireless network with other standard networks. FIG. 4 illustrates the use of a gateway to interconnect the proposed wireless network to standard networks.

The presence or absence of network gateways 170 in a particular device depends on the function of that device. For example, a self contained wireless video or still camera need not have network gateways 170, while a dedicated base station preferably has network gateways 170 but does not have the camera 130, video monitor 140, speaker 150 or microphone 160. Accordingly, the particular application layer devices that are included in any particular product will depend on the intended function of the camera device product.

Referring to FIG. 4, the wireless camera device of FIG. 1 is shown communicating over a wideband radio channel 400 to a wireless multimedia gateway 401 and a wireless disk drive 402 and a wireless monitor 403, as well as other miscellaneous devices which will not be described in detail, but may include a lap-top computer 404, a remote control device 405 and a printer 406. Each of the devices 100 and 401 thru 406 has an architecture as described with reference to FIG. 2 and FIG. 3. The gateway 401 communicates with a multi-media personal computer 410 having a monitor 411 and audio speakers 412 and it communicates with a public or private network 420.

The wireless multimedia gateway depicted in FIG. 4 provides protocol translation to convert the wireless protocol to the standard public network protocol or the standard PC interface protocol. The gateway converts the focused, optimized protocol used on the wireless network to general purpose protocol, such as Internet protocol (IP) used in the open system networks. In essence the gateway provides the wireless network devices with points of interoperability to outside systems. The provision of the gateway 401 has a number of advantages, including the ability to network multiple camera devices and operate them under remote control.

This invention, in its preferred embodiment, also provides flexibility of bandwidth usage for video quality and transmission reliability tradeoffs. Bandwidth can be traded for video quality and transmission reliability based on the needs of a given application. The approach described is inherently bandwidth sensitive. The estimated peak bandwidth limit is at least 10 Mbps. This rate is sufficient to support various combinations and quality levels of the transmission of video, still images, audio, data, graphics and text. A goal is to provide a bandwidth usage strategy that will accommodate the maximum number of devices in a wireless network with highest possible transmission reliability and the level of video quality necessary for a given application.

Video quality and reliability are singled out for discussion over other multimedia types because of the large demand placed on bandwidth by video transmission and the bandwidth tradeoffs that are possible with video. Video quality is represented as resolution of each video frame, the rate at which the video frames are updated and compression rate of the transmitted video.

The resolution of still images that make up the video are only limited by the image sensor of the camera. Given a high end image sensor, video resolution can be supported in a range from HDTV (high definition television) or high resolution computer monitor quality to very small thumbnail images. The lower the video resolution the more grainy the video image appears. Higher video resolution will require commensurate higher bandwidth usage for transmission. Selection of video resolution is based on the application demands and/or the user's preferences.

Video frame rate is the speed that still image frames are presented upon the monitor of the base station 20 or the monitor 140 of the camera device to produce the illusion of full motion video. The described technology can support video frame rates ranging from National Television Standards Committee's (NTSC) standard of 60 interlaced fields per second through stop action video used for video conferencing to single frame still images. Slower than the above noted video frame rates can introduce an unintended effect of jerkiness in the motion of high speed "action" video sequences. Faster video frame rate signals will require higher bandwidth usage for transmission. Selection of video frame rate is, again, based on the application demands and/or the user's preferences.

Video compression rate is an indication of the amount by which the video data has been reduced using various compression techniques. For instance, broadcast quality, uncompressed digital video requires a bandwidth of 150 Megabits per second (Mops). Given 10 Mbps limit of the RF subsystem, uncompressed digital video transmission is not practical. Current standard video compression algorithms, including MPEG, wavelet, or H.320, will compress video to within these speed limitations. Any video compression will cause some loss of the video data, but the amount of loss can be limited based on the video compression rate. Lower rates of video compression provide higher perceived image quality and use more bandwidth. The compression ratio/bandwidth tradeoff is dependent upon the application. A baby monitor, for instance, could operate with a high video compression rate and use less bandwidth because of the lower demands for image quality.

As with video quality, the unique timing requirements of video directly relate to reliability. As discussed earlier, there is a different set of concerns with the transmission of real time video versus verified video. As previously noted, real time video is a video stream that is played back, to the user's perception, immediately upon reception. Verified video, or non-real time video, is not intended to be played back immediately, but rather is stored for later viewing.

The transmission of real-time video must be isochronous to prevent buffer over flow or underflow in the receiving end. In other words a steady flow of video data must be received such that it can be displayed without either running out of or being overrun by video data. Non-real time video is not sensitive to this problem, unless the transmitting end is in danger of overrunning its buffers between the image acquisition and transmission phases.

The transmission of real time video and non-real time video presents a tradeoff in reliability. The reliable transmission of video data that results in later video delivery for a real time application serves no purpose. Specifically, video that is not received within the presentation time will cause a frame skip. In the event that a frame is to be presented but has not been completely received, a buffer underflow condition occurs which results in a frame skip. Transmission of non-real time video is not constrained by the timing of immediate playback. As a result more reliable transmission methods can be used to create a non-real time yet verified video transmission, thus the term "verified video".

Figure 5:
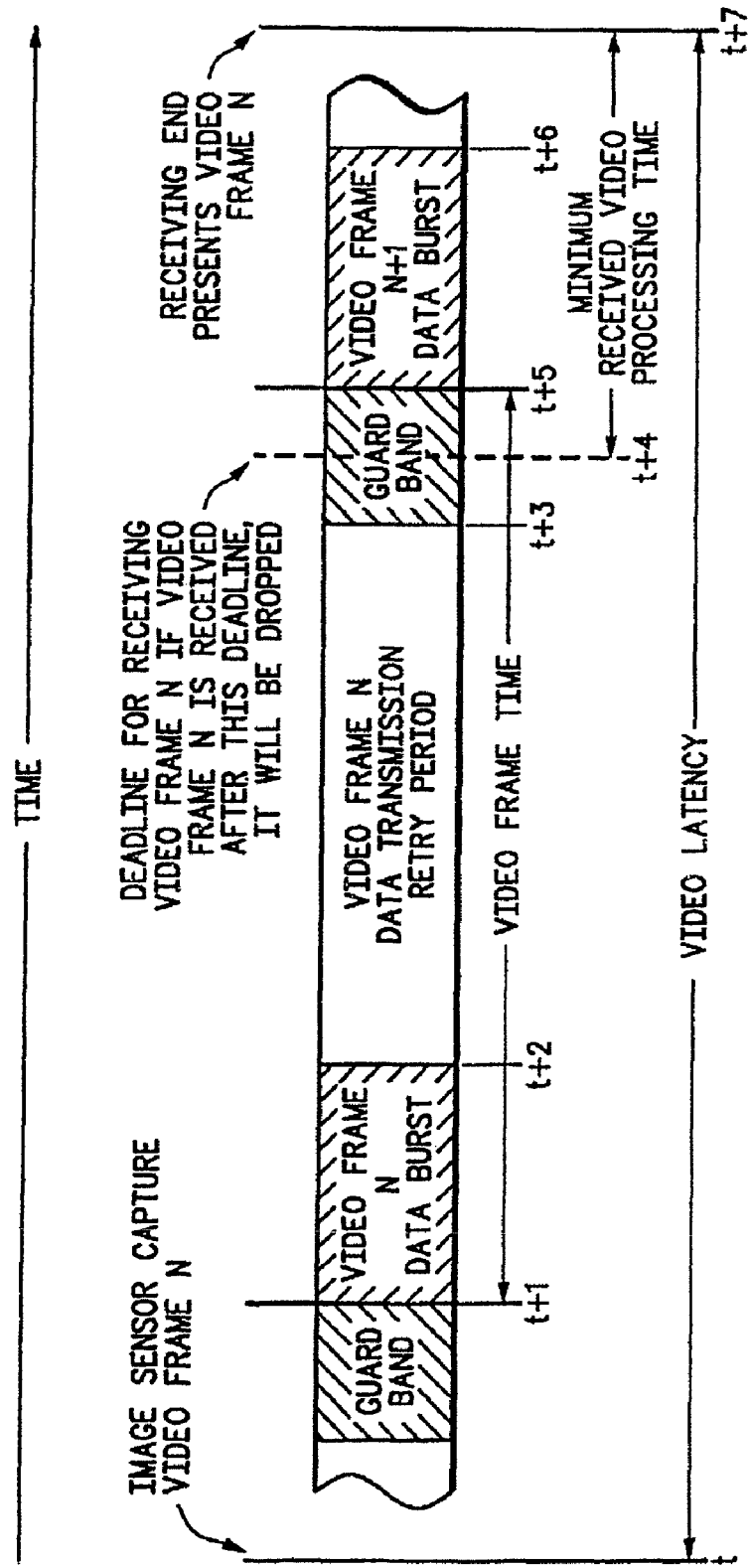
FIG. 5 is a time diagram illustrating video frame transmission for the purposes of explanation of re-transmission.

Re-transmission can be used to provide some limited measure of reliability for real time video transmission. A goal of this method is to provide time for transmission retries prior to presentation time. The method tends to balance the amount of reliability and allocation, with bandwidth or larger receive buffer sizes and increased video latency. FIG. 5 presents a simplified example of video frame transmission timing which illustrates some of the parameters for the retransmission method. In practice the technique may be complicated by such issues as the MPEG video compression scheme, which does not always transmit full video frames.

As FIG. 5 shows, a burst of video frame data at bandwidths higher than the constant video rate will provide time for transmission retries prior to the next video frame burst. Beginning at time t the image capture device (e.g. camera 130) has captured a complete video frame N. Starting at this time it is the function of the transport protocol layer to deliver this frame reliably to the corresponding transport protocol layer at the receiving end.

Time t+1 (which occurs following a guard band following preceding activity on the channel), the transmitter transmits the video frame N in a data burst, completed at the time t+2. Starting at time t+2, there is a period extending to time t+3 during which the transport protocol layer module of the receiving device (specifically verified video transport protocol module 240 of FIG. 2) receives the video frame N data burst, performs error correction using any embedded error correction code in the data burst and determines whether the data burst is received correctly. If it is not received correctly, the verified video transport protocol module of the receiver sends a negative acknowledgment message to the verified video transport protocol layer module of the transmitter and there is an opportunity for the transmitter to perform a re-try, retransmitting video frame N data burst. At time t+4 illustrated by the dotted line in FIG. 5, there is a deadline for receiving video frame N. If the receiver does not successfully receive video frame N before this deadline, the video frame is dropped.

The receiver has a timer (not shown in FIG. 2) which commences timing at time t+2 (or can commence timing at t+1), as measured at the receiving end, and if the receiver transport layer protocol cannot determine before time t+4 that frame N has successfully been received, it drops the frame and awaits the next video frame data burst N+1. This data burst is transmitted by the transmitting device at time t+5, ending at time t+6. The receiver (assuming it has successfully received video frame N data burst) waits until time t+7 before presenting video frame N on the receiver monitor. By delaying until time t+7, the receiver has the time from t+4 until t+7 as its minimum received video processing time. If the receiver fails to receive video frame N data burst, it can simply present the preceding video frame. The overall latency in the system is from time t to time t+7. Every frame will be delayed by the receiver until time t+7 (regardless of whether the frame was received before time t+4), with the result that jitter at the receiver monitor is avoided.

Using this technique, average video bandwidth increases based on the average number of retries. The video burst rate of bandwidth that is needed to support this method depends upon the amount of time left for retries, which in turn dictates the reliability of the transmission.

Time for transmission retries can also be increased by providing more buffer space for in transit video data. Increased buffering will increase the video latency which, as shown in the FIG. 5, is the time between capturing and presenting the video. The amount of acceptable video latency will be dependent upon the application. For example, long video latencies in a two-way interactive video application can be awkward and distracting to the users.

Real time audio is also isochronous and as such shares these same issues. However, due to lower bandwidth requirements for audio, this issue is not as costly to solve in terms of bandwidth, processing power, and end-to-end latency.

In case of audio/video program transmissions, the audio and video presentations are synchronized.

The method of access control to the RF media is not critical. Methods that can be employed include Frequency Division Multiplex (FDM) techniques or Time Division Multiplex (TDM) techniques or in some advanced cases Code Division Multiplex (CDM) techniques. Methods may also include fixed allocation of bandwidth or dynamic allocation of bandwidth based on need.

It is not critical whether a decentralized type of media access control is used in, or a direct central control of allocation by a gateway is used. For instance, decentralized control has the advantage of allowing any combination of wireless devices to interact, without the added expense of a central control unit. A decentralized control approach also minimizes the risk of single point failure.

The wireless transmission technology in the lightly regulated environment of the 5.2 GHz band is very flexible. The flexibility of this technology can be taken advantage of to develop a whole family of products, each with its own characteristic use of the technology. Those products share many common attributes. For example, if they are to interoperate at the local area level, each must: support a subset of the various multimedia transport protocols; provide the RF and antenna control sections; and share a networking and RF media access control algorithm.

One of the primary issues of a network protocol in a wireless network is to allocate bandwidth and time slots to the members of the network. This issue favors a tight integration of network and media access control layer. For the purpose of explanation of bandwidth allocation and control, FIG. 6 is presented, illustrating a network such as that of FIG. 4 with the addition of second and third wireless camera devices 600 and 601.

Figure 6:
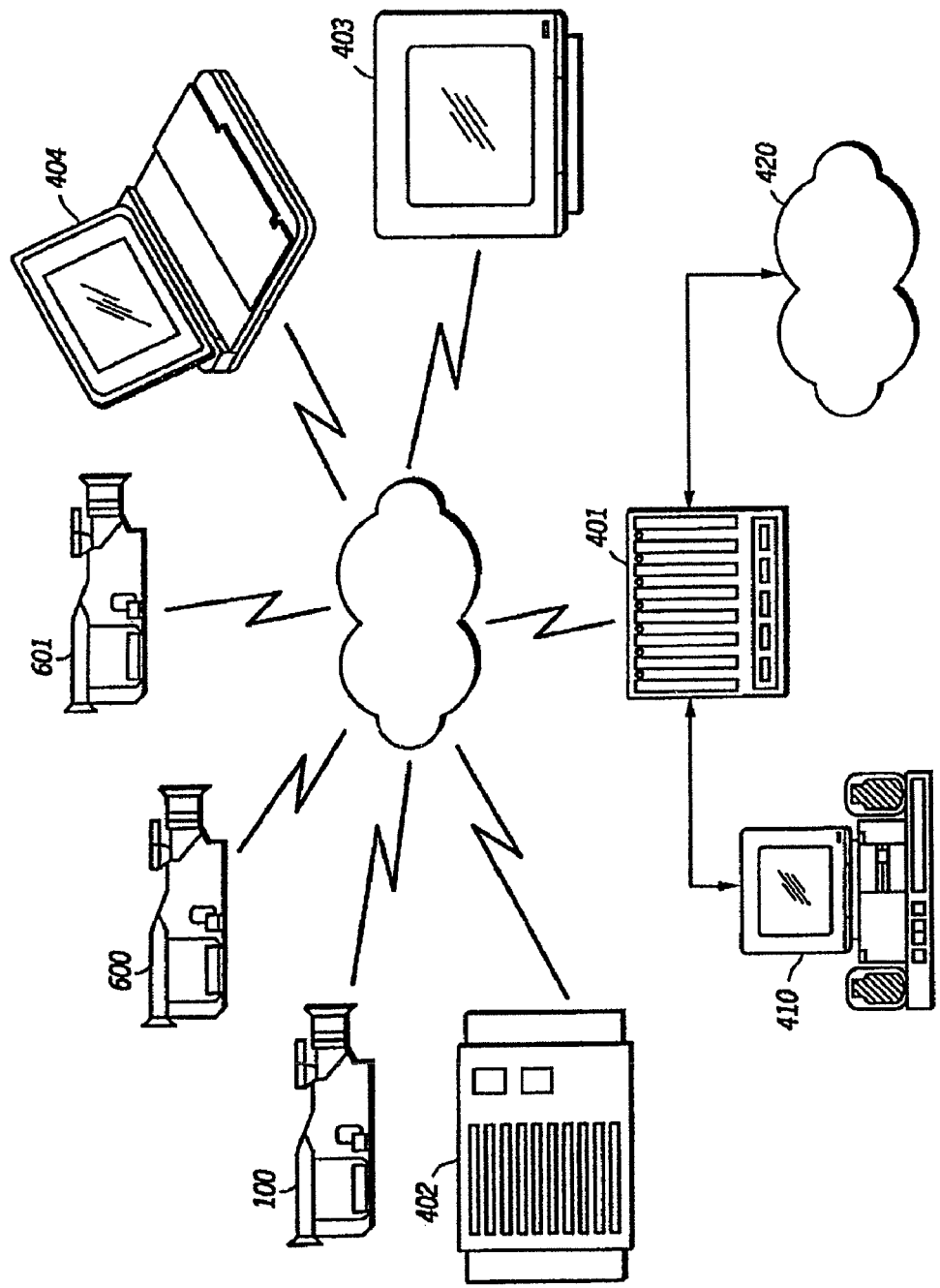
FIG. 6 is a system similar to that of FIG. 4 but with additional wireless camera devices.

In the complex network, of FIG. 6, a "smart" control of bandwidth based on the user's intentions is provided.

Under this scenario, the user may have multiple low resolution video inputs. In the event that the user wishes to focus in detail on the output of a single video source, e.g. wireless camera device 600, commands to increase frame rate or resolution may be sent to the camera device 600 (or other input device). At the same time, commands are sent to the other video image capture devices 100 and 601 to reduce their frame rates or resolution in an effort to balance the bandwidth usage.

The capability described enables the organization of a number of "local" RF clusters of devices into logically accessible "higher level" groups that shield the user from the specific internal system details of that organization, and still permit an authorized remote user to modify the operation of any particular device.

Figure 7:
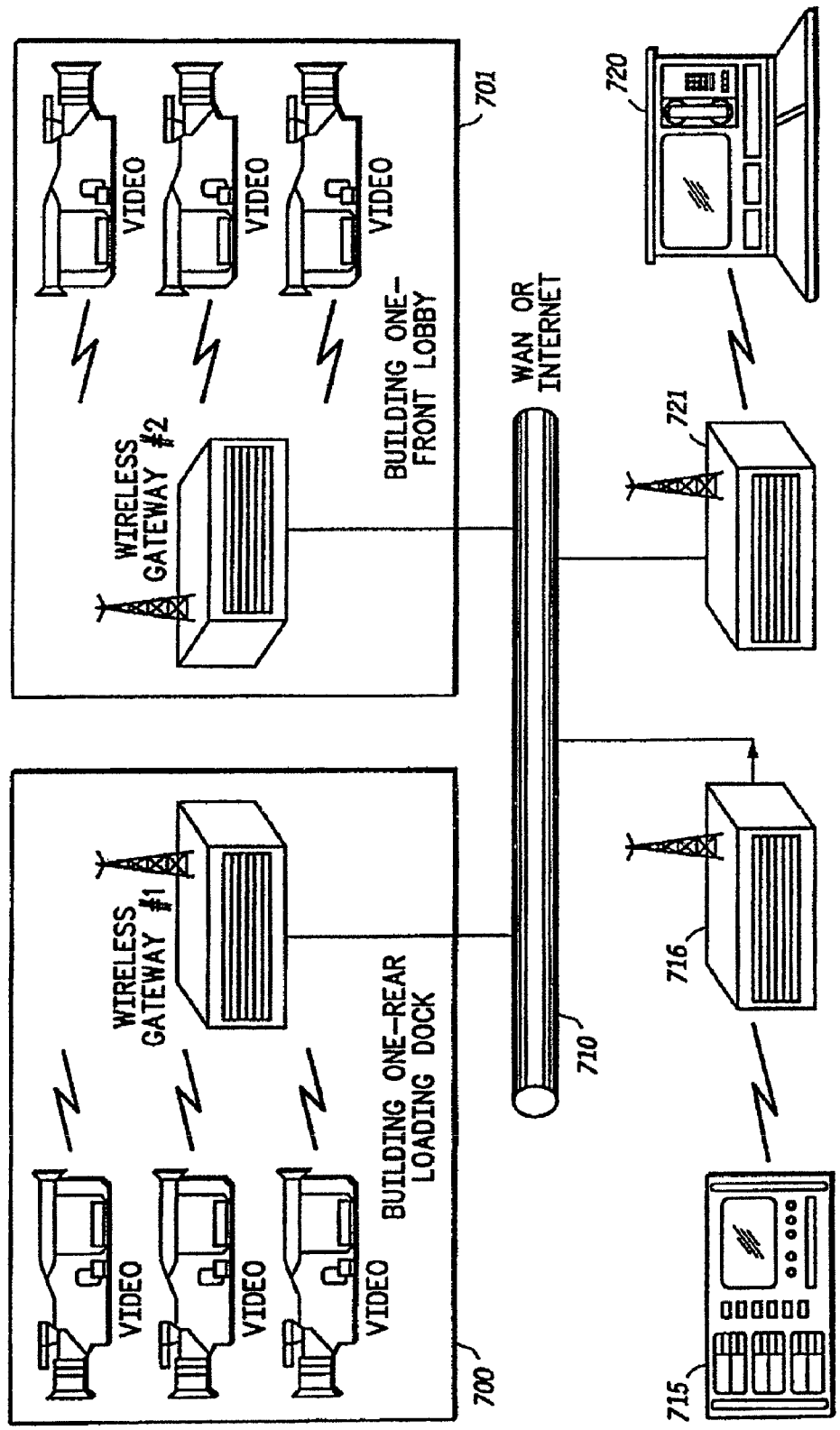
FIG. 7 illustrates a system similar to that of FIG. 6, in the context of a security system.

One simple application example that could use this approach would be a campus security system illustrated in FIG. 7 that has a considerable number of wireless devices providing audio and visual surveillance. These devices could be arranged in groups 700 and 701 at various physical locations, (for instance at doors and windows of the buildings in the complex). These "local" RF clusters of devices could be interconnected by standardized Local Area Networks (LAN's) 710 to provide access to the devices from display equipment located anywhere on the LAN (e.g. security monitoring stations 715 and 720 via wireless gateways 716 and 721).

This approach to organizing the access to the devices provides a very powerful logical mapping or switching capability. For instance, the media information from a group of cameras located on the rear of the first building could be accessed as a single file of media data that contains multiple time stamped views and is logically labeled as "Building One—Rear Loading Dock". In addition, the users operating the display equipment could change various operating parameters of the surveillance equipment for maximum flexibility.

FIG. 8 illustrates examples of various parameters that can be adjusted to control bandwidth utilization between multiple devices operating on a common bandwidth. The various rows in the table of FIG. 8 are different parameters that can be adjusted or selected and the different columns show various examples of how these parameters give rise to different bandwidth utilization estimates.

The adjustable parameters fall into four broad categories: image parameters, audio parameters, control parameters and transport parameters. Selectable image parameters include frame size, frame resolution, frame rate, compression type, compression rate, compression ratio and auto mode. Selectable audio parameters include number of audio channels, sampling rate, compression type, compression ratio and auto mode. Control parameters include local operation, remote operation and on-demand mode. Transport parameters include real time (i.e. no error correction) verified (i.e. with error correction), variable and auto mode.

In examples 1 and 2 of FIG. 8 the frame size is 512×512 and the frame resolution is 270×352. In the first example the frame rate is 15 frames per second, the compression type is JPEG, the compression ratio is 50% and auto mode is off. In the second example, the frame rate is 30 frames per second, the compression type is wavelet #1, the compression ratio is 30% and the auto mode is off. For examples 1 and 2 the audio parameters are the same and the control parameters are the same. In example 1 error correction is used while in example 2 error correction is not used. As a result of these alternative selections of parameters, example 2 gives rise to higher bandwidth utilization than example 1. In the table the estimated bandwidth utilization of example 2 is 50%, while the estimated bandwidth utilization for example 1 is only 30%.

From this, it can readily be seen that two cameras can simultaneously be operated using the high frame rate and high level of verification of example 2, but if a third camera device is to enter the same bandwidth, it would be preferable (indeed necessary) for all three cameras to revert to the combination of parameters illustrated in example 1. The switching from the set of parameters of example 2 to the set of parameters of example 1 takes place in response to each camera that is operating according to the parameters of example 2 receiving a control command requiring those cameras to degrade to a lower bandwidth utilization. The control command can come from a central controller such as the security monitoring station 715 of FIG. 7 or can come from the third camera (e.g. camera device 601 of FIG. 6) making a request to enter the shared bandwidth. The latter scenario provides an ad hoc network in which all users would voluntarily degrade as the network became more congested. In such an arrangement it is preferable to provide a minimum level of service (e.g. that of example 1) beyond which a given device would not degrade further. Upon reaching this minimum level of service, all devices being requested to degrade respond with a negative acknowledgment, in effect telling the requesting device that no further bandwidth is available.

The third example of FIG. 8 has the same frame size as the first two examples, but has a higher frame resolution of 480× 352 pixels and uses MPEG compression. Two audio channels are provided, using MPEG audio compression, and remote and on demand control is enabled. In this example, a single wireless camera device will use 75% of the available bandwidth. Clearly when a single camera device operates using these parameters, no other device is able to enter the channel (unless that other device can enter at a bandwidth utilization even lower than the bandwidth utilization of example 1).

In the scenario of FIG. 7, in the event that a user monitoring the surveillance area from one of the security monitoring stations 715 and 721 wishes to examine with greater scrutiny a particular camera, a command can be sent to one of the cameras (e.g. camera device 601 of FIG. 6) instructing that camera to increase its resolution as shown in example 3 of FIG. 8 and to change its compression type, while at the same time frames are sent to other camera devices (e.g. devices 10 and 600) instructing those camera devices to degrade completely, either by ceasing transmission or by reducing their frame rates to a very low level.

In the preferred embodiment, selection logic 290 of FIG. 2 comprises a pre-programmed table of different levels of service in which different combinations of parameters of FIG. 8 are preprogrammed. In this manner, a user can select, through manual input 120, a particular package of parameters to support a particular desired application. Examples of packages of desired parameters could include still images, scenic video, motion video, security surveillance, etc. According to the selected application, the optimum package of parameters is selected.

Referring one again to FIG. 6, the provision of gateway 401 makes the home wireless network a conduit for audio/video recording and playback, video on demand from an outside network, and wireless network browsing (as well as other functions) simultaneously. In a multi-user, multi-function environment, shared components such as monitors or disk drives 402 must be addressable and may also must provide a form of dedicated access to prevent users from corrupting each other's data.

The system is easy for the consumer to use and reconfigure. The initial products should be capable of detecting the components in the system configuration and acting accordingly. Adding a new component to the system should not pose a technical challenge to the user.

Privacy and security algorithms are included that allow a home's wireless components to interact without concern that components outside the home network can gain access or provide interference. These algorithms provide authentication and encryption. As new components that are added to the network, each is easily synchronized with the unique security "keying" that provides secure access.

Some of the main product configurations for video and/or audio delivery are: point to point video; multi-point video; full duplex video; and point-to-point, multi-point, full duplex audio.

The point to point video category encompasses the set of applications where there is a need to transmit video from an origination site to a reception site. Multi-point video encompasses the set of applications where there is a need to transmit video to or from an origination site to multiple reception sites. Full duplex video includes the set of applications where there is a need to transmit and/or receive video from two or more origination and/or reception sites.

The same options exist for audio configurations to be added to most of the video configurations.

The range of these potential configurations are illustrated by FIG. 6. Many of the potential product embodiments described based upon the core technology require connection with outside, standard networks such as the Internet. In this case, a device class for providing data translation support also present an opportunity for provision of dedicated purpose, integrated application modules. Termed "wireless gateway" for this discussion, this class of devices share some common characteristics.

Various models and options of wireless gateways may be provided. All wireless gateway models capability of receiving and transmitting at bandwidth levels that are necessary to transfer the various multimedia data types, remote control, or transport protocol signaling. Wireless gateways must be capable of supporting the features of the other devices in the premise's wireless network, as well as the user's external connection requirements. Each user will have a different set of expectations for connection to the outside world and potential hardwired networks within the household that the gateway may support.

A high end model wireless gateway could provide expansion slots for various Network Interface Cards (NIC). The fully equipped gateway may support cable modems, satellite antenna connections, and telephone lines, to the external world as well as internal hardwired networks such as Ethernet.

The wireless multimedia gateway contains the capability of high bandwidth receive and transmit. For instance, it can receive verified video and still images for storage. It may transmit video either real time to the monitor or verified video and still images for transfer to the PC or the network, or it may transmit and receive at much lower rates for remote control and transport protocol signaling.

The gateway may also provide direct access to non-wireless shared resources, such as disk drives and printers. The gateway provides the ability to receive remote control from either a directly connected PC, an incoming telephone call, or a wireless remote control device. Remote control commands from a PC or the external network may be routed to other hardwired wireless devices.

Various models of wireless video image acquisition devices such as cameras may be provided. All camera models can use high bandwidth for transmission of real time video data and each can use low bandwidth to transmit and receive for remote control and transport protocol signaling. Higher end camera models may provide more flexibility and capabilities in terms of video frame rates, image resolution and video compression rates. They may also support synchronized audio and video. Inexpensive camera applications, such as an infant monitor, can have lower target bandwidth usage by taking advantage of low resolution image sensor, fixed transmitted resolutions, slow, fixed rate video framing, and high video compression ratios.

The wireless monitor supported by this modular system could also impose a wide range of demands. In one embodiment, it could be a high bandwidth receive device and low bandwidth transmit device. It may receive real time audio/video only for immediate playback or still images for display. It, in turn, may transmit and receive at much lower rates for remote control and transport protocol signaling. Other various models of wireless video monitors may also be provided, each with its own minimum and maximum demands. For instance, some monitor models may use high bandwidth for reception of video stream data or high resolution still images. Higher end monitor models will likely provide more capabilities in terms resolution and compatibility with the higher end cameras.

Monitor 403 is able to receive real time video whether it is received from a camera or a storage device. Added options may include provision of a port for a photo printer that prints the currently displayed still image or video frame. Among the advanced features of a wireless monitor there may be an option to split the screen for inputs from various sources or display on screen information in the form of overlays or digital effects. This option is also highly dependent upon how the bandwidth is shared between various components.

The storage peripheral 402 denoted as "wireless disk drive," has the capability of high bandwidth data receive and transmit. It receives verified audio/video and still images for storage. It is also capable of receiving real time audio/video for applications that both record and play back simultaneously. An optional feature is transmission of audio/video data in either real time mode to the monitor or verified audio/video and still images for storage to the gateway. As with other network devices, the drive transmits and receives at much lower rates for remote control and transport protocol signaling. This device provides storage that can be archived and is easily expandable. (One configuration option may support a removable hard disk type device to provide such capability. For instance, one and two gigabyte removable disks are available on the market today that provide sufficient storage for log video streams and a multitude of still images. Even a 100 Megabyte removable disk would be useful for fairly extended video streams.)

More than one type of wireless video disk drive may be provided. All wireless disk drive models bear the capability of both receive and transmit using variable bandwidths needed to transfer the various multimedia data types, remote control, or transport protocol signaling. The higher end wireless disk drive models provide more capabilities in terms of storage and multiple user support features.

In summary, the system described optimizes the relatively unregulated characteristics of the new frequency allocation to provide extremely high quality transmission in a small, low cost and power efficient end product package, enabling the creation of a revolutionary class of video-enabled, personal communication devices.

The various arrangements described above and illustrated in the figures are given by way of example only and modifications of detail can be made by one of ordinary skill in the art without departing from the spirit an scope of the invention.

We claim:

1. An wireless device comprising:
   a camera generating video information contained in a signal transmitted over a wireless channel, wherein the wireless channel has a total bandwidth capability; and
   a communications interface receiving an initial command to utilize a first bandwidth utilization on the wireless channel in accordance with a first set of parameters and receiving a subsequent command to utilize a second bandwidth utilization on the wireless channel in accordance with a second set of parameters, wherein the second bandwidth utilization is less than the first bandwidth utilization and wherein a total bandwidth utilization of all wireless devices communicating on the wireless channel is not greater than the total bandwidth capability of the wireless channel.

2. The wireless device of claim 1, wherein the communications interface changes from the first bandwidth utilization to the second bandwidth utilization in response to the second command.

3. The wireless device of claim 1, wherein the communications interface continues to utilize the first bandwidth utilization and sends a negative acknowledgment in response to the second command.

4. A method comprising:
   configuring at least one device to utilize a first bandwidth utilization on a wireless channel in accordance with a first set of parameters;
   receiving a request from another device to utilize the wireless channel; and
   when a total bandwidth capability of the wireless channel is exceeded with the second device operating at the first bandwidth utilization, instructing the at least one device and the other device to configure at a second bandwidth utilization in accordance with a second set of parameters, wherein a total bandwidth utilization of the at least one device and the other device is not greater than the total bandwidth capability of the wireless channel.

5. The method of claim 4, wherein the at least one device and the other device transmit video data over the wireless channel.

6. The method of claim 4, further comprising:
   receiving a negative acknowledgement from the at least one device in response to instructing the at least on device to reduce from the first bandwidth utilization to the second bandwidth utilization.

7. The method of claim 4, further comprising:
   changing, by the at least one device, from the first bandwidth utilization to the second bandwidth utilization in response to the instructing.

8. An apparatus comprising:
   a communications interface;
   a controller:
   communicating with at least one device and another device through the communications interface over a wireless channel;
   configuring the at least one device to utilize a first bandwidth utilization on a wireless channel in accordance with a first set of parameters;
   receiving a request from the other device to utilize the wireless channel; and
   when a total bandwidth capability of the wireless channel is exceeded with the second device operating at the first bandwidth utilization, instructing the at least one device and the other device to configure with a second bandwidth utilization in accordance with a second set of parameters, wherein a total bandwidth utilization of the at least one device and the other device is not greater than the total bandwidth capability of the wireless channel.

9. The apparatus of claim 8, the controller preventing bandwidth reduction on the wireless channel when a negative acknowledgement is received from the at least one device in response to the instructing to reduce from the first bandwidth utilization to the second bandwidth utilization.

10. The apparatus of claim 8, the controller preventing bandwidth reduction by the at least one device on the wireless channel when a minimum level of service is reached.

* * * * *